United States Patent
Cremer et al.

(10) Patent No.: US 8,996,538 B1
(45) Date of Patent: Mar. 31, 2015

(54) SYSTEMS, METHODS, AND APPARATUS FOR GENERATING AN AUDIO-VISUAL PRESENTATION USING CHARACTERISTICS OF AUDIO, VISUAL AND SYMBOLIC MEDIA OBJECTS

(75) Inventors: Markus K. Cremer, Berkeley, CA (US); Ching-Wei Chen, Oakland, CA (US); Peter C. DiMaria, Berkeley, CA (US); Ho-Hsiang Wu, Jersey City, NJ (US)

(73) Assignee: Gracenote, Inc., Emeryville, CA (US)

( * ) Notice: Subject to any disclaimer, the term of this patent is extended or adjusted under 35 U.S.C. 154(b) by 410 days.

(21) Appl. No.: 12/985,690

(22) Filed: Jan. 6, 2011

Related U.S. Application Data

(60) Provisional application No. 61/292,671, filed on Jan. 6, 2010.

(51) Int. Cl.
*G06F 7/00* (2006.01)
*G06F 17/30* (2006.01)

(52) U.S. Cl.
CPC .............................. *G06F 17/30864* (2013.01)
USPC ......................................... 707/749; 707/758

(58) Field of Classification Search
CPC .................. G06F 17/30053; G06F 17/30743; G06F 17/30038; G06F 17/30864; G06F 17/30837

USPC ......... 707/736, 739, 776, 749, 758, 913, 914, 707/916

See application file for complete search history.

(56) References Cited

U.S. PATENT DOCUMENTS

| | | | |
|---|---|---|---|
| 6,639,649 | B2 | 10/2003 | Fredlund et al. |
| 7,454,331 | B2 * | 11/2008 | Vinton et al. .................. 704/225 |
| 2003/0083871 | A1 * | 5/2003 | Foote et al. .................... 704/233 |
| 2003/0135513 | A1 * | 7/2003 | Quinn et al. ................... 707/102 |
| 2004/0122539 | A1 | 6/2004 | Ainsworth |
| 2005/0158037 | A1 | 7/2005 | Okabayashi et al. |
| 2007/0208771 | A1 * | 9/2007 | Platt .............................. 707/102 |
| 2008/0110322 | A1 | 5/2008 | Lee et al. |
| 2009/0024922 | A1 * | 1/2009 | Markowitz et al. ........... 715/716 |
| 2009/0077460 | A1 | 3/2009 | Li et al. |
| 2010/0131895 | A1 * | 5/2010 | Wohlert ......................... 715/811 |
| 2011/0184542 | A1 * | 7/2011 | Tsoneva et al. .................. 700/94 |

OTHER PUBLICATIONS

Author: Hockman; Title: Automated Rhythmic Transformation of Musical Audio; Date: Sep. 2008; pp. 1-4.*

* cited by examiner

*Primary Examiner* — Md. I Uddin
(74) *Attorney, Agent, or Firm* — Schwegman Lundberg & Woessner, P.A.

(57) ABSTRACT

In an embodiment, a method and apparatus for generating a presentation is provided. The method considers characteristics of audio works and visual works when constructing the presentation. In some embodiments, the presentation may be automatically constructed.

19 Claims, 37 Drawing Sheets

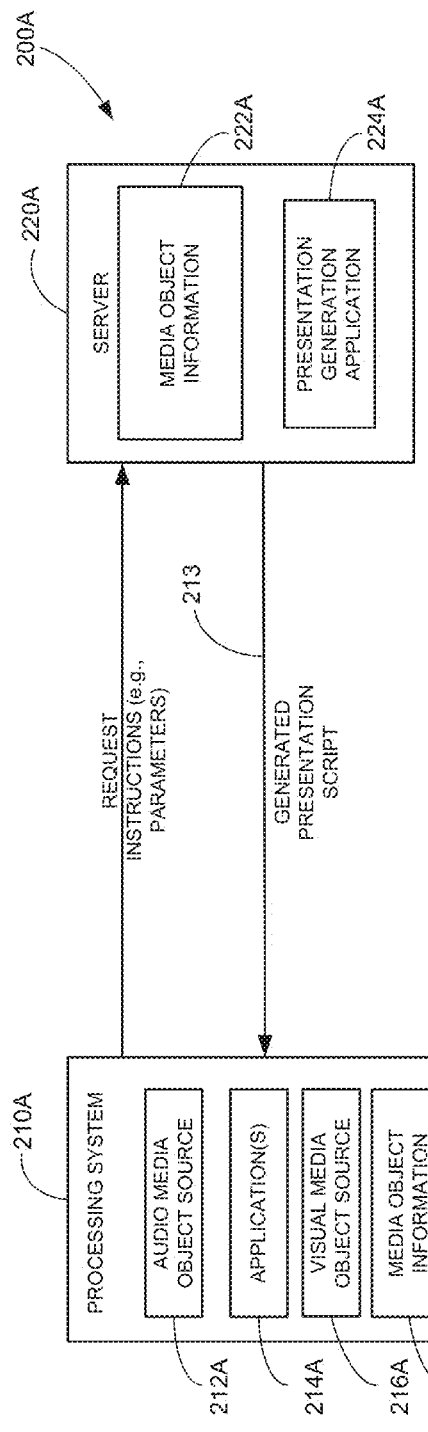
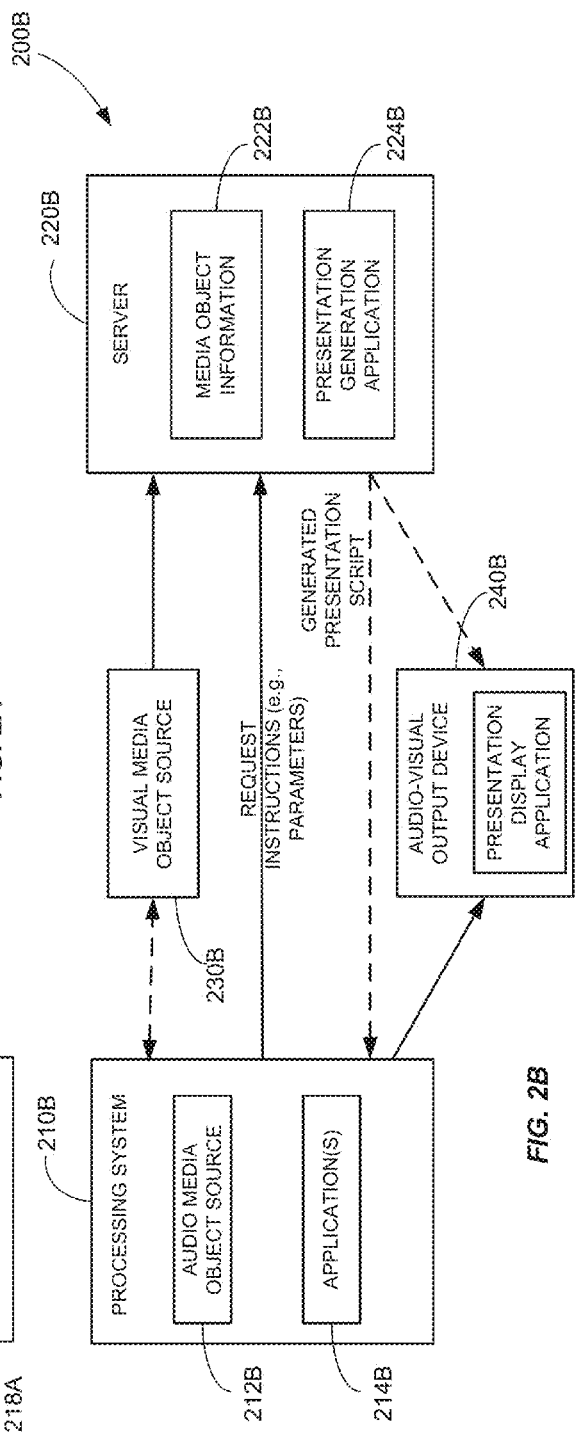

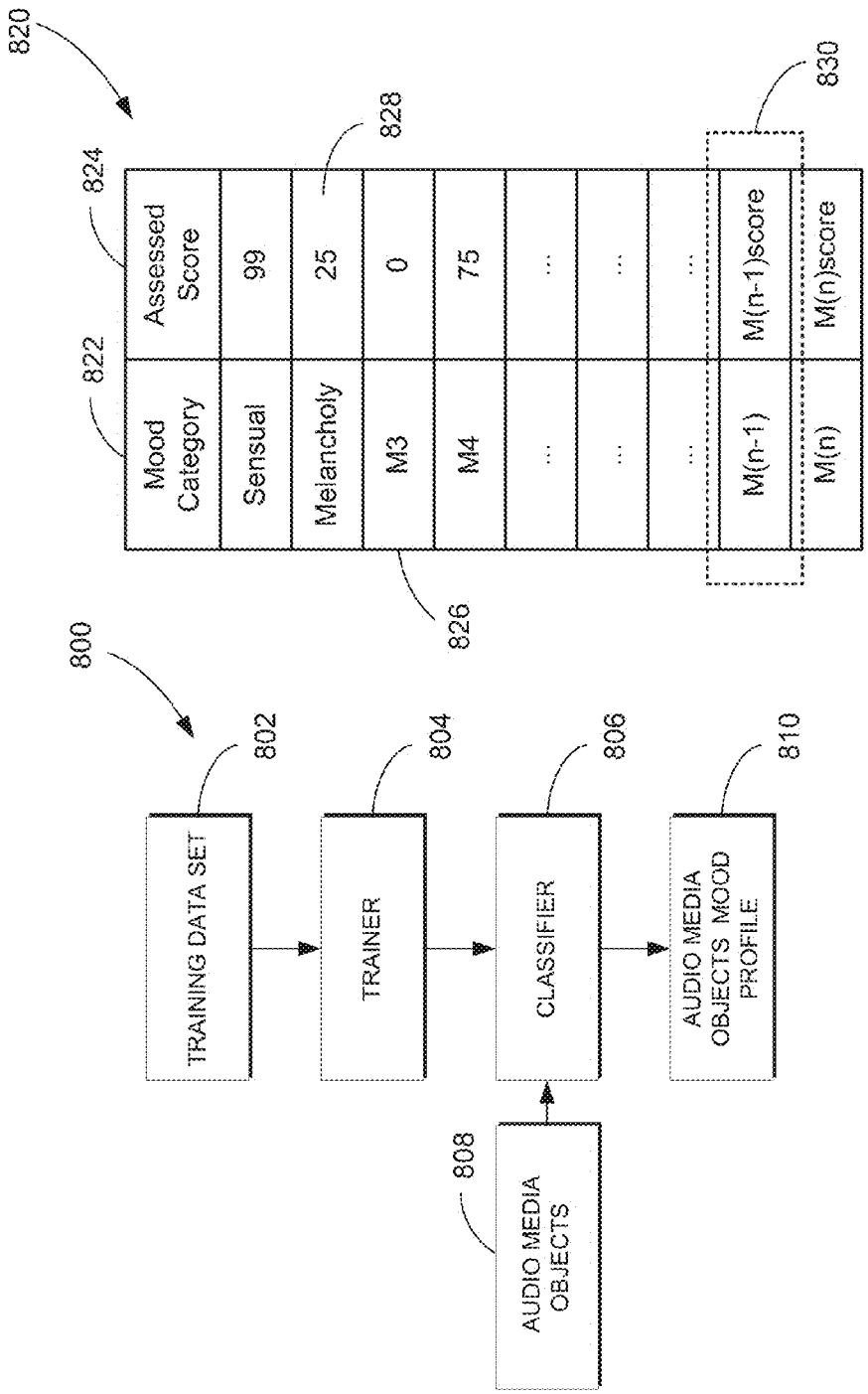

| Mood – Tempo | Rapid | Fast | Medium | Slow |
|---|---|---|---|---|
| Angry | 9 | 9 | 6 | 2 |
| Upset | 8 | 8 | 7 | 4 |
| Somber | 2 | 2 | 7 | 9 |
| Melancholy | 3 | 2 | 4 | 7 |
| Happy | 7 | 9 | 8 | 4 |
| Pensive | 1 | 3 | 4 | 7 |

Fig. 10

| | | |
|---|---|---|
| Low-Level | Visual | Motion Intensity |
| | | Saturation |
| | | Hue |
| | | Luminance |
| | Audio | Spectral brightness |
| | | Energy |
| Mid-Level | Visual | Visual Treatment |
| | | Frame Composition |
| | | Palette |
| | Audio | Rhythm |
| | | Instrumentation |
| | | Chord Progression |
| | | Melody Profile |
| | | Tempo |
| High-Level | All | Topic - Issues |
| | | Topic - Personal Situation |
| | | Topic - Practices |
| | | Topic - Living Thing |
| | | Topic - Inanimate Object |
| | | Topic - Physical/Mental State |
| | | Topic - Character Type |
| | | Topic - Activity |
| | | Topic - Event |
| | | Technique |
| | | Scenario |
| | | Setting - Time Period |
| | | Setting - Location |
| | | Setting - Environment |
| | | Era |
| | | Origin |
| | Text | Text Genre |
| | Visual | Image Genre |
| | | Video Mood |
| | | Video Genre |
| | Audio | Audio Mood |
| | | Audio Genre |

|  | Mid-Level | | | | | | | | Low-Level | | | | | |
|---|---|---|---|---|---|---|---|---|---|---|---|---|---|---|
|  | Audio | | | | | Visual | | | Audio | | Visual | | | |
| | Tempo | Melody Profile | Chord Progression | Instrumentation | Rhythm | Palette | Frame Composition | Visual Treatment | Energy | Spectral Flatness | Luminance | Hue | Saturation | Motion Intensity |

| Mood Categories | M1 | M2 | M3 | ... | ... | M(N-1) | M(N) |
|---|---|---|---|---|---|---|---|
| M1 | 10 | xx | xx | xx | xx | xx | xx |
| M2 | (10) | 10 | xx | xx | xx | xx | xx |
| M3 | 1 | 8 | 10 | xx | xx | xx | xx |
| ... | 4 | 5 | 8 | 10 | 9 | xx | xx |
| ... | 4 | (5) | 5 | 9 | 10 | 10 | xx |
| M(N-1) | 3 | (7) | 8 | (4) | 9 | 10 | xx |
| M(N) | 2 | 3 | 4 | 5 | (3) | 7 | 10 |

*Fig. 13*

SYSTEMS, METHODS, AND APPARATUS FOR GENERATING AN AUDIO-VISUAL PRESENTATION USING CHARACTERISTICS OF AUDIO, VISUAL AND SYMBOLIC MEDIA OBJECTS

CROSS-REFERENCE TO RELATED PATENT DOCUMENTS

This application is related to co-pending United States Patent Applications entitled, "APPARATUS AND METHOD FOR DETERMINING A PROMINENT TEMPO OF AN AUDIO WORK" with Ser. No. 12/436,718 filed May 6, 2009, and "METHODS AND APPARATUS FOR DETERMINING A MOOD PROFILE ASSOCIATED WITH AUDIO DATA" with Ser. No. 12/489,861, filed Jun. 23, 2009, each of which is incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Gracenote, Inc. All Rights Reserved.

TECHNICAL FIELD

The present disclosure relates generally to generating an audio-visual presentation, and more specifically to methods, systems, and apparatus for generating an audio-visual presentation using characteristics (e.g., tempo, mood, genre, style) of audio media objects (e.g., an audio recording), visual media objects (e.g., a video recording or a digital image), and symbolic media objects (e.g. song lyrics) along with other parameters for synchronously presenting characteristically congruent audio, visual, and symbolic media objects.

BACKGROUND

A presentation generated on a processing system can be a complex mixture of audio media objects (e.g., music recordings) and visual media objects (e.g., video recordings or one or a group of digital photos). A user may require significant amounts of time and resources to manually create and edit an audio-visual presentation (e.g. a slideshow with accompanying soundtrack or a music video). Many conventional techniques for generating an audio-visual presentation do not give consideration to how visual media objects are temporally combined with audio media objects when the visual media objects are presented in relation to the audio media objects, and what criteria are used to combine visual media objects with audio media objects. These conventional techniques may result in unpleasant combinations of visual media objects with audio media objects.

For example, one or more parts (e.g., audio media objects and visual media objects) may not thematically fit with other parts. Visual media objects readily available and selected to accompany audio media objects may not be similar to the mood, pace, or other characteristics of the audio media objects. Other times, a visual media object set (e.g. a photo slideshow) may set the mood and pace for selecting and playing an audio media object (e.g. a music recording). However, audio media objects readily available and selected to accompany the visual media objects may not be similar to the mood, pace, or other characteristics of the visual media objects. Furthermore, manually timing the presentation of a visual media object set with the pace of the audio media objects may prove difficult for the end user. Therefore, it may be desirable to automatically generate a presentation employing characteristics of the audio and visual media objects to synchronously present both audio and visual media objects.

BRIEF DESCRIPTION OF DRAWINGS

Some embodiments are illustrated by way of example and not limitation in the Figures of the accompanying drawings in which:

FIG. 2A is a block diagram of a system, in accordance with an example embodiment, to generate an audio-visual presentation with media objects stored at a processing system;

FIG. 2B is a block diagram of a system, in accordance with an example embodiment, to generate an audio-visual presentation with some media objects stored at a processing system and some media objects stored at a data source;

FIG. 8A is an example flow diagram of a method, in accordance with an example embodiment, for determining a characteristic profile of a media object;

FIG. 8B illustrates an example of a characteristic profile table to store characteristic profiles;

FIG. 10 illustrates an example descriptor mapping matrix table, in an example embodiment, for comparing disjoint descriptors;

Figure 11E:
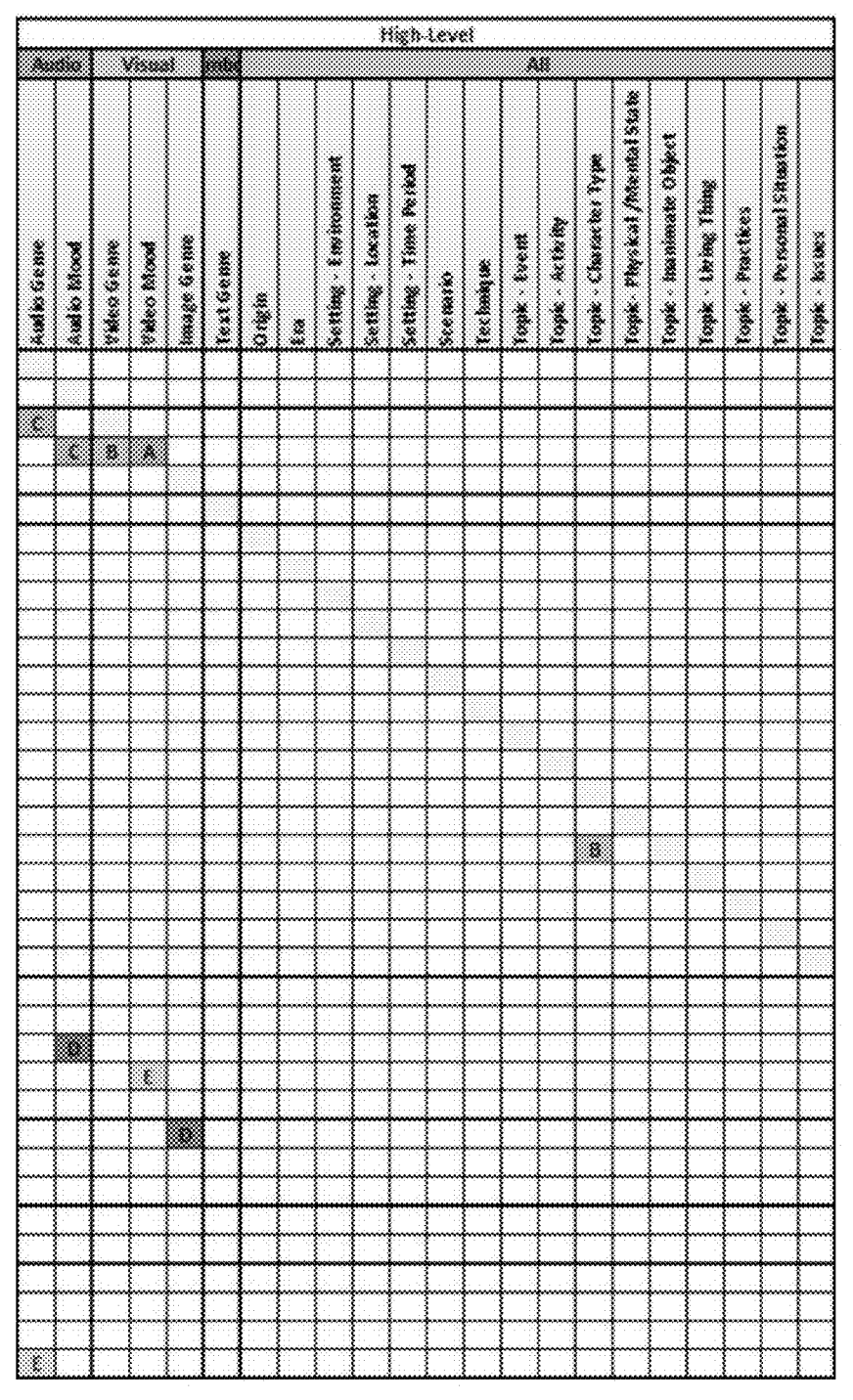

FIG. 11D illustrates a third portion of FIG. 11A;

FIG. 11E illustrates a fourth portion of FIG. 11A;

FIG. 11F illustrates a fifth portion of FIG. 11A;

FIG. 12 shows relationships and correlations that may exist in the relation information that indicate relationships between media objects and other entities;

FIG. 13 illustrates an example characteristic correlates data matrix, in an example embodiment, for comparing elements of, and determining congruency between, two descriptor values;

DETAILED DESCRIPTION

Methods, apparatus, and systems for dynamically generating an audio-visual presentation ("presentation") using characteristics of audio media objects, visual media objects and symbolic media objects are described. In an example embodiment, using a selected audio media object, visual media objects with associated characteristics may be selected from a visual media object source and synchronously rendered with the audio media object. Alternatively, using selected visual media objects, audio media objects with associated characteristics may be selected from an audio media object source and synchronously rendered with the visual media object.

The following detailed description refers to the accompanying drawings that depict various details of examples selected to show how the example embodiments may be practiced. The discussion herein addresses various examples of the inventive subject matter at least partially in reference to these drawings, and describes the depicted embodiments in sufficient detail to enable those skilled in the art to practice the embodiments. Many other embodiments may be utilized for practicing the inventive subject matter than the illustrative examples discussed herein, and many structural and operational changes in addition to the alternatives specifically discussed herein may be made without departing from the scope of the inventive subject matter.

Audio-Visual Presentation System

The methods described herein may be executed by an application of a processing system (e.g. a home computer, laptop, or the like), where the processing system is capable of locally storing audio and visual media objects useable in the presentation and storing the generated presentation. At least in part, the presentation includes an audio media object presented concomitantly with visual media objects with congruent characteristics. In one example embodiment, the selection of presentation visual media objects is based on the mood characteristic and one or more rhythmic pattern characteristics of the seed audio media objects. In another example embodiment, the selection of presentation audio media objects is based on the characteristics of two or more seed visual media objects.

Figure 1:
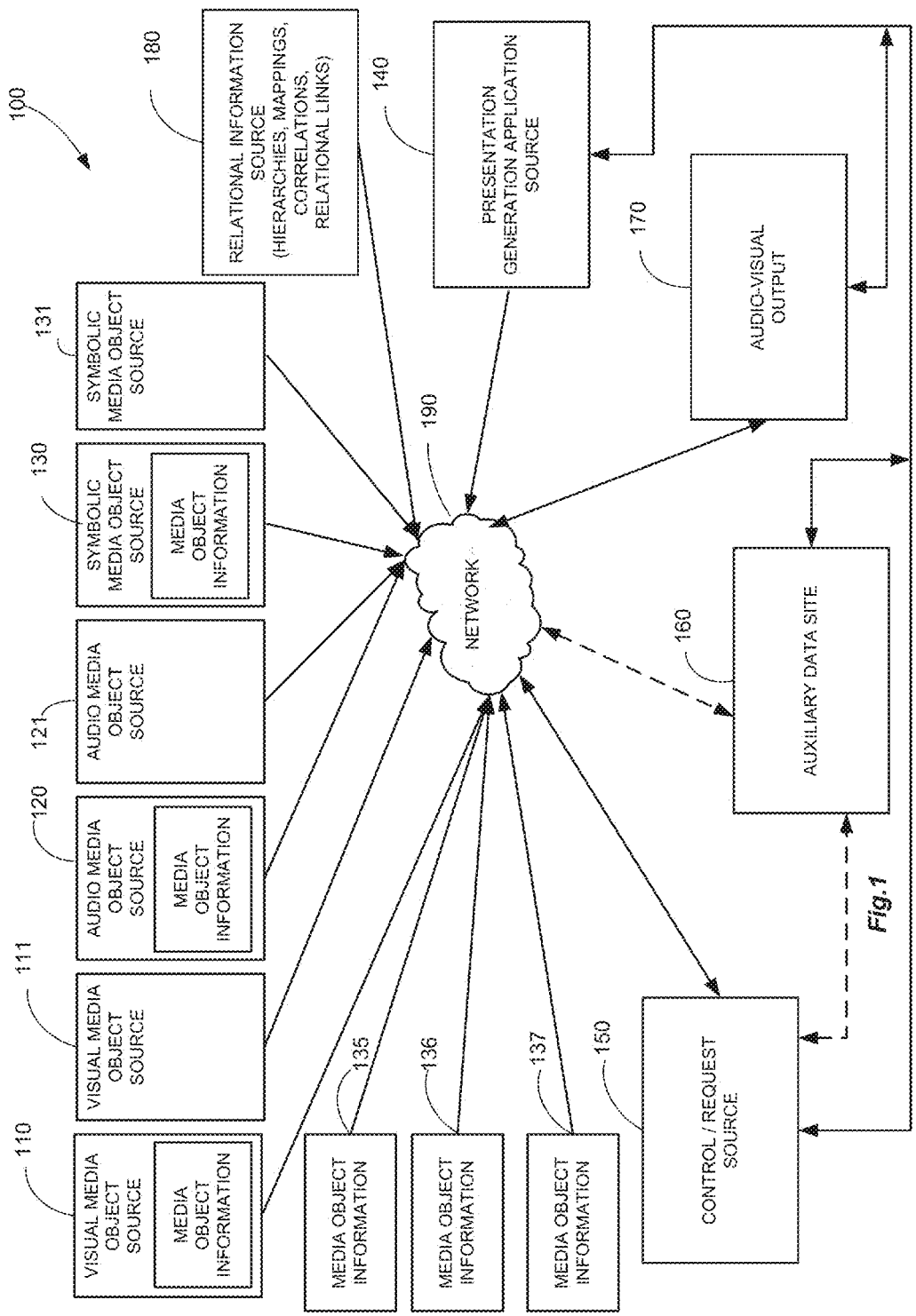
FIG. 1 is a block diagram of a network system, in accordance with an example embodiment, to generate an audio-visual presentation.

FIG. 1 is a block diagram of a networked system 100, in accordance with an example embodiment, to generate an audio-visual presentation.

As can be seen in FIG. 1, the system 100 includes visual media object sources 110 and 111, audio media object sources 120 and 121, symbolic media object sources 130 and 131, media object information source blocks 135, 136, and 137, a presentation generation application source 140, a control/request source 150, an auxiliary data site 160, an audio visual presentation output 170, a relational information (e.g. hierarchies, mapping, correlations, relational links) source 180, all in communication with each other via network 190. All sources in the networked system 100 may include a processor to execute various tasks, such as for example, responding to requests received from an external source or from the source itself.

Visual Media Objects:

Visual media objects are contained within the visual media object sources 110 and 111. The visual media object sources 110 and 111 may comprise of any number of digital images in any format including, for example, JPEG (Joint Photographic Experts Group), TIFF (Tagged Image File Format), RAW, PNG (Portable Network Graphics), GIF (Graphical Interchange Format), and BMP (Windows bitmap). The visual media object sources 110 and 111 may also include video media files, which may additionally have an accompanying audio component such as, for example, a DVD (Digital Personal Disc) file format described above. The visual media objects may be stored in any digital representation through the use of a compression mechanism. The term "visual media object" encompasses information that generates or represents images, video, or a collection of frames of images to create video or similar visual media. Thus, the term "visual media object" is intended to include analog or digital representations of a visual output, whether or not that representation is actually rendered in a form perceivable by a human viewer. Further, it should be noted that the method described herein may be performed on a part of a visual media object (e.g. an entire image, a portion of an image, an entire movie, a movie chapter, a movie scene, a movie shot, or a movie frame, or a plurality of images and/or videos etc.).

Audio Media Object:

Audio media objects are contained within the audio media object sources 120 and 121. The provided examples will be in the context of an audio recording, and may be recorded in either analog or digital form. The audio media objects in the audio media object sources 120 and 121 can include any number of audio recordings, visual images with a related audio component, or video recordings with a related audio component. For example, in an embodiment, the audio media objects may include audio recordings stored in a compressed storage medium such as compact discs (CDs) and/or DVDs having an audio component. The audio media objects may include any number of MPEG-1 Audio Layer 3 (MP3), AAC (Advanced Audio Codec), MPEG-4, or any other format of lossy compressed, lossless compressed, or uncompressed digital audio files. Other forms and types of media files can also be accommodated. Unless otherwise clearly indicated, the term "audio media object" is intended to include an analog or digital representation of an audio output, whether or not that representation is actually rendered in a form perceivable by a human listener. Further, it should be noted that the methods described herein may be performed on just a portion of the audio media objects in the audio media object sources 120 and 121 (e.g., a single audio recording or a segment thereof, or a plurality of audio recordings or audio recording segments, etc.) and not necessarily on all of the audio media objects in the audio media object sources 120 and 121.

Symbolic Media Objects:

Symbolic media objects are contained within the symbolic media object sources 130 and 131. The symbolic media objects in the symbolic media object sources 130 and 131 can include any number of text, music scores, MIDI (Musical Instrument Digital Interface), or similar. The methods described herein may be performed on just a portion of symbolic media objects in the symbolic media object sources 130 and 131 and not necessarily all symbolic media objects in the symbolic media object sources 130 and 131.

Media Object Information:

As will be discussed in greater detail below with reference to FIG. 6, media object information may contain a media object identification (ID) used to identify a unique media object as well as characteristics, such as descriptors, which describe that media object. For example, characteristics of audio media objects may include mood, genre, and tempo, among various other characteristics. Characteristics of visual media objects may include contrast, luminance, and era, among various other characteristics. Media object information may either be included with the media object sources 110, 111, 120 and 130 themselves or completely separate from the media objects 135, 136, and 137.

Relational Information:

Further, the media object information is separate from the relational information in the relational information source 180: the relational, correlate, mapping and hierarchical data structures that may be used to relate, compare and associate various media objects with one another. Media objects, media object information, and the relational information may all be distributed, in whole or in parts, across a network 190.

As long as the media object IDs, media object information, and relational information are available on the network, the presentation generation application source 140 may generate a presentation script, even though it does not have access to either the seed or presentation source media objects themselves.

In an example embodiment, the control/request source 150 sends a request and instructions to generate a presentation to the presentation generation application source 140, and in response, the presentation generation application source 140 generates presentation information. The generated presentation information may be sent to the audio-visual output 170 for presentation. In some embodiments, the generated information may be sent back to the control/request source 150 or any other source in the networked system 100.

In some embodiments, when generating an audio-visual presentation, the presentation generation application source 140 may access and use visual media objects (e.g., digital images or video) from the visual media object sources 110 and 111, audio media objects (e.g., digital music recordings) from the audio media object sources 120 and 121, and symbolic media objects (e.g., text) from the symbolic media object sources 130 and 131. In example embodiments, the visual media object sources 110 and 111, the audio media object sources 120 and 121, and the symbolic media object sources 130 and 131 may include numerous websites (e.g., Flickr®, Google™ Images, MySpace®, YouTube®, Rhapsody or the like), remote servers, personal computers (PCs), processing systems, and/or mobile devices, connected to the network 190, or any other devices capable of storing audio or visual media objects. It is to be noted one or more of the sources 110, 111, 120, 121, 130, 131, 135, 136, 137, 140, and 150 may be co-located in a single device. Likewise, the audio-visual presentation output 170 may be co-located with any one or more of the sources 110, 111, 120, 121, 130, 131, 135, 136, 137, 140, and 150. In an example embodiment, the sources 110, 111, 120, 121, 130, 131, 135, 136, 137, 140 and audio-visual presentation output 170 are combined in a single device (e.g., a computer, mobile phone, or any other processor-based device).

In other example embodiments, the presentation generation application source 140 may access visual and audio media objects from the auxiliary data site 160. In some embodiments, the auxiliary data site 160 may be a local storage device storing audio or visual media objects, or generally, any device capable of storing audio and/or visual media objects, such as, for example, a digital camera, video camera, video gaming system, audio recording device, digital or analog music player, or the like. The auxiliary data site 160 may also include a storage device communicatively coupled to the control/request source 150 without connecting through the network 190 as depicted by the dashed arrow lines.

The example networked system 100 may include any number of visual media object sources 110 and 111, audio media object sources 120 and 121, symbolic media object sources 130 and 131, presentation generation application sources 140, audio visual presentation outputs 170, media object information sources 135, 136, and 137, relational information sources 180, auxiliary data sites 160 and control/request sources 150. For example, the control/request source 150 may be portable media player, vehicle audio system, PC, mobile telephone, set-top box, media server, remote control, or any combination thereof, capable of generating the presentation. In an example embodiment, the various components depicted in the example networked system 100 may be integrated within a single processing system such as, for example, the control/request source 150, and therefore, may not require the network 190 to communicate between various components.

As will be described in greater detail, the presentation generation application source 140 may receive various instructions along with the request to generate the presentation. The instructions may include parameters for use and incorporation into the presentation by the presentation generation application source 140. For example, parameters may include one or more lists of user-selected audio media objects and/or visual media objects, thereby requiring the presentation generation application source 140 to generate the presentation limited to the selected media objects (e.g., audio recordings, visual images). Additionally, the parameters may include presentation parameters (e.g., duration, style, transition effects, peripheral imagery, source selection, templates, abstract renderings, and randomization) and characteristics of the audio media objects and visual media objects as described above. In example embodiments, a user may select the parameters and their values or the presentation generation application may automatically select them or any combination of user-selected and automatically selected parameters and parameter values. In some example embodiments, parameters and their values may be automatically selected by the presentation generation application source 140 based on characteristics of the audio media objects and visual media objects selected for the presentation.

Example System Configurations

Figure 3:
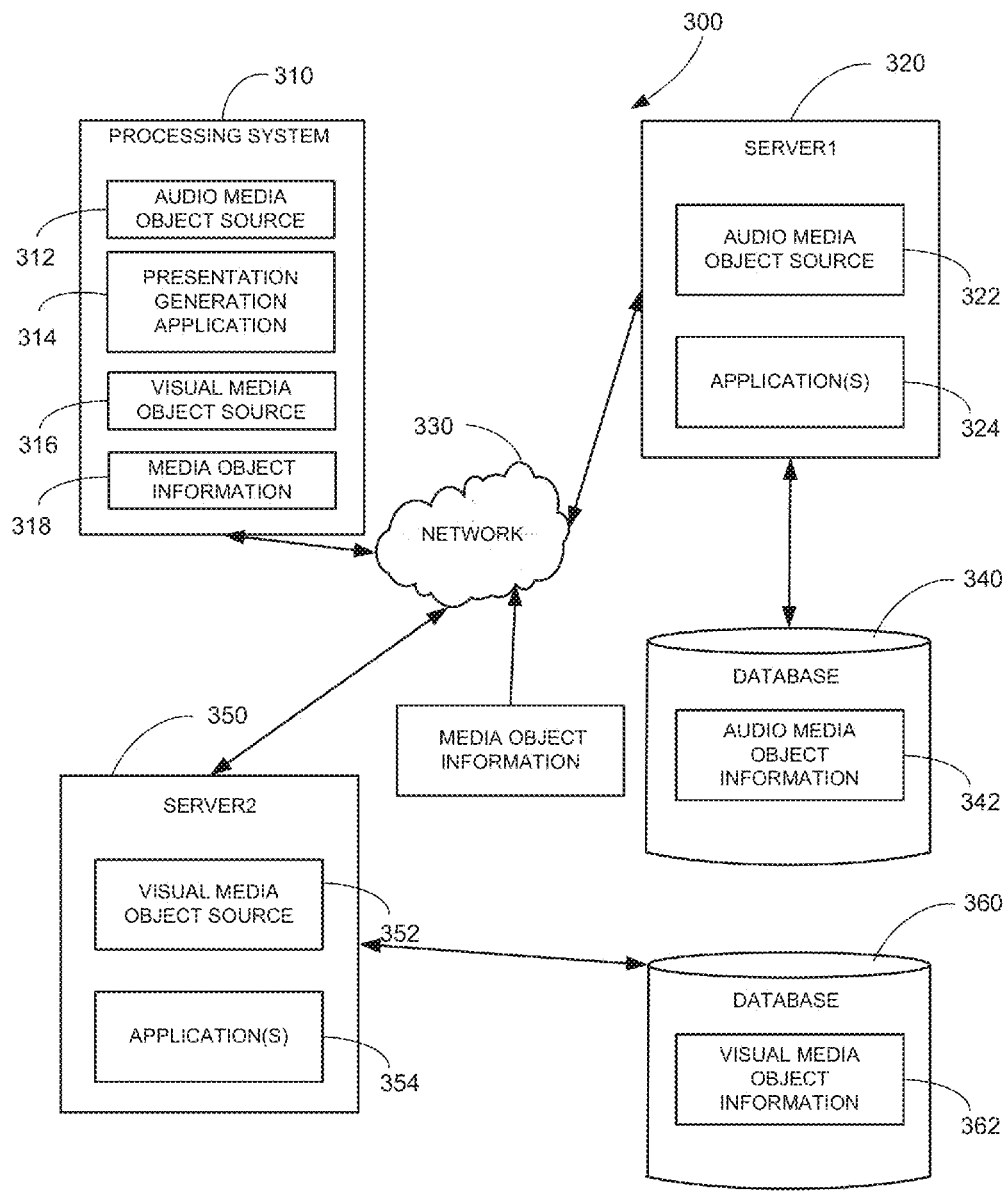
FIG. 3 is a block diagram of a network system, in accordance with an example embodiment, to generate an audio-visual presentation.

FIGS. 2A, 2B, and 3 illustrate various other example embodiments of systems, similar to the networked system 100 of FIG. 1, for generating an audio-visual presentation.

Description of System 200A:

FIG. 2A is a block diagram of a system 200A, in accordance with an example embodiment, to generate an audio-visual presentation with media objects (e.g., audio media objects from source 212A, visual media objects from source 216A) stored at a processing system 210A. As can be seen in FIG. 2A, an example system 200A includes a processing system 210A in communication with server 220A for dynamically generating a presentation at the server 220A and transmitting the generated presentation to the processing system 210A, as shown by the bottom flow arrow 213 labeled "generated presentation script." In an example embodiment, the processing system 210A includes the audio media objects from source 212A, one or more application(s) 214A, the visual media objects from source 216A and media object information 218A. The server 220A includes the media object information 222A and the presentation generation application 224A. Although certain functionality may be divided between multiple applications in some examples, for clarity and merely by way of example, the present discussion will address the functionality as being performed by a single application (e.g., application 214A) executed at the processing system 210A and a single presentation generation application (e.g., presentation generation application 224A) executed at the server 220A.

The processing system 210A may be any media-rendering device (e.g., a portable media player such as an iPod™, a PC, mobile phone, media server, television, set-top box or the like) that executes the one or more applications 214A (e.g., a media player) to process or play the audio media objects in source 212A (e.g., a plurality of recordings in a music collection) and process and display visual media objects in source 216A (e.g. a plurality of video or images in a media collection). The processing system 210A may store information related to the audio media objects in source 212A and the visual media objects in source 216A. This information could be stored in a storage device (not shown). In some example embodiments, the application 214A may determine the segments, the mood, one or more rhythmic patterns and/or tempo of the audio media objects in source 212A, and may determine various characteristics of the visual media objects in source 216A including mood, hue, color schemes, contrast, or the like. In an example embodiment, the application 214A may allow a user to edit the characteristics associated with the audio media objects in source 212A and visual media objects in source 216A by adding, deleting or modifying characteristics. The characteristics may be readable by an application 214A to provide information to a user and/or the application may contain functionality for performing various tasks with the audio media objects in source 212A and visual media objects in source 216A, such as matching characteristics or finding congruent characteristics.

User Presentation Playback Control:

In an example embodiment, the application 214A may provide functionality for a user to control the generation of the presentation, allowing the user to play, stop, pause, order, record, sort, search, edit, and so forth, and select parameters. The application 214A may comprise a graphical user interface to facilitate these and other actions. As will be apparent to those skilled in the art, this functionality may be provided by the same application 214A signaling the presentation generation application 224A of the server 220A to commence generating the presentation, or it may be an add-on application to an existing player, such as a conventional media player application (e.g., iTunes™, Windows Media Player™ or the like).

Location of Media Object Information:

In an embodiment, the processing system 210A may retrieve or access audio media object information associated with audio media objects in source 212A and/or video object information associated with video media objects in source 216A from a database (not shown) communicatively coupled to the processing system 210A when using characteristics of the respective audio media objects in source 212A and video media objects in source 216A. The processing system 210A may also submit information determined at the processing system 210A, such as the mood related to the audio media objects in source 212A, to the server 220A.

Functions of Server:

The server 220A is shown to comprise media object information 222A and one or more presentation generation applications 224A. The server 220A may include an extensive database of media object information associated with an extensive number of media objects, with each media object potentially having a plurality of descriptors and/or descriptor profiles (e.g. a mood profile) or other characteristics associated with it. It is to be noted that the server 220A includes media object information 222A but does not necessarily include all related audio media objects. As with application(s) 214A of processing system 210A, the presentation generation application 224A may be executable by one or more processors at the server 220A to process the audio media objects in source 212A to determine various characteristics (e.g., descriptors such as a mood profile, genre profile, one or more rhythmic patterns, or the tempo) or segments of a music recording; and also to process the visual media objects in source 216A to determine various characteristics of the visual media objects in source 216A (e.g., descriptors such as mood, hue, contrast, or edge detection, among many other characteristics). Thus, in an example embodiment, the server 220A may provide one or more combinations of rhythmic patterns, tempos, and one or more segments, among other audio characteristics, as well as one or more visual characteristics on each of a large number of media objects.

In an example embodiment, the presentation generation application 214A may generate a presentation by combining a first media object with a second media object characteristically congruent with the first media object to accompany the first media object in the presentation. In some example embodiments, the presentation generation application 224A may take into consideration various parameters, such as, for example, duration of an audio media object, duration of a portion of an audio media object, animation, visual effects, user-selected characteristics such as mood, color, or beat rate, or any combination of these parameters or other parameters as described below.

Audio Seed to Select Visual Media Object:

In one example embodiment, application 214A of processing system 210A may send a request along with instructions (e.g., parameter values) to the server 220A, as shown by the top flow arrow in FIG. 2A, to generate the audio-visual presentation, and the processing system 210A receives the generated presentation information, as shown by the bottom flow arrow 213. A user may select a first media object (for example, an audio recording from the audio media object source 212A), using an application 214A at the processing system 210A. Upon receiving the request along with instructions (e.g., identifier for a selected audio media object) at the server 220A, the presentation generation application 224A may automatically select a second media object (for example, a visual image from the visual media object source 216A of the processing system 210A), based on one or more characteristics of the audio media object from the audio media object source 212A. In some example embodiments, the presentation generation application 224A may automatically select visual media objects having congruent (e.g., the same or similar) characteristics as the user-selected audio media object.

Visual Seed to Select Audio Media Object

In another example embodiment, the user may send a request to the server 220A to generate a presentation using user-selected visual media objects from the visual media object source 216A of the processing system 210A. Upon receiving the request and instruction (e.g., identifiers for selected visual media objects among other parameters) the presentation generation application 224A at the server 220A may automatically select audio media objects from the audio media object source 212A of the processing system 210A based on one or more characteristics of the selected visual media objects. The presentation generation application 224A performs a characteristic congruency analysis between the selected visual media objects and available audio media objects to automatically select characteristically congruent audio media objects to accompany the selected visual media objects.

Mixed Seeds to Select Mixed Media Objects

In another example embodiment, the server 220A receives a request to automatically generate a presentation using audio media objects in source 212A and visual media objects in source 216A from the processing system 210A. The received request may include instructions (e.g., identifiers of available audio media objects and visual media objects, among other parameters for the presentation), and the presentation generation application 224A may automatically select additional audio media objects and visual media objects based on the instructions. In other example embodiments, the user may select some or all of both the visual media objects and audio media objects for the presentation generation application to use in the presentation.

Description of System 200B:

FIG. 2B is a block diagram of a system 200B, in accordance with an example embodiment, for generating an audio-visual presentation with some media objects stored at a processing system 210B and some media objects stored at a remote visual media object source 230B. Similar to FIG. 2A above, application 214B of processing system 210B may send a request along with instructions (e.g., parameters) to the server 220B, to generate the audio-visual presentation as shown by the center flow arrow. Presentation generation application 224B may use audio media objects from source 212B and visual media objects from source 230B to generate the presentation.

Visual Media Object Source:

As described above with reference to FIG. 1, the visual media object source 230B may include any one or a combination of a server, additional processing system, or a website (e.g., Flickr®, Google™ Images, MySpace®, YouTube®). The visual media object source 230B may be communicatively coupled to both the processing system 210B and server 220B, and therefore, the processing system 210B may specify parameters for selecting, sequencing or rendering visual media objects from the visual media object source 230B and may also select visual media objects from the visual media object source 230B for annotation by users when generating the presentation at the presentation generation application 224B.

Audio-Visual Output Device:

Additionally, FIG. 2B includes an audio-visual output device 240B, similar to the audio-visual output as depicted in FIG. 1. The audio-visual output device 240B device may include a monitor, viewable screen with projector, or the like, and may also include speakers, headphones, or the like. In some example embodiments, the audio-visual output device may be a mobile phone, laptop, desktop computer, or the like with audio and visual output capabilities. As shown, the audio-visual output device 240B is communicatively coupled with the server 220B and may additionally be communicatively coupled with the processing system 210B. In an example embodiment, the audio-visual output device 240B may present the generated presentation at a location away from the processing system 210B that originated the request and the instructions to generate the presentation. In another embodiment, the processing system 210B may include the audio-visual output device 240B in the form of peripheral output devices (e.g., monitor and speakers).

Description of System 300:

FIG. 3 is a block diagram of a network system 300, in accordance with an example embodiment, for generating an audio-visual presentation. FIG. 3 is a variation of the system described in FIGS. 1, 2A and 2B. In this example embodiment, server1 320 includes an additional audio media object source 322 along with applications 324, and server2 350 includes an additional visual media object source 352 along with applications 354. The processing system 310, the server1 320 and the server2 350 are all communicatively coupled to each other via network 330. When generating the presentation, the presentation generation application 314 may select audio media objects from the audio media object source 312 at processing system 310 and the audio media object source 322 of server1 320, and may select visual media objects from the visual media object source 316 of the processing system 310 and visual media object source 352 of server2 350.

In FIG. 3, each server is communicatively coupled to a respective database. For example, server1 320 is communicatively coupled to database 340, which stores audio media object information 342, and server2 350 is communicatively coupled to database 360, which stores visual media object information 362.

The stored audio media object information 342 may be associated with audio media objects in source 322 of server1 320 and/or audio media objects in source 312 of the processing system 310. The audio media object information 342 may include various characteristics of the audio media objects such as detailed characteristic analysis (e.g., a mood profile as described below), the genre, and/or the tempo among other characteristics to be collaboratively applied when generating the presentation. The stored visual media object information 362 may be associated with visual media objects in source 352 from the server 350 and/or visual media objects in source 316 of the processing system 310. The visual media object information 362 may include various characteristics associated with visual media objects such as face detection, hue, contrast, genre, and mood, among other characteristics for application when generating the presentation. The visual media object characteristics and audio media object characteristics may be determined at the servers (server1 320 and server2 350) by an application at the servers (e.g., application(s) 324 and application(s) 354) or may be determined by the presentation generation application 314 of the processing system 310.

Audio-Visual Presentation Method

In example embodiments, a method for generating an audio-visual presentation is provided that uses characteristics of audio media objects (e.g., sound and music recordings) and visual media objects (e.g., video and digital images) to synchronously generate a synchronized audio-visual presentation for an end user containing characteristically congruent audio and visual media objects. The audio-visual presentation may be presented to the user in real-time or stored for subsequent retrieval and presentation to a user.

An audio-visual presentation may contain one or more tracks. Each track contains one or more media objects of a particular media type. There may be any combination of media types (image, video, music, sound effects (SFX), text, etc.) in the presentation. A complete presentation is comprised of one or more media object raw presentations or one or more media types that have been combined and have treatments (e.g. transitions) applied. For illustrative purposes, an example process for creating a media object raw presentation follows.

Creation of Audio Media Object Raw Presentation

Figure 4A:
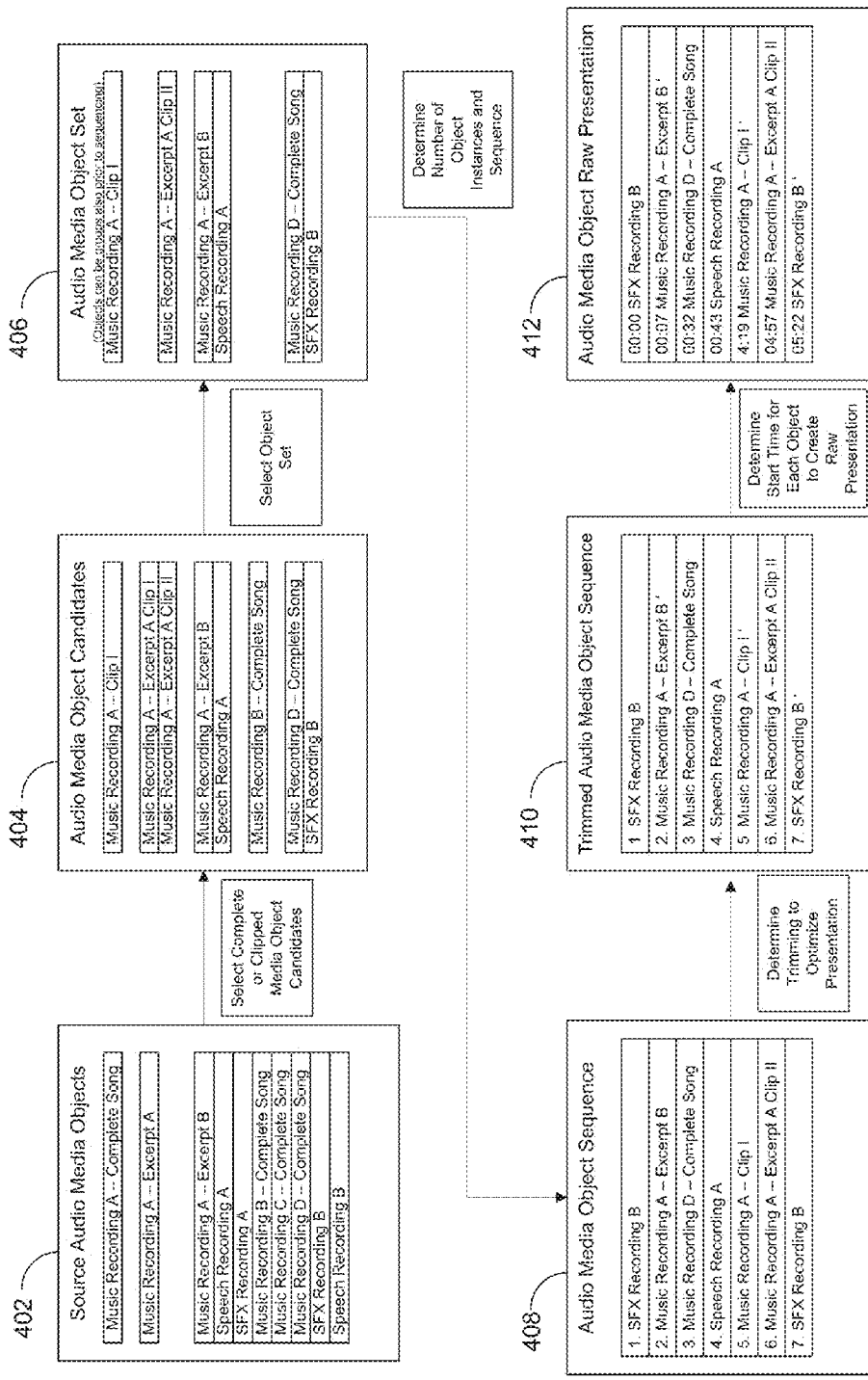
FIG. 4A shows an example of a process to assemble an audio media object raw presentation.
Figure 4B:
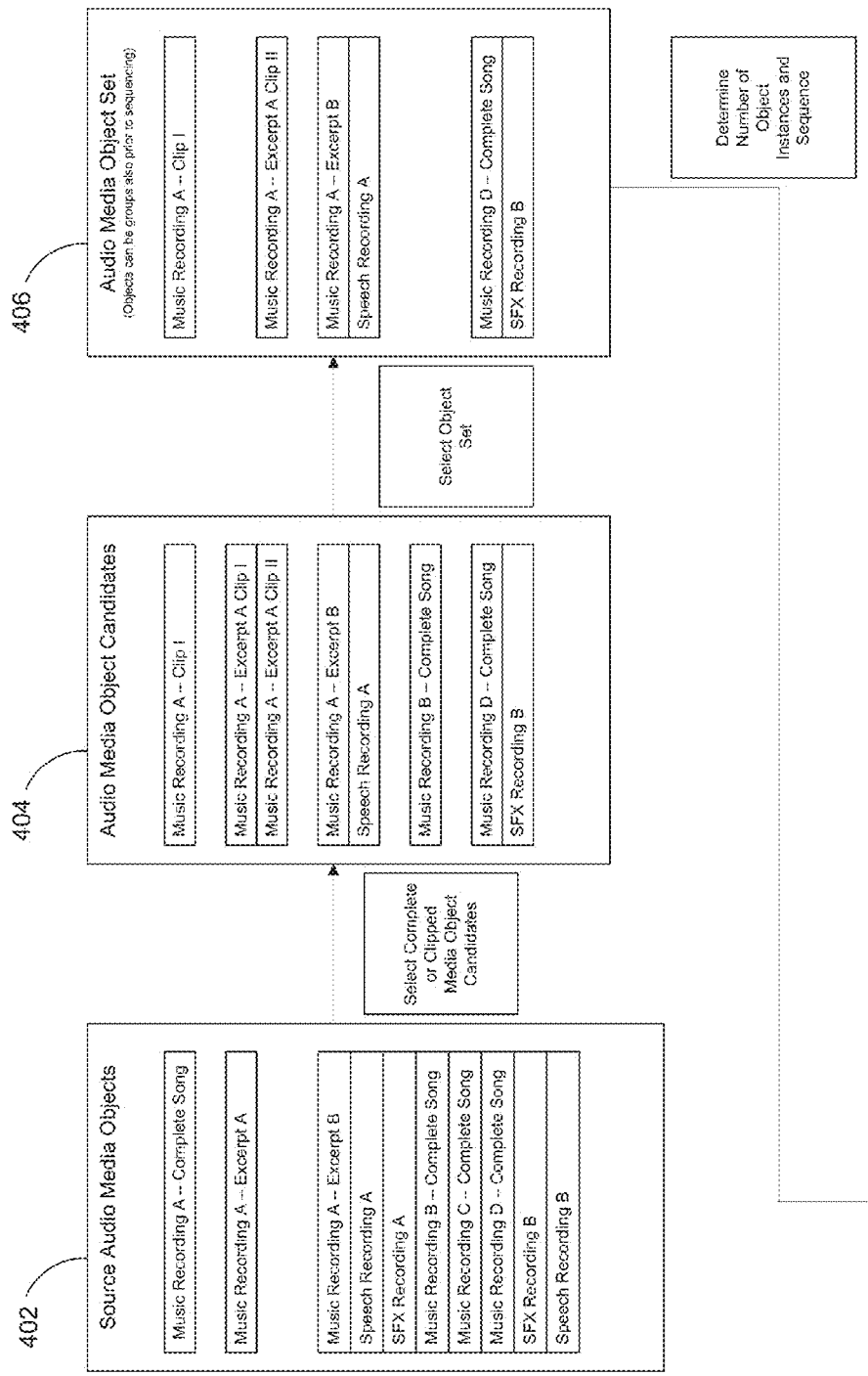
FIG. 4B illustrates a first portion of the process of FIG. 4A.
Figure 4C:
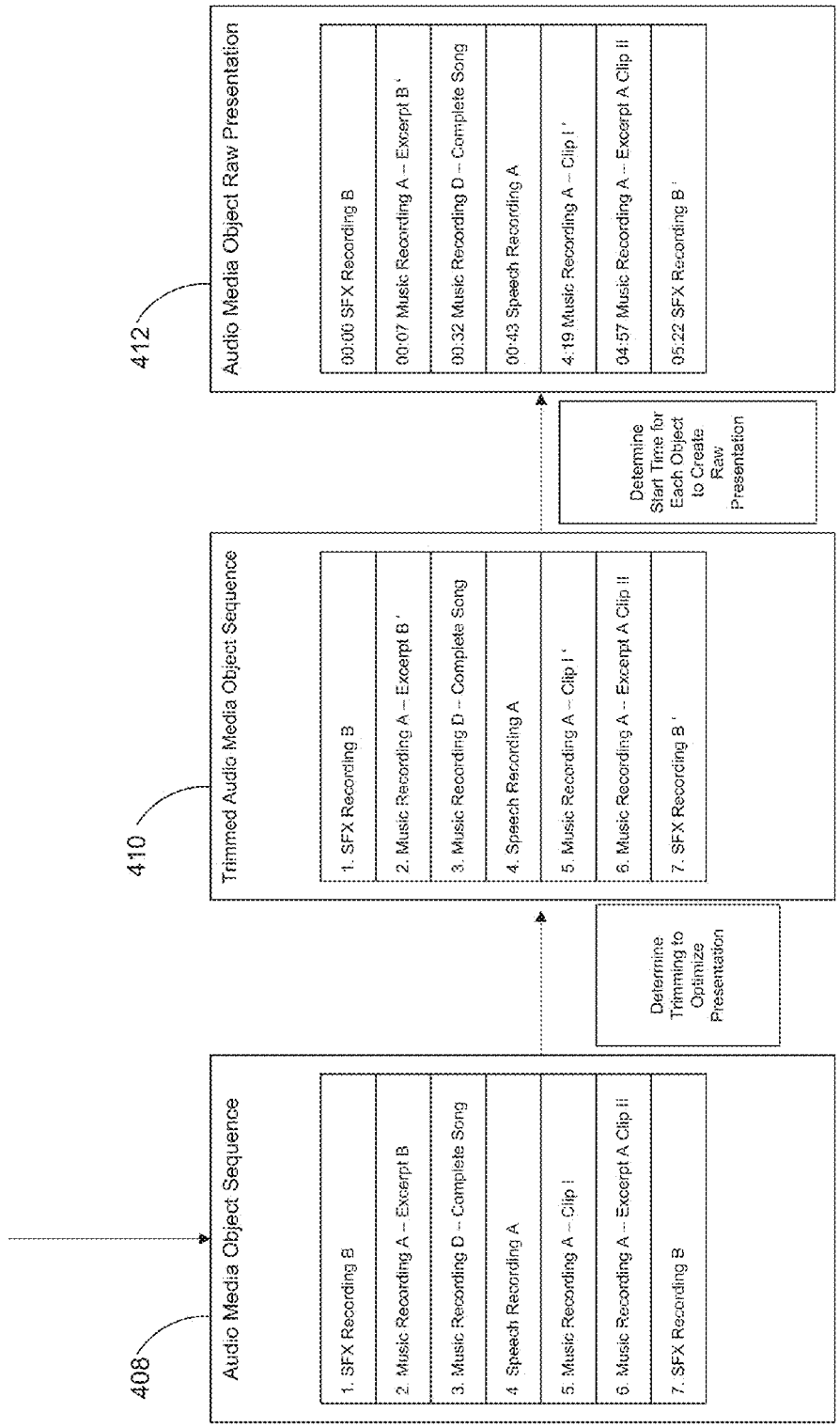
FIG. 4C illustrates a second portion of the process of FIG. 4A.
Figure 5A:
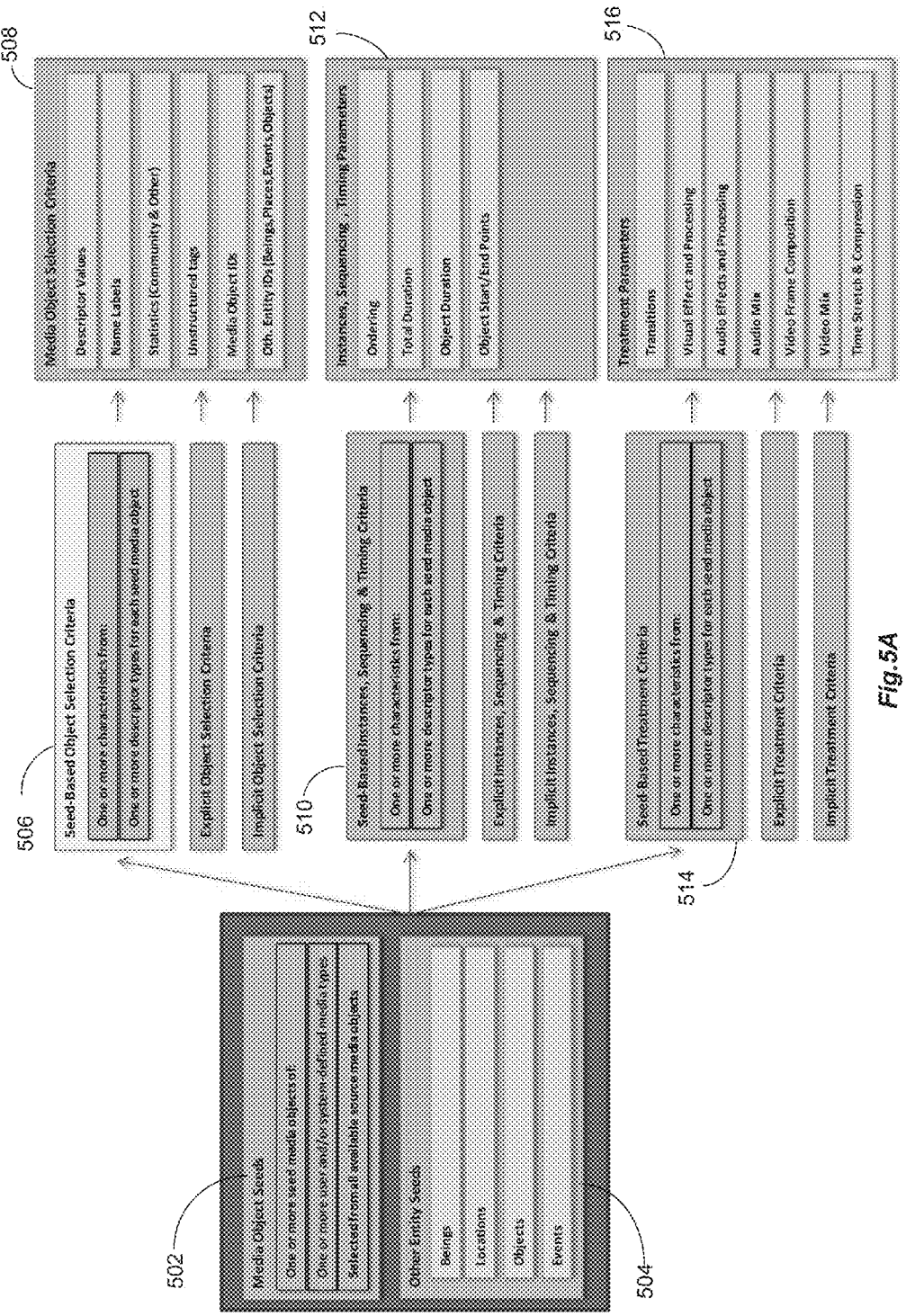
FIG. 5A shows a process for defining presentation criteria and parameters from seeds.
Figure 5B:
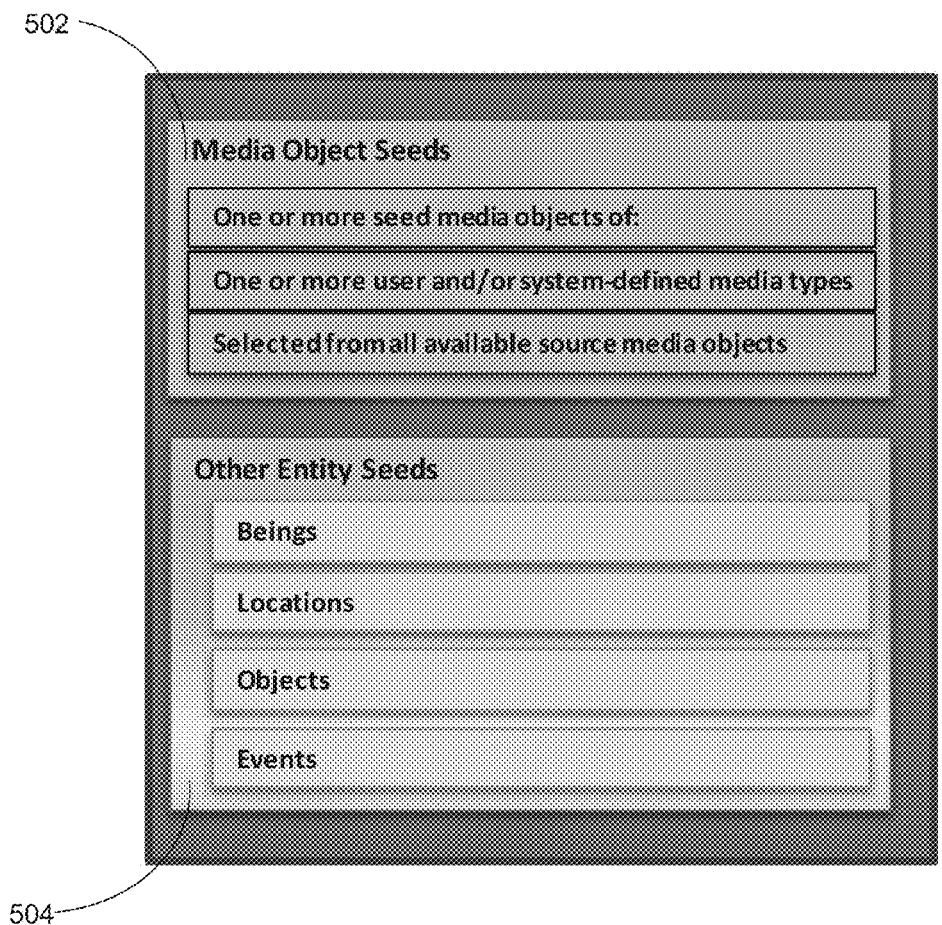
FIG. 5B illustrates a first portion of the process of FIG. 5A.
Figure 5C:
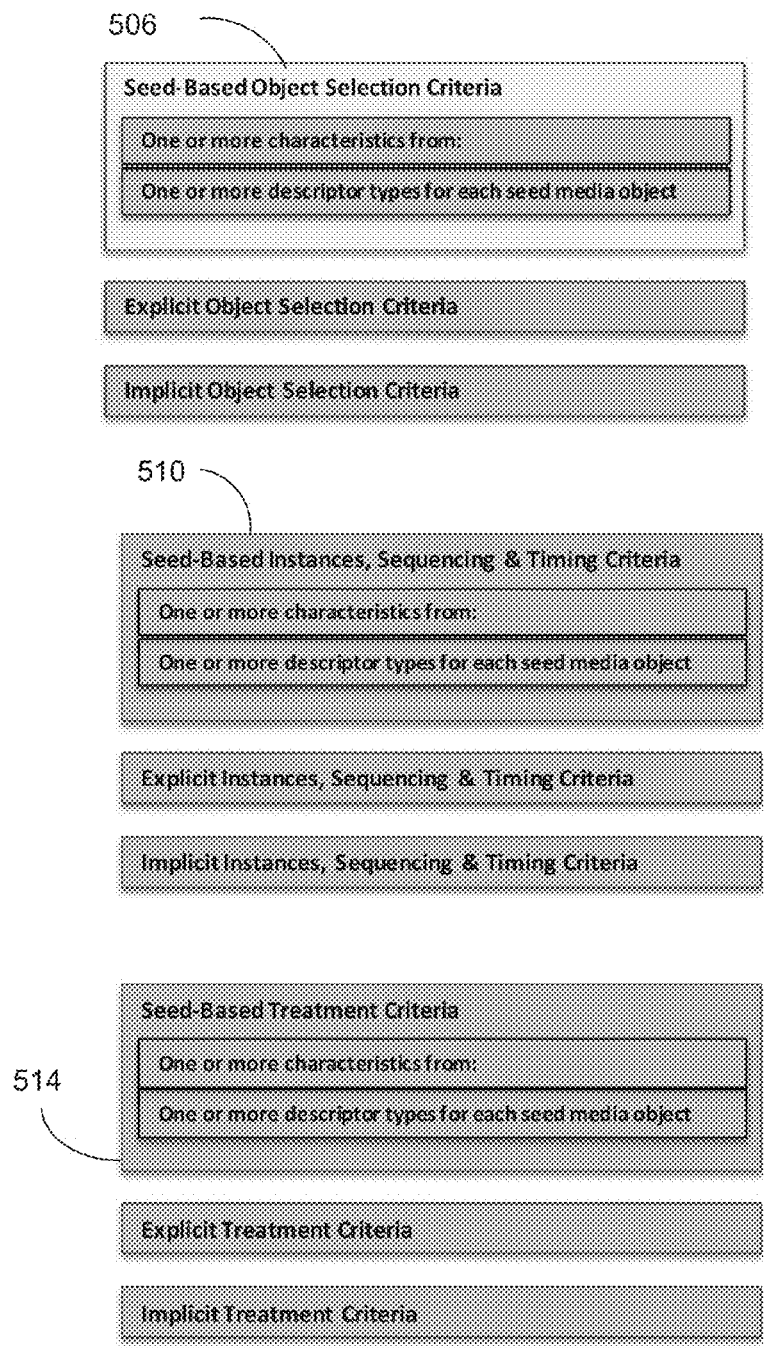
FIG. 5C illustrates a second portion of the process of FIG. 5A.
Figure 5D:
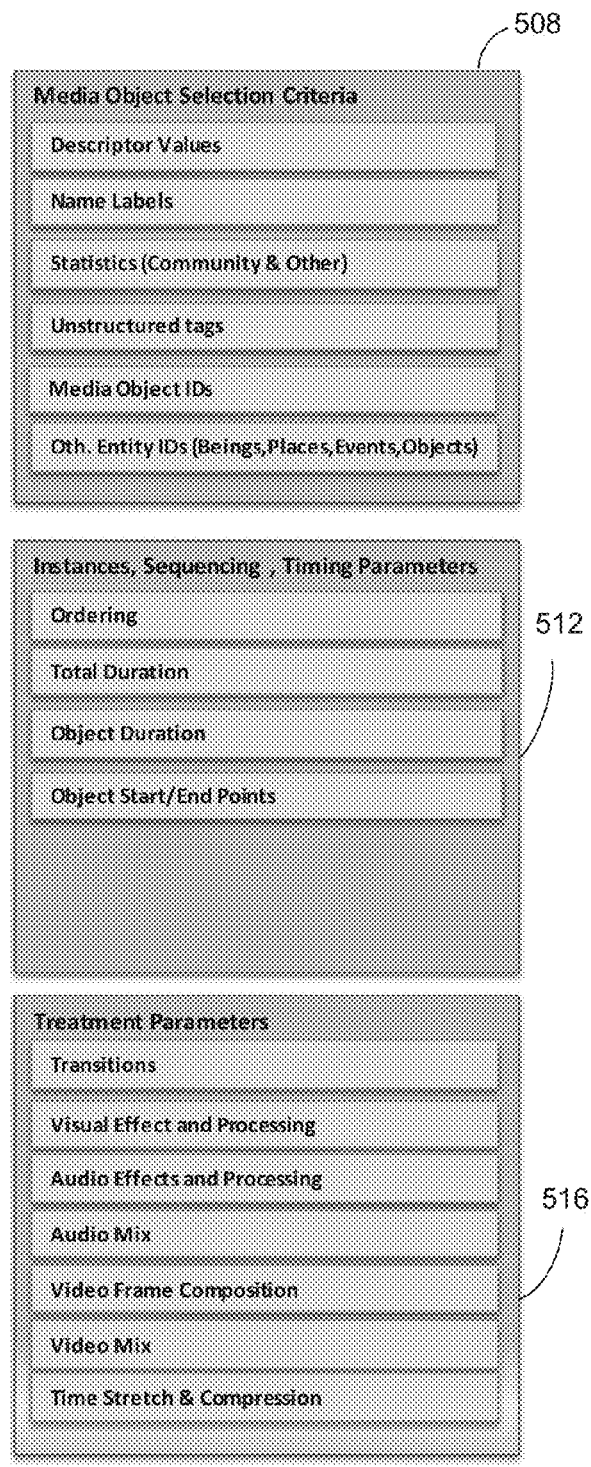
FIG. 5D illustrates a third portion of the process of FIG. 5A.
Figure 6A:
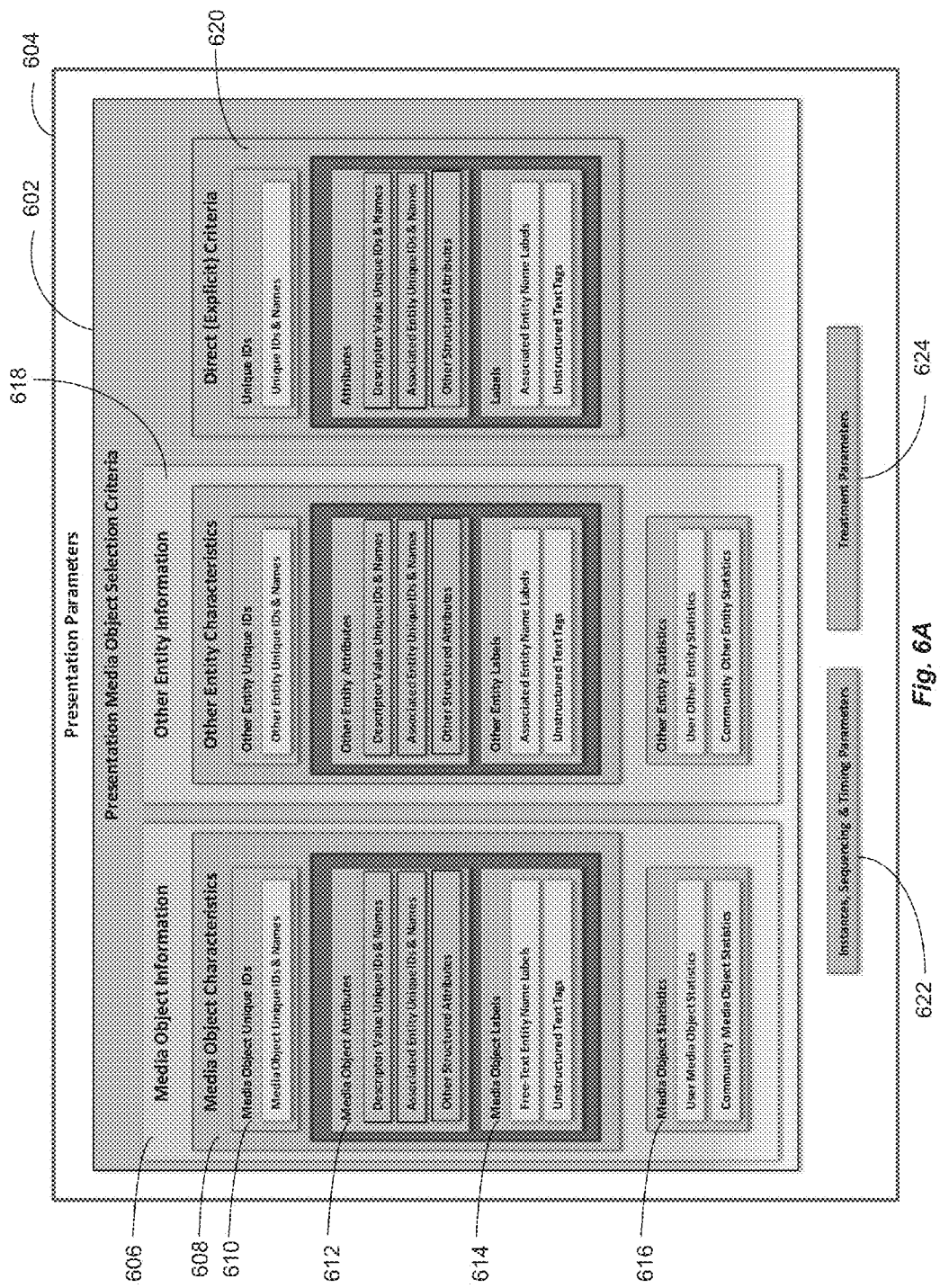
FIG. 6A describes the relationships between the various elements that comprise the presentation media object selection criteria that are a component of the presentation.
Figure 6B:
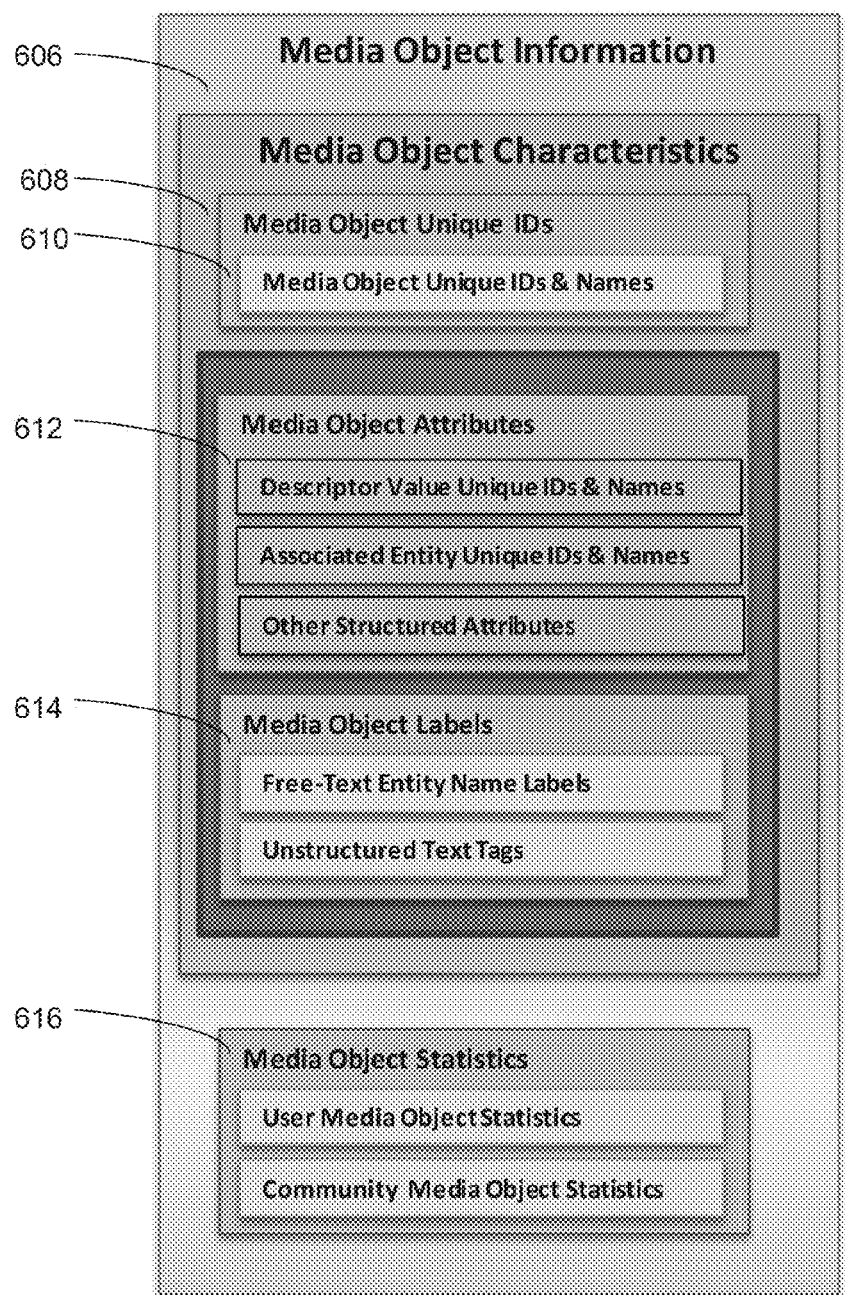
FIG. 6B illustrates a first portion of FIG. 6A.
Figure 6C:
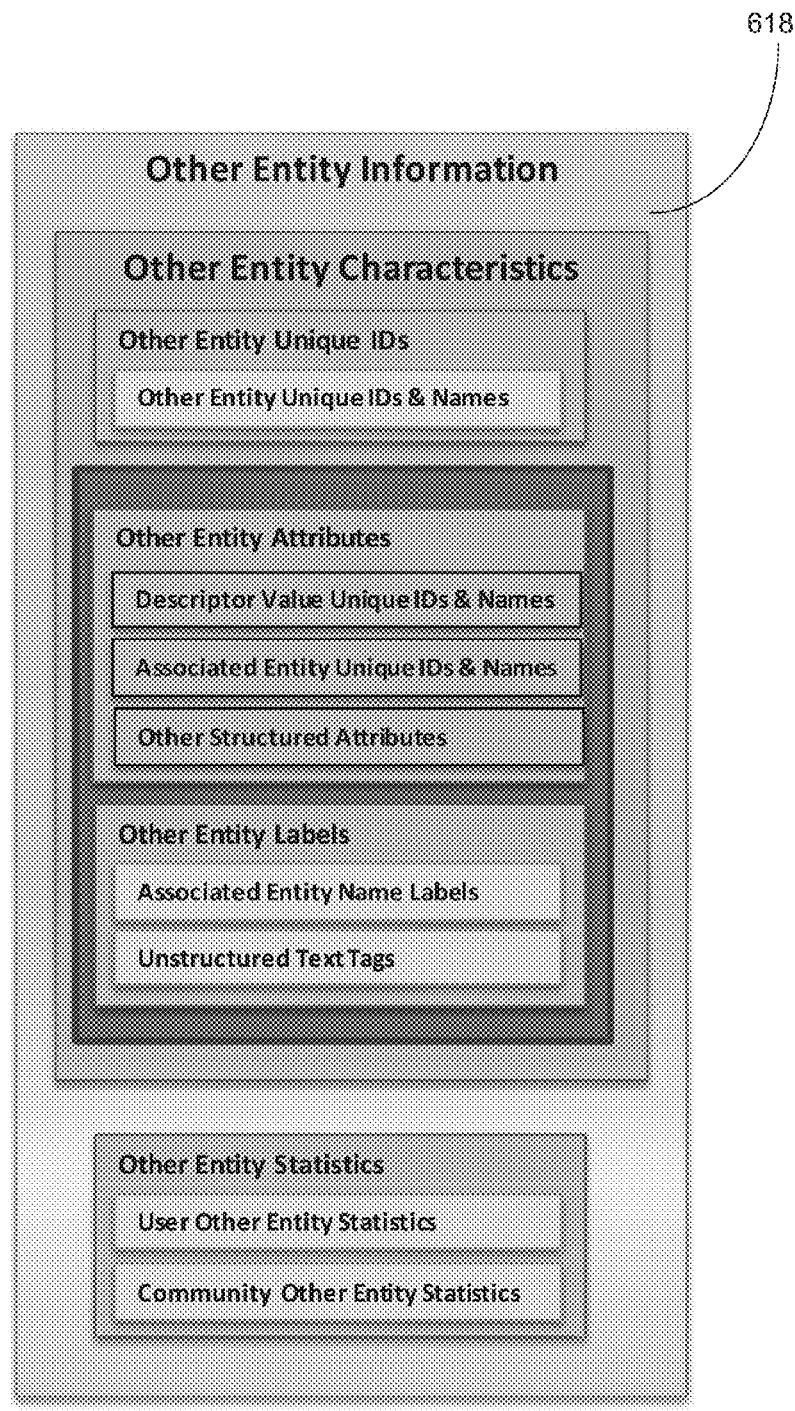
FIG. 6C illustrates a second portion of FIG. 6A.
Figure 6D:
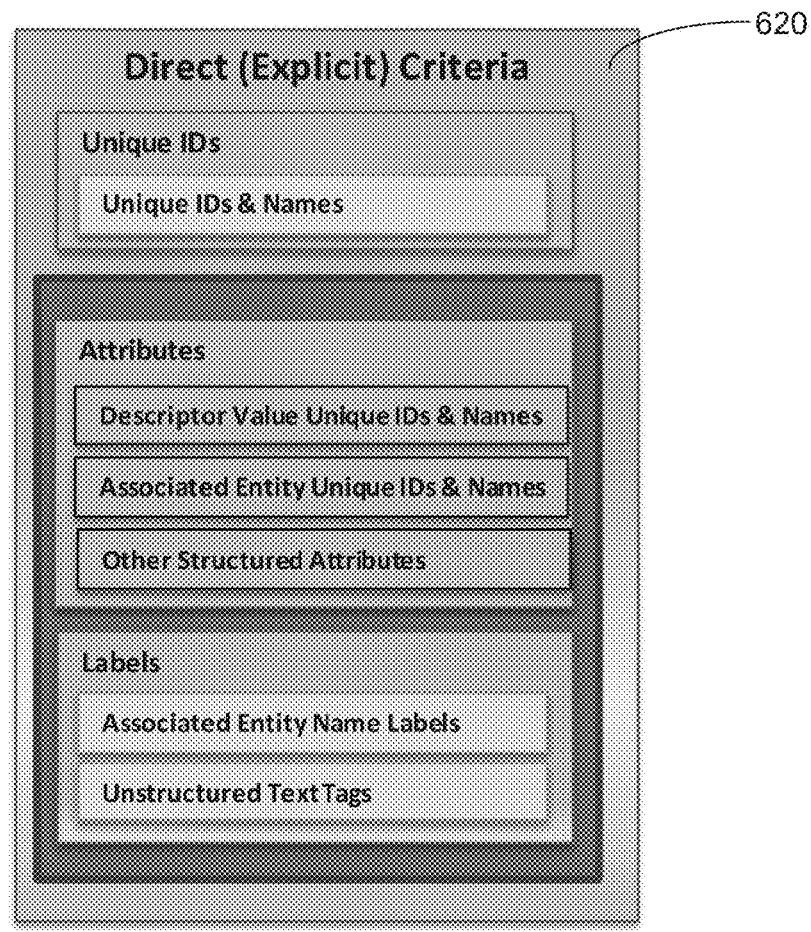
FIG. 6D illustrates a third portion of FIG. 6A.
Figure 7A:
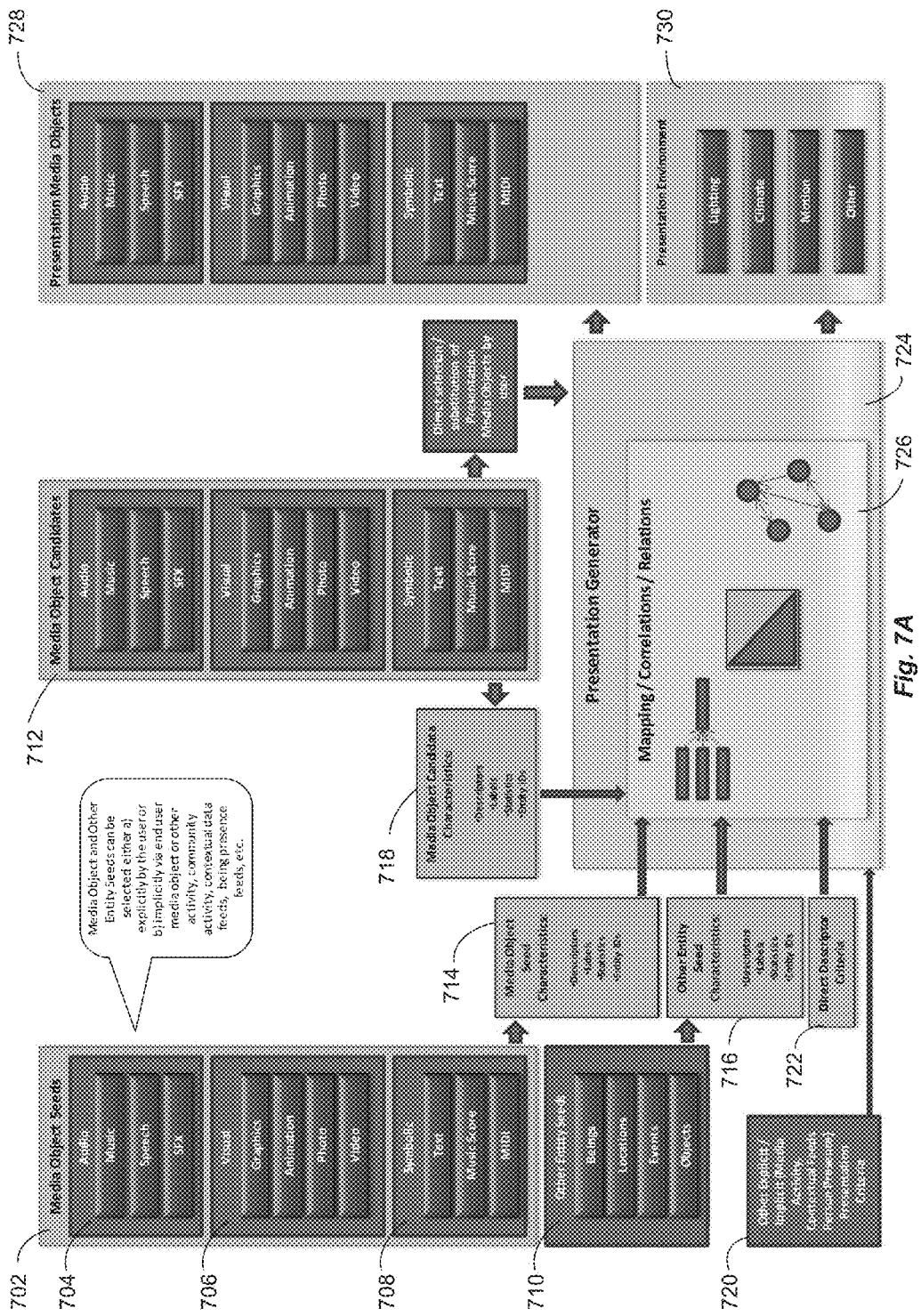
FIG. 7A portrays a process for selection of presentation media objects.
Figure 7B:
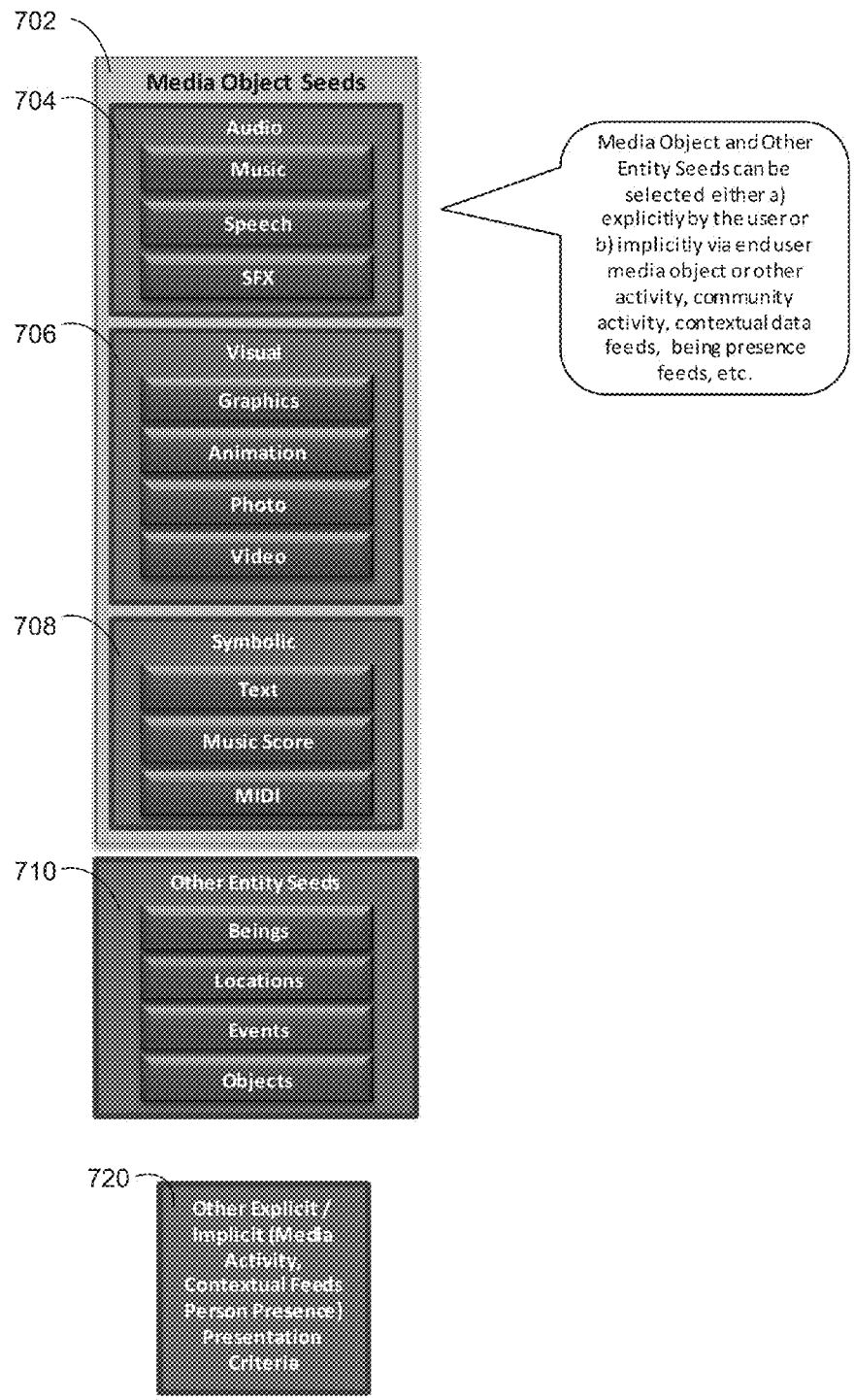
FIG. 7B illustrates a first portion of the process of FIG. 7A.
Figure 7C:
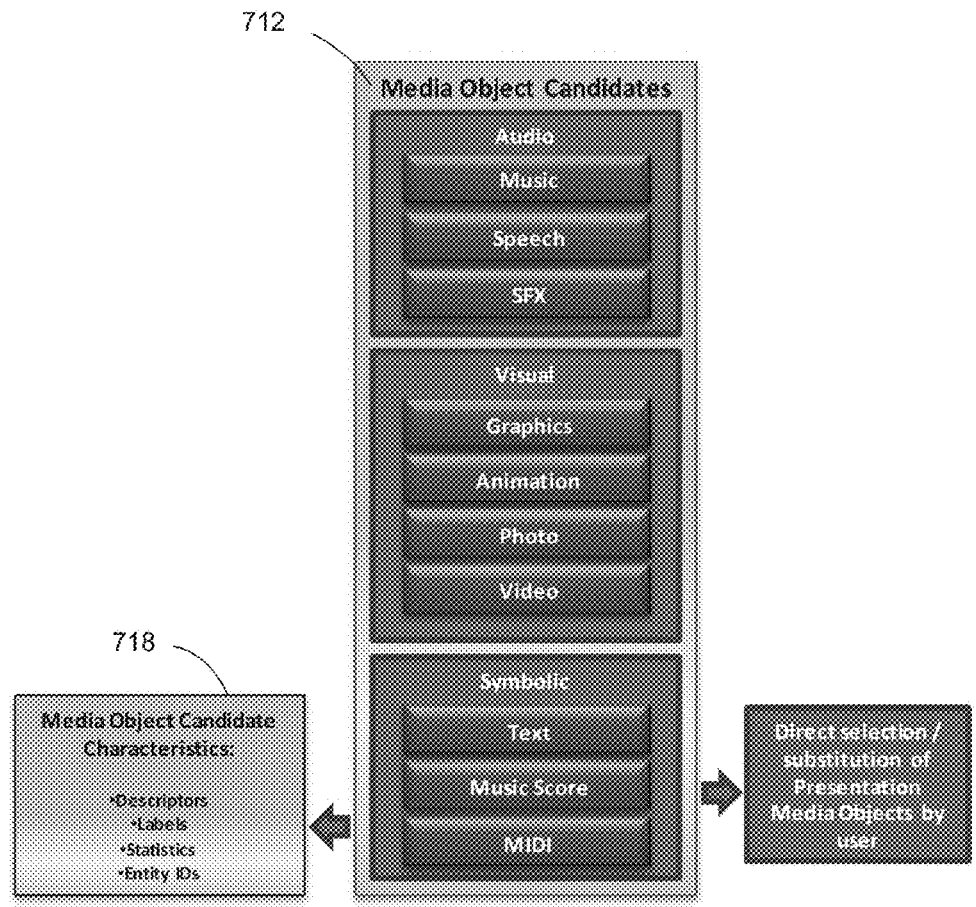
FIG. 7C illustrates a second portion of the process of FIG. 7A.
Figure 7D:
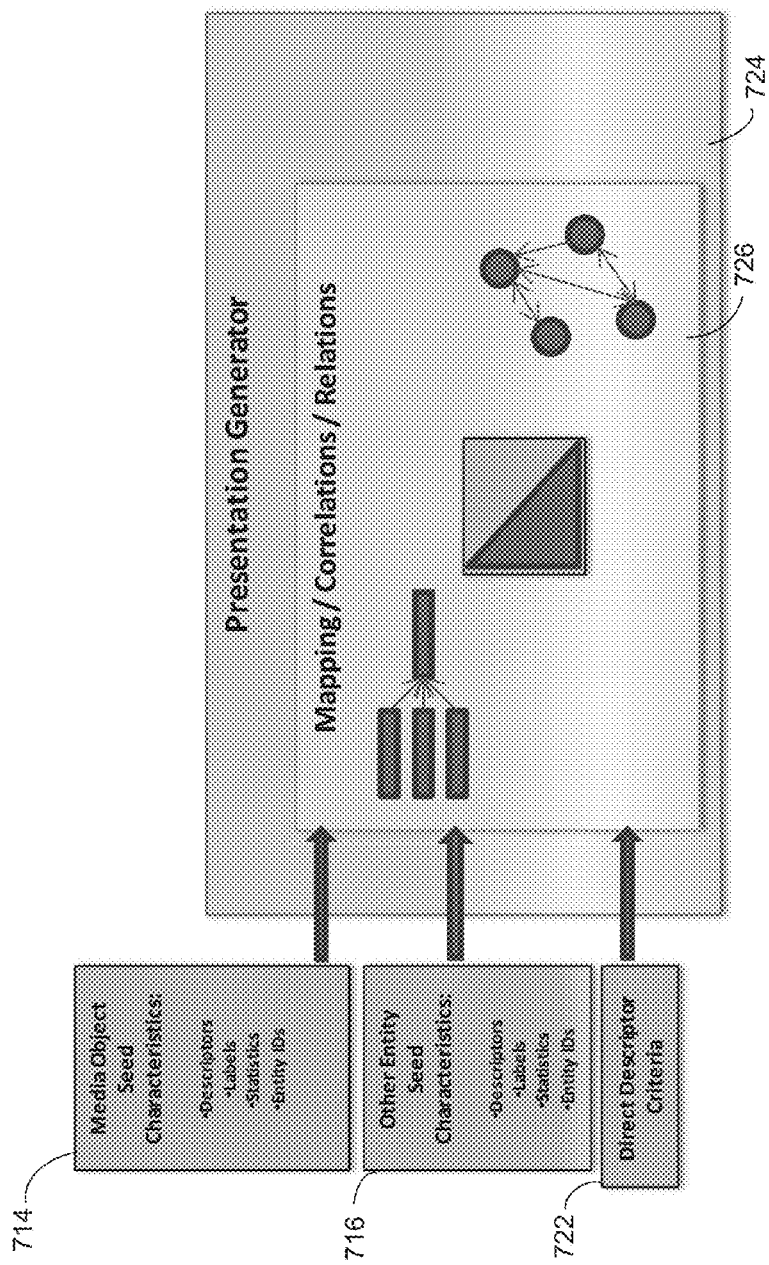
FIG. 7D illustrates a third portion of the process of FIG. 7A.
Figure 7E:
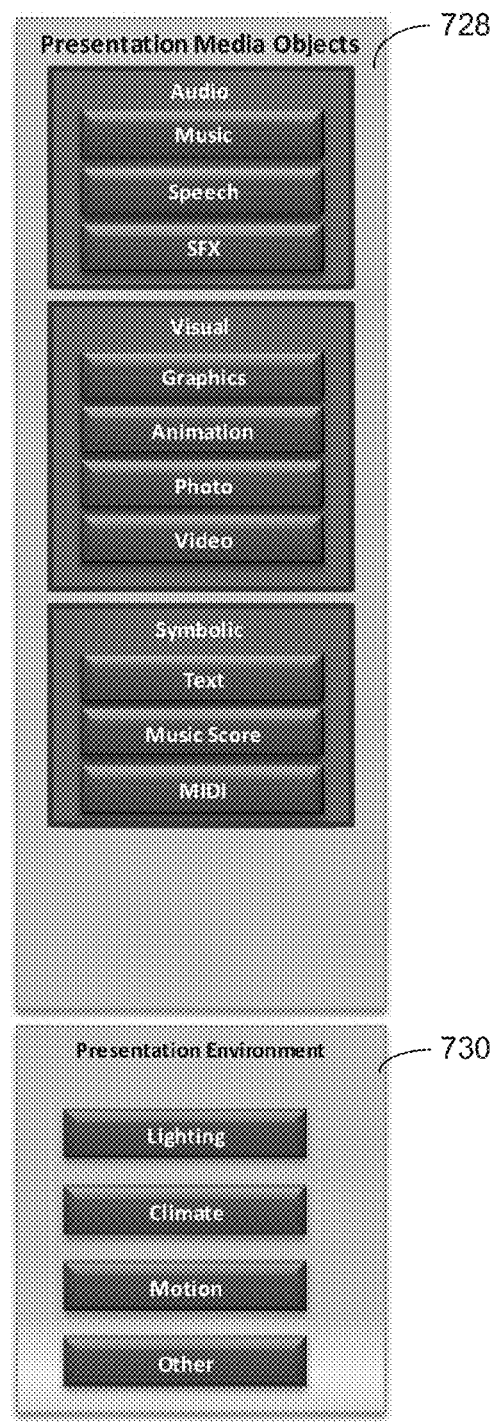
FIG. 7E illustrates a fourth portion of the process of FIG. 7A.

FIGS. 4A-4C illustrate the creation of a media object raw presentation. A media object raw presentation is the basic time-aligned sequence of all media objects in the presentation, but does not yet incorporate presentation treatments such as transitions and the like. A media object raw presentation may be assembled separately for each component media type in the final presentation. By way of example, FIGS. 4A-4C show an example of a process to assemble an audio media object raw presentation. In some embodiments, there are several steps to develop a media object raw presentation.

Source Audio Media Objects:

The source audio media objects set 402 contains all audio media objects available for potential use in the presentation. The source audio media objects may be located in more than one physical location. The source audio media objects may be of various types, including music recordings of a complete song or movement, music recordings of just an excerpt of a song or movement, speech recordings, sound effects (SFX) recordings, and the like. There may be both a complete song and one or more excerpts of the same music recording in the source audio media object. The same may be true for SFX and speech content.

Audio Media Object Candidates:

Complete or clipped audio media object candidates 404 may be selected from the source audio media objects set 402. All or a subset of the source audio media objects may be selected for the audio media object candidate set. Further, one or more clips may be extracted from one or more source audio media objects to create items contained in the audio media object candidate set. In the example, only Clip I is selected from the complete Music Recording A in the source audio media objects for use in the in candidate set. Clip I and II are selected from Music Recording A—Excerpt A of the source media objects. On the other hand, Music Recording A—Excerpt B, Speech Recording A, Music Recording B, Music Recording D, and SFX Recording B are selected for the candidate set in their entirety. SFX Recording A, Music Recording C, and Speech Recording B of the source audio media objects are not selected for the audio media object candidates. These complete or clipped selections may be made based on various criteria that are used to judge appropriateness for the presentation (e.g. to limit the number of unique recordings from a given recordings artist, to exclude recordings with low fidelity, or to clip out applause at the begging and end of a live recording).

Audio Media Object Set:

An audio media object set 406 may be selected from the audio media object candidates 404. These selections may be made based on various criteria as discussed elsewhere, such as similarity in characteristics such as mood or matching a desired topic. In the example, all of the audio media object candidates 404 are selected for the use in the presentation other than Music Recording A—Excerpt A Clip I and Music Recording B. As an optional step, the media objects in the audio media object set 406 may be organized into groups prior to the next step of sequencing.

Audio Media Object Sequence:

The number of instances of each unique audio media object to be used in the presentation and the order in which each media object will occur in the presentation are determined in order to produce the audio media object sequence 408. In the example, SFX recording B is in position 1 as the first media object in the presentation sequence, and also appears again in position 7 as the last media object in the presentation sequence.

Trimmed Audio Media Object Sequence:

Any desired trimming may then be determined in order to produce the trimmed audio media object sequence 410. Given the audio media object sequence 408, at this step any trimming or expansion of the media objects in each of the positions is determined. As with the other clips and excerpts described previously, the trimming may be done by actually producing a new edited file, or the system may just produce edit points which the presentation display application may utilize to render only the appropriate portion of the media object. In the example, Music Recording A—Excerpt B, Music Recording A—Clip I, and SFX Recording B (on the $2^{nd}$ instance in the sequence) are trimmed to create Music Recording A—Excerpt B', Music Recording A—Clip I', and SFX Recording B', respectively.

Audio Media Object Raw Presentation:

In the final step, the audio media object raw presentation 412 is created by determining the actual start time for each media object instance in the presentation sequence. For example, Music Recording D begins playback at 32 seconds into the presentation.

Inputs and Parameters

Various inputs may be used to generate the output audio-visual presentation. These inputs include media object seeds, other entity seeds, direct descriptor criteria, other explicit and implicit criteria, and direct selection or substitution of presentation media objects by user. Any combination of media object types may be used as seeds to generate a presentation of any combination of media object types FIGS. 5A-5D illustrate presentation inputs and parameters that may be controlled by these inputs. Seeds, which will be discussed further below, may produce a variety of different types of presentation criteria and parameters. FIGS. 5A-5D show a process for defining presentation criteria and parameters from seeds.

Object Selection Criteria Input:

The media object seeds 502 and other entity seeds 504 may have one or more characteristics or one or more characteristic types associated with each of them that can be used as media object selection criteria input (e.g., seed-based object selection criteria 506). Additionally, there may be other explicit and implicit object selection criteria provided by the user or system.

Media Object Selection Criteria:

The media object selection criteria input (e.g., seed-based object selection criteria 506), which may be explicit or implicit, produces a set of media object selection criteria 508. Examples of such criteria include descriptor values, name labels, statistics (community and other), unstructured tags, media object IDs, and other entity IDs.

Instances, Clipping, Sequencing and Timing Criteria Input:

The media object seeds 502 and other entity seeds 504 may have one or more characteristics or one or more characteristic types associated with each of them that can be used as instances, clipping, sequencing and timing criteria input (e.g., seed-based instances, sequencing & timing criteria 510). Additionally, there may be other explicit and implicit instances, clipping, sequencing and timing criteria provided by the user or system.

Instances, Clipping, Sequencing, Timing Parameters:

The instances, sequencing and timing criteria input (e.g., seed-based instances, sequencing & timing criteria 510), which may include clipping criteria and which may be explicit or implicit, produces a set of instances, clipping, sequencing, timing parameters (e.g., instances, sequencing, timing parameters 512). Examples of such parameters include ordering, total duration, object duration, and object start/end points.

Treatment Criteria Input:

The media object seeds 502 and other entity seeds 504 may have one or more characteristics or one or more characteristic types associated with each of them that can be used as treatment criteria input (e.g., seed-based treatment criteria 514). Additionally, there may be other explicit and implicit treatment criteria provided by the user or system.

Treatment Parameters:

The treatment criteria input (e.g., seed-based treatment criteria input 514), which may be explicit or implicit, produces a set of treatment parameters 516. Examples of such parameters include transitions, visual effects and processing, audio effects and processing, audio mix, video frame composition, video mix, and time stretch and compression.

Presentation Media Object Selection Criteria

FIGS. 6a-6d describe the relationships between the various elements that comprise the presentation media object selection criteria 602 that are a component of the presentation parameters 604. The presentation media object selection criteria 602 are used to select the media objects used in the presentation. These criteria are comprised of media object information 606, other entity information 618, and direct (explicit) criteria 620.

Media Object Information:

Media object information 606 is information associated with a media object. This information may include media object characteristics 608 and media object statistics 616. Any combination of expert editorial, community submitted, crowd-sourced, user activity statistical, community activity statistical, user explicit input, web mined, digital signal processing (DSP) analysis, and semantic analysis data may be used as sources for media object information. Media object information may or may not be distinct from the media object itself.

Media Object Characteristics:

Media object characteristics 608 are media object information that describes the media object. Media object characteristics may be either structured attributes or labels.

Media Object Unique IDs:

Media object unique IDs 610 are unique strings used to uniquely identify a particular media object.

Media Object Attributes:

Media object attributes 612 are structured media object characteristics that describe the media object. Examples of media object attributes include descriptor value unique IDs and names and associated entity unique IDs and names.

"Descriptor value unique IDs" are an ID string that is used to uniquely identify a descriptor value. "Descriptor value names" are human-readable labels that describe the descriptor value. Some descriptors of audio media objects may include the size of the audio file, recording artist, composition name, duration of the recording, weighted rhythmic patterns identified in the recording, one or more moods, genres, eras, artist types, instruments, vocal styles, spectral flatness, or various other characteristics. For example, the "mood descriptor" as will be discussed later includes one or more variables that typically result in a listener having an identifiable emotional perception of, or response to, a media object such as an image, video or an audio recording. Some descriptors of visual media objects may include, for example, the date created, size of the image, artist's name, artistic technique, era, genre, general color scheme, visual contrast, mood contrast, hue, texture, luminance, saturation, or various other characteristics. For example, a saturation characteristic as used herein includes one or more dominant color tones in a visual media object. In order to facilitate determining characteristic congruency of two media objects, media objects may be annotated in advance with one or more attributes and/or labels.

"Associated entity unique IDs" and "associated entity names" uniquely identify and label other entities in the same fashion, such as beings, location, objects and events that are associated with the media object.

Media Object Labels:

Media object labels 614 are unstructured labels and names associated with a media object. "Free-text entity name labels" are strings associated with a media object that label the object, but are not part of a normalized entity ID system. "Unstructured text tags" are free-text tags associated with a media object that describe the object and are not part of a structured descriptor or attribute system. For example, a visual work may be tagged with "sunrise," "beach," "running," or "dog." An audio work may be tagged as "love song," "Dallas," or "road trip favorite." These unstructured labels and names may be created by a user.

Media Object Statistics:

Media object statistics 616 are statistical data that is associated with a media object such as popularity, social filtering, individual user activity logs and summaries, and other community or web-mined data. "User media object statistics" are associated with the specific end user. "Community media object statistics" are derived from the activity or nature of a broader community of users.

Other Entity Information:

Other entity information 618 is parallel in nature to media object information, with the difference being that it is associated with other (non-media object) entities such as beings, locations, objects and events. Other entity characteristics identify or describe other entities. For example, a family member or a friend may each have their own characteristic set, as could a current or past home location or vacation spot or a personal event. As an additional example, a public entity might be a music-recording artist and an actor (real being), each of which have a unique palette associated with them in addition to basic attributes. Other entity statistics provide statistical information about other entities.

Direct (Explicit) Criteria:

Direct (explicit) criteria 620 is characteristic data that is provided directly as input, rather than being identified via association with a seed media object or other entity.

Presentation Media Object Selection Process

FIGS. 7A-7E portray a process for selection of presentation media objects.

Media Object Seeds:

One or more media object seeds 702 may be selected from all available media objects either explicitly by the user, implicitly via end user media object or other activity, community activity, contextual data feeds, being presence, and the like, or by the system via other methods. Media object seeds 702 may be of any media type including audio, visual, and symbolic. Audio media object seeds 704 may be of any type including music, speech or SFX. Visual media object seeds 706 may be of any type including graphics, animation, photographic, or video. Symbolic media object seeds 708 may be of any type including text, music score, or MIDI.

Other Entity Seeds:

Seeds may also be in the form of other entity seeds 710. Other entity seeds are other personal and public (non media object) entities, which may be used as seeds or thematic inputs, including real and fictional beings, locations, events, and objects. Just like media objects, other entities may have an associated characteristic set.

Media Object Candidates:

Media object candidates 712 are all of the media objects that are available for use in the presentation. These may or may not include some or all of the seed items. Media object candidates may be of any media type including audio, visual and symbolic.

Characteristics:

As described above with reference to FIG. 6, media object seeds may have various types of media object information, and specifically, media object characteristics 714, associated with them. Other entity seeds may also have various types of information, and specifically, other entity seed characteristics 716, associated with them. In addition, media object candidates may have various types of media object information, and specifically, media object characteristics 718, associated with them. This information may be used by the presentation generator application, along with other input, to produce the audiovisual presentation. Elements of the media object information, other entity information, and media object candidate information may be sourced from any combination of the media object itself, a locally stored media information source or a remote media information source, or determined at the time of presentation generation. For example, a characteristic may store information with the media objects or a characteristic may reference a pointer directed to an address or location of the stored information such as, for example, a database for storing media object information accessible by the reference pointer.

Other Explicit/Implicit Presentation Criteria:

In addition to media object and other entity seeds, other explicit and implicit presentation criteria 720 may be provided to, and utilized by, the presentation generator. Examples of such criteria include user media activity history, contextual data feeds, and person presence.

Other Parameters:

The user or system may define the mix of personal versus personal network versus public content to include for each element of the presentation.

Contextual Data:

Real-time contextual data feeds can be used as input: for example, date, day of week, month, season, temperature, geo-location, personal presence, and so forth.

Presence Data:

The unique combination of audience members (personal presence) present for the presentation may be used as criteria (e.g. select just photos or music that they are in, or just photos or music that day enjoy) for generating presentation elements.

Profiling and Personalization:

Profiles associated with individuals or groups of individuals may be used as input data for the presentation. For example, a user's personal listening history could enable the selection of music that he actually listened to at the same time period that a seed photo was taken (e.g., a photo of summer camp in 1974 automatically associates a sound track of the music that the same user actually listened to in the summer of 1974.). Or historical implicit and or explicit personal preferences for certain types of images, image content or image topics may be taken into consideration in the selection of presentation images. Audio media objects could be selected for the presentation based on the music preferences of the persons whose images are in the seed visual media objects for the presentation. Or preferences for specific media types and/or attributes may be inferred from age or family role information in the profile. The system may know and make use of the current age of the user or member of the user personal network to project their age forward or backward in making presentation element selection decisions.

Sequencing:

The user can define whether the timeline or chronologically annotated media objects move forward or backwards during the presentation.

Direct Descriptor Criteria:

The user or system may define which specific media object information for specific or all media objects is to be used as input data for specific elements of the presentation. The user or system may provide direct descriptor criteria 722. Whereas in the case of media object seeds 702 and other entity seeds 710, where the seed object often provides information to the system via its associated media information, and in particular characteristics and descriptors, the user or system may provide such descriptor values directly as criteria. For example, the user may request a presentation be generated based on a visual mood descriptor value of "Melancholy." Further, as another example, one or more photographs or album cover visual media objects could be used purely to define a palette which could then be used to either select other visual media objects, or to define a visual treatment applied to other visual media objects. Other characteristics of the media objects (e.g. genre, time period, or artist IDs) may then be ignored.

Presentation Generator:

The presentation generator 724 produces an audiovisual presentation script. The presentation generation application, such as 214A, 214B, and 314 of FIGS. 2A, 2B, and 3 respectively, can perform the functions of the presentation generator 724. The presentation generator 724 may utilize information provided by use of the relational information, as well as direct selection or substitution of presentation media objects in the process of creating the presentation.

The presentation generator may use relational information 726 (hierarchies, mappings, correlations, relational links, and the like that may be used to relate, compare and associate various media objects and other entities with one another) to create the presentation and generate the presentation script. The relational information may be of various types, providing information about the relationships between various entities, characteristics, and so forth. Entity IDs and characteristic values of the seed media object characteristics are compared to those of the media object candidates as part of the process of creation the presentation. The presentation generator may also use other presentation parameters.

Presentation Script:

In some example embodiments, the presentation script may be generated in its entirety before the presentation is viewed. In some other example embodiments, the generated presentation script may be generated on-the-fly. Referring back to FIG. 2A, the generated presentation script may be dynamically generated and streamed from the server 220A to the processing system 210A which then uses it to render the presentation utilizing the media object sources in the processing system 210A. Alternatively, the presentation generator may render a complete presentation packet to the presentation device, which also contains specified media objects, if they are available to be so packaged. In some embodiments, one or more presentation scripts may be generated by the presentation generation application and then stored, to be used at a later time by a presentation display application to actually render/show the presentation.

In an example embodiment, the generated presentation script may be a composition of identifiers and reference markings across a timeline with a first set of identifiers relating to the audio media objects, and a second set of identifiers related to a visual media objects. The timeline may be constructed in relation to the play length of an audio media object or a plurality of audio media objects. For example, when executing the presentation at the processing system 210A, the generated presentation script uses the identifiers to select audio media objects from the audio media object source 212A for audible play while simultaneously selecting the visual media objects from visual media object source 216A for display at associated reference markings of the timeline.

Media Object Identifiers:

As mentioned above, audio media objects and visual media objects may include identifiers (e.g., fingerprints) to identify the audio media objects and visual media objects. These identifiers (e.g., fingerprints) may be small files (e.g., pointers) that permit recognition of an audio media object or visual media object for generating the presentation without transferring the entire audio media object or visual media object. The presentation generator may be able to generate the presentation script using the identifiers and characteristics. In some embodiments, media object identifiers may be created by the application 214A when the media object is processed.

Presentation Media Objects:

Referring back to FIGS. 7A-7D, the presentation generator 724 outputs a presentation script that may define the presentation media objects 728 to be presented in the presentation. The presentation media objects may be of any type, including audio, visual, and symbolic. Note that there may be multiple presentation media objects 728 presented during a single media object seed 702 or a single presentation media object 728 presented during multiple adjacent object seeds 702.

Presentation Media Object Synthesis:

The presentation generator 724 may also incorporate modules to synthesize music, images, palettes or other media objects for incorporation into the presentation based on input (e.g., mood characteristics) in addition to simply selecting from existing media objects.

Presentation Environment:

The presentation script may also include commands to control various presentation environment elements 730 as part of, and potentially synchronized with, the audio-visual presentation. Examples of presentation environment elements 730 include lighting, climate, motion, and other controls.

Dynamic Updating:

A presentation may be updated by a user at a later time or successively over their lifetime. Increasing knowledge by the system allows it to refine the selection, editing or tuning the presentation media object set as time passes to ensure it remains appropriate. The user may have a connected digital media device that has several themes set (e.g. a family member, a friend, a mood, a location, a topic, etc.); the current presentation is continuously or periodically dynamically updated with the most current available media objects and metadata. A dynamically updated presentation can be created where the current presentation elements are based on live data feeds. For example, "Current Season" would dynamically select personal and/or public images taken during, or associated with, that particular season (e.g. autumn) in the past. "Audrey" would dynamically select images and music associated with the current location of family member Audrey (e.g. Paris), using geo-location data services or manually.

Characteristics Determination

Determination of Media Object Characteristics:

In example embodiments, media object characteristics can be determined via user submission, community submission, expert editorial, or other sources. In some embodiments, the system may also determine media object characteristics. As an illustration, FIG. 2A will be referenced. In an embodiment, the characteristics may be created when the audio media objects and visual media objects are processed by the presentation generation application 224A at a server 220A or by an application 214A at the processing system 210A. In some embodiments, the pattern of audio media object characteristics and the pattern of visual media object characteristics may be used as an identifier for the visual media objects and audio media objects. In some embodiments, the audio media object characteristics and visual media object characteristics are determined at the processing system 210A and transmitted to the server 220A, while in other embodiments, the characteristics are determined at the server 220A. In some embodiments, the presentation generation application 224A may receive the identifiers and characteristics from the processing system 210A, from the media object information 222A, or any combination thereof.

Determination of Mood Profile:

In an example embodiment, mood as a characteristic is used when creating the audio-visual presentation. patent application Ser. No. 12/489,861 titled "Methods and Apparatus For Determining A Mood Profile Associated With Audio Data" describes determining a mood profile for audio media objects. FIG. 8A is an example flow diagram of a method 800, in accordance with an example embodiment, for determining a descriptor profile of the media objects. In an embodiment, the method 800 may be performed by the servers 220A, 220B of FIGS. 2A and 2B, respectively (but could also be performed at least in part by the processing system 210A or 210B). The example embodiment below describes the determination of a mood descriptor profile of audio media objects. The mood characteristic of visual media objects may also be determined in a similar method or may be created by a single, or group of, end users and/or experts.

In the method 800, the low- and mid-level features are extracted by known DSP methods and extract features such as mel-frequency cepstral coefficients (MFCC), spectral flatness, mean value, zero crossings, spectral centroid, chord class, and percussiveness, among other extractable features known in the art. Various digital signal processing feature extraction methods and standards (e.g. MPEG-7) known in the art may be utilized. These features of the audio media objects 808 are compared at a trained mood classifier 806. In an example embodiment, a first set ("training data set 802") of audio media objects are used to establish reference standards ("mood classification models") relative to identified criteria, and those mood classification models are then used for evaluating a mood of the population of audio media objects.

Mood Training Data:

In the example embodiment, a training data set 802 comprises one or more audio files (e.g. a recording of a musical composition) and a set of editorially formed mood profiles corresponding to each of the one or more audio files. For example, in an example embodiment, the mood profiles for the training data set 802 are defined by one or more persons or aggregated from many persons who evaluate each recording and select, rank, or score one or more mood categories for that recording. In other example embodiments, the mood profile for the training set may be generated from analysis of aggregated end-user and/or editorially-generated tags or prose associated with the content, or other data mining methods applied to data sets whose origin may be independent of the training process. The editorially formed mood profiles are shown by way of example to have 'n' mood categories, where 'n' is an integer equal to or greater than 1. Examples of editorially formed mood categories include "sentimental," "somber," "melancholy," "eerie," "happy," "relaxed," "hopeful," and so on. In some example embodiments, many granular, editorial-formed mood categories may be mapped to broader, more inclusive, mood categories, thereby requiring less memory and processing to perform both the classifier training and a mood congruency analysis.

Mood Classifier Training:

Audio files for the training data set 802 may be randomly selected or may be hand-picked to provide adequate dimension and granularity across the 'n' mood categories when determining a mood profile of the audio media objects at the classifier 806. A trainer 804 receives the training data set 802. At the trainer 804, the one or more audio files of the training data set 802 are decoded and analyzed to extract low- and mid-level features. In an example embodiment, these extracted features are evaluated against, and correlated with, the editorially assigned mood categories to create 'n' number of mood classification models, one for each of the 'n' mood categories. Accordingly, in this example embodiment, each mood classification model is a correlation set of a mood category with extracted features typical of that mood category. The trainer 804 then submits these mood classification models to the classifier 806, where the models serve as a basis for comparison and reference standard for determining the mood profile 810 of audio media objects 808.

Mood Profile Creation:

The classifier 806 receives the audio media objects 808 to be evaluated and extracts low- and mid-level features of the audio media objects 808 for comparison with the model profiles available at the classifier 806. By comparing similarities between the extracted features of the audio media objects 808 to the features corresponding to the 'n' model profiles, the classifier 806 automatically populates a mood profile 810 across 'n' mood categories and assigns a value for each mood category based on the similarity. An example of these assigned values is depicted in FIG. 8B. In an example embodiment, the classifier 806 is a Gaussian Mixture Model (GMM)-based classifier capable of establishing the scores across 'n' mood categories to create the mood profile 810. In an embodiment, the mood profile may comprise 100 or more mood categories. Thus, in an example embodiment, the classifier 806 can analyze and identify a mood profile 810 for a large collection of audio recordings using the audio training data set 802 (e.g., a plurality of audio recordings having various associated mood profiles).

Example Mood Profile:

FIG. 8B illustrates an example of a mood profile table 820 to store mood profiles 810 for media objects. In the example below, a mood profile table 820 for an audio media object is illustrated. For example, the mood profile table 820 shown in FIG. 8B may provide a mood profile 810 for a particular recording. Accordingly, further (or larger) mood profile tables 820 may be provided for other audio recordings.

The mood profile table 820 may store the mood profile 810 and, accordingly, may be generated by the method 800. In an example embodiment, the mood profile table 820 is populated with a plurality of confidence values or "scores," with each score corresponding to a mood category. These confidence values or "scores" are computed from a statistical and/or probability analysis describing the likelihood that a person listening to an audio media object (e.g. a music recording) would perceive the particular mood.

The mood profile table 820 of FIG. 8B has a first data column 822, which includes the mood categories 826, and a second data column 824, which includes the scores 828, with each score 828 corresponding to a mood category 826. Each score 828 is an evaluation of a corresponding mood category 826 for an associated audio recording. In at least some example embodiments, the evaluation scores 828 provide a basis for comparison and at least partial distinction between the mood categories.

Mood Profile Digest:

Each mood category 826 and its associated score 828 forms an element 830 of the mood profile 810 of an audio recording represented in the mood profile table 820. One or more (or part of) elements 830 of the mood profile 810 may establish a mood profile digest. In an example embodiment, the mood profile digest may be defined by the applications 214A and/or 224A of FIG. 2A when determining mood congruency. The mood profile digest is a compact representation of the mood profile 810, and may be derived from the mood profile 810 using a variety of algorithms. In an example embodiment, the mood category 826 having the highest score 828 defines a primary element of the mood profile 810. The mood profile 810 may also have one or more secondary categories that are assessed with lower scores. Thus, a mood profile digest may be derived from any one or more elements 830 of the mood profile 810. In some example embodiments, the mood profile digest, as established by the application 214A or 224A when determining mood congruency, may consist solely of the primary element or may comprise a subset of mood elements 830 of a mood profile. In an example embodiment, the subset includes the 'n' number of mood elements 830 with the highest associated scores in the mood profile 810. Another example embodiment uses dimensionality reduction techniques such as principal component analysis (PCA) to reduce the mood profile 810 to a smaller number of magnitudes along dimensions in a reduced meta-mood vector space. When determining mood congruency, a first mood profile digest of a first audio recording, and a second mood profile digest of a second audio recording may have an equal number of elements 830. The number of elements 830 in a mood profile digest may depend upon the granularity (e.g., preferred or needed) for use by an application 214A or 224A, and may also be bound by the storage capacity and processing power of processing system 210A and server 220A.

In an example embodiment, the mood categories 826 identify moods such as "sensual," "melancholy," or the like. Further example moods M3, M4, through M(n–1) and M(n) may be provided. The second data column 824 contains various scores 828 corresponding to associated mood categories 826. For example, the mood "sensual" is shown to have an assigned score of 99, while the mood "melancholy" is shown to have an assigned a score of 25. Although not fully populated, in the example mood profile 810 defined in the mood profile table 820, the mood "sensual" has the highest score (shown by way of example to be 99) and, accordingly, is thus the primary element of the audio recording. In an example embodiment, the mood scores 828 are scaled so that the sum of the mood scores 828 assigned in a mood profile 810 of an associated audio recording add up to 100.

It is to be appreciated that analysis on a particular audio recording may identify a limited number of moods in the audio recording. For example, although there may be a substantial number of reference mood categories (e.g., 100 mood categories), analysis of an audio recording may identify just 12 significant, different moods. In an example embodiment, only a limited number of moods may be associated with a particular audio recording; for example, only the top ten (or fewer) moods may be associated with the particular audio recording. In an example embodiment, selected mood values may be estimated. When mood categories are communicated to a remote media client (e.g., a media client on a media player), only a limited number of identified moods (e.g., ten moods) may be communicated to the remote media client to facilitate processing at the remote media client.

Characteristics Comparison

Use of Seed Media Object Characteristics:

The presentation generator 724 of FIG. 7 uses the characteristics of a first media object to select a characteristically congruent (same or similar) second media object. For example, based on the "happy" mood descriptor value of an audio media object selected by a user or automatically by the presentation generator 724, the presentation generator 724 may automatically select images of smiling people, people having fun, roller coasters, balloons, or similar images attributed and tagged with a "happy" mood descriptor value.

In some embodiments, characteristics of media objects selected for the presentation may influence other parameters of the presentation. For example, based on a "fast" tempo descriptor of a selected audio media object, the presentation generator 724 may alter the transition speed parameter by displaying selected images at a fast pace in accordance with the tempo of the audio media object. As another example, the mood characteristics of the selected audio media object and visual media object may influence the automatic selection of a transition effect parameter (e.g., swipe, fade in/out, pan left to right).

In some example embodiments, a congruency determination may be performed between two media objects by comparing a plurality of characteristics associated with a first media object to a plurality of characteristics associated with a second media object. In the embodiment, the presentation generator 724 compares a first characteristic progression associated with a first media object to a second characteristic progression associated with second media object. The presentation generator 724 determines the first characteristic progression and second characteristic progression are congruent based on a measure of similarity or relatedness and a threshold similarity or relatedness, and selects the second media object for synchronous presentation with the first media object when the first characteristic progression and second characteristic progression are congruent. In some embodiments, the presentation generator 724 may perform a histogram comparison of the first characteristic progression and the second characteristic progression to determine whether the first media object is congruent with the second media object Mapping Compared to Correlations:

When the system makes comparisons and determines relations, it may encounter disjoint characteristics—such as differing descriptor types. In such a situation, the system may either a) first map the disjoint characteristic to its appropriate characteristic value for the characteristic type that is congruent to the other being compared, and then use an intra-characteristic type correlation matrix or b) directly compare disjoint characteristics in a cross-attribute correlation matrix.

Characteristic Mapping

In some example embodiments, the presentation generator 724 may map disjoint characteristics. For example, based on the "fast" tempo descriptor value of the audio media object above, the presentation generator 724 may select visual media objects with a "sharp" contrast descriptor value and may select a "bright" color palette descriptor.

In some embodiments, a characteristic value may map to more than one characteristic value of another single characteristic type. For example, the "fast" tempo descriptor value may map to all of the following mood descriptor values: "excited," "happy," and "energetic." Therefore, the first media object (e.g., a music recording) with a "fast" tempo descriptor value may be deemed characteristically congruent with one or more second media objects (e.g., visual images) with "excited," "happy," and/or "energetic" mood descriptor values even though the comparison is not between identical characteristics (e.g., comparison between the mood of the first media object with the mood of the second media object). In some embodiments, the presentation generator 724 may "cross-annotate" the media objects upon mapping. For example, the first media object annotated with a "fast" tempo descriptor value may now also be annotated with the mood descriptors values "excited," "happy," and/or "energetic."

In another example embodiment, the presentation generator 724 may map the disjoint characteristics of a first media object and a second media object and then perform a characteristic congruency calculation between the media objects based on the mapping. For example, the presentation generator 724 may map a color descriptor value of a first media object (e.g., visual image) to one or more mood descriptor values for a second media object (e.g., music recording) with the use of a descriptor mapping matrix that maps mood values to color values. In the example, the presentation generator 724 determines a mood descriptor of a media object (e.g., a visual image) and assigns the media object with a color descriptor deemed to be congruent based on the descriptor mapping matrix as depicted. The presentation generation may then use the newly assigned mood descriptor value to perform a characteristic congruency determination.

As an example, a first media object (e.g., visual image) depicting a rainy day with a "grey" value as the primary color descriptor may map to the mood descriptor values of "sad" and/or "melancholy." A second media object (e.g., a visual image) depicting a bright and sunny day with a "yellow" value as a primary color descriptor may map to mood descriptor values of "happy" and "cheerful." Finally, a third media object (e.g., a music recording) may be tagged with a mood descriptor of "playful." A descriptor congruency determination may then be performed between the first media object and the third media object and between the second media object and the third media object based on the tagged moods using the descriptor mapping in combination with a mood descriptor correlate matrix such as depicted in FIG. 13. The mood descriptor correlate matrix allows for a comparison between a first mood descriptor value and a second mood descriptor value.

Mappings may also be used in performance of other functions. The system may look at the frequency distribution of mapped descriptors to select an audio mood, for example, after having mapped multiple input descriptor values to audio mood descriptors. Mapping may also include mapping of an entity (e.g. person, place, object, or media object) to any combination of name synonyms, alternates, nicknames, and misspellings for that entity.

Figure 9:
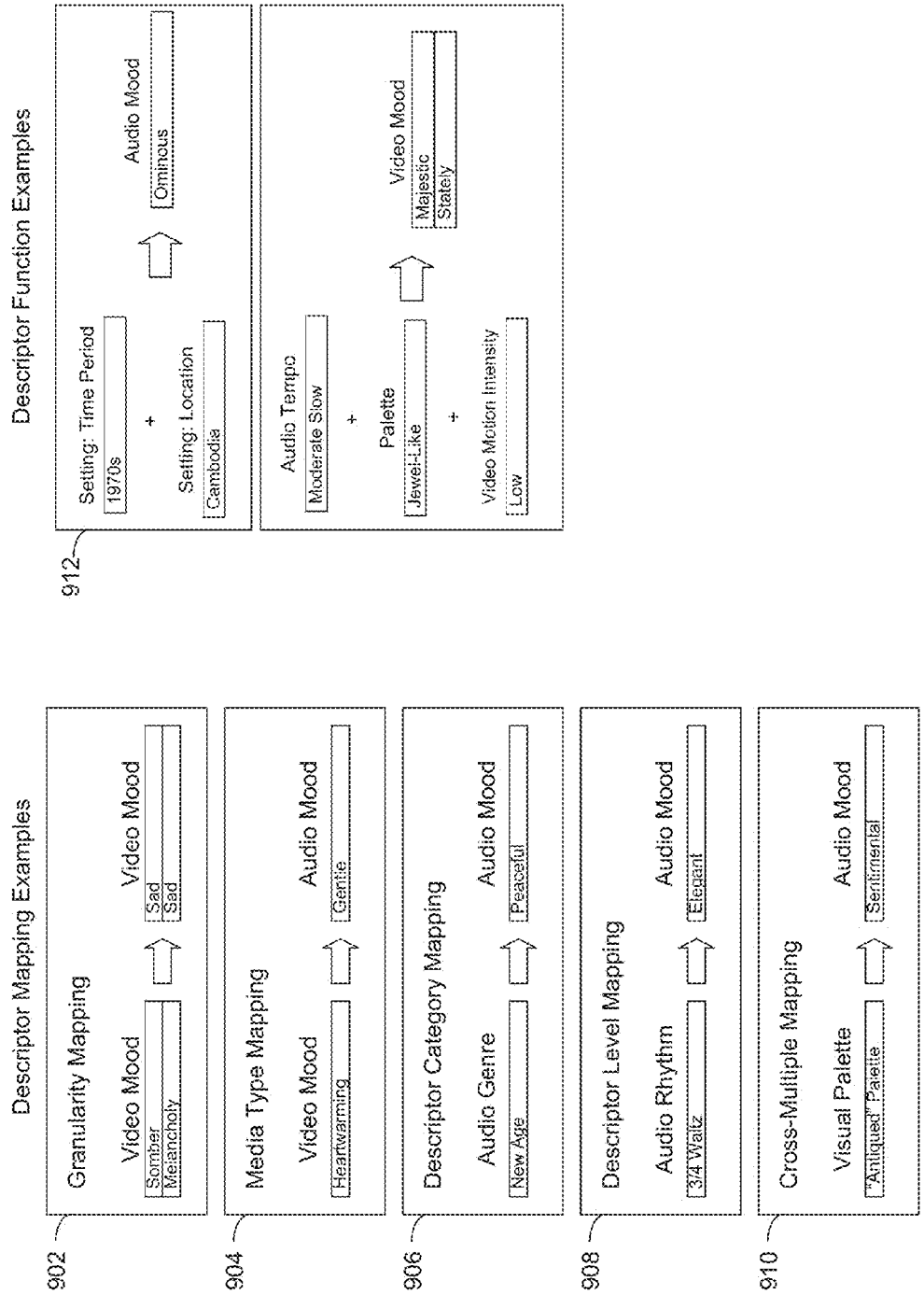
FIG. 9 shows a number of different types of characteristic mappings and descriptor mappings.
Figure 11A:
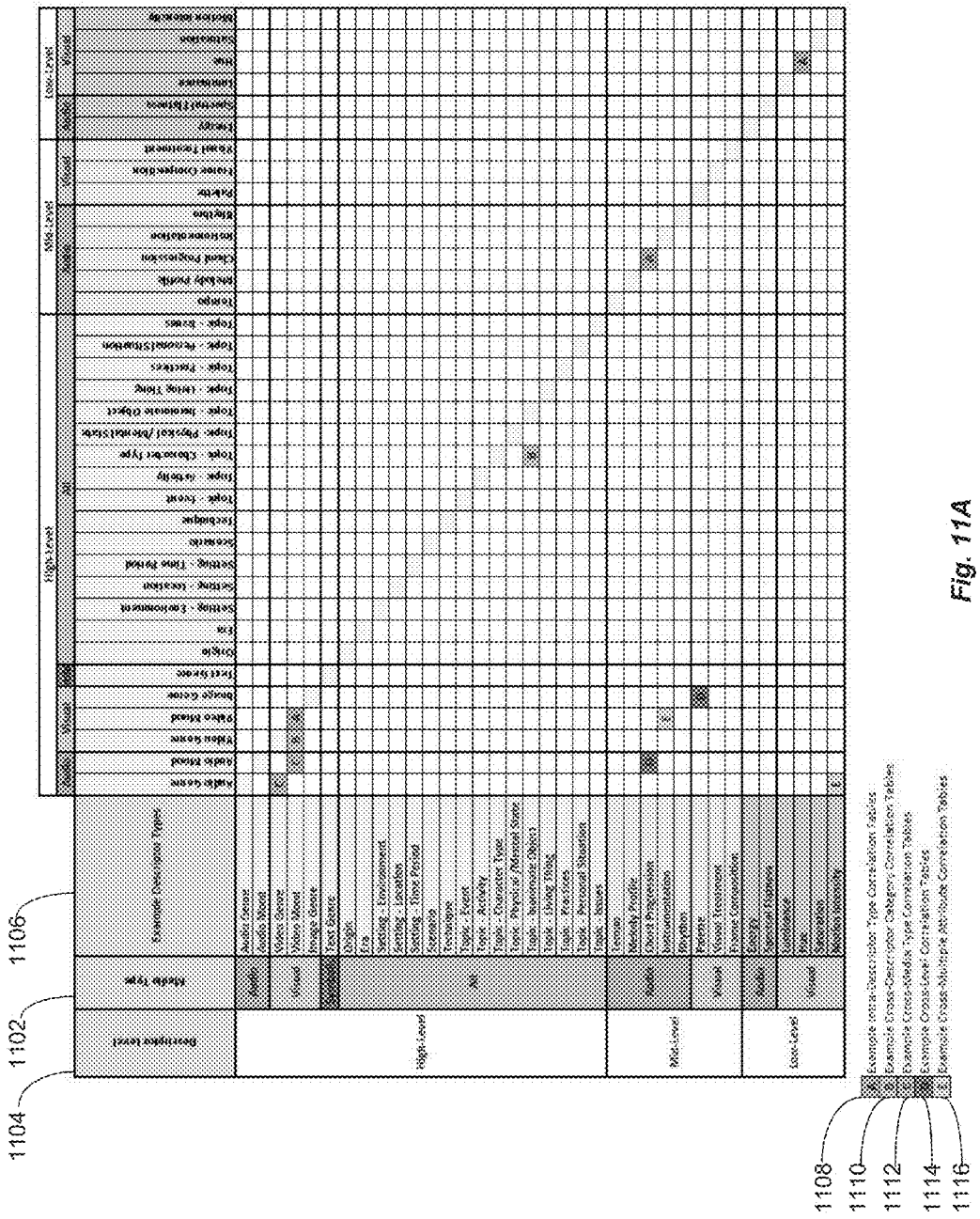
FIG. 11A shows how various characteristics/descriptors can be compared using correlates.
Figures 11B, 11C:
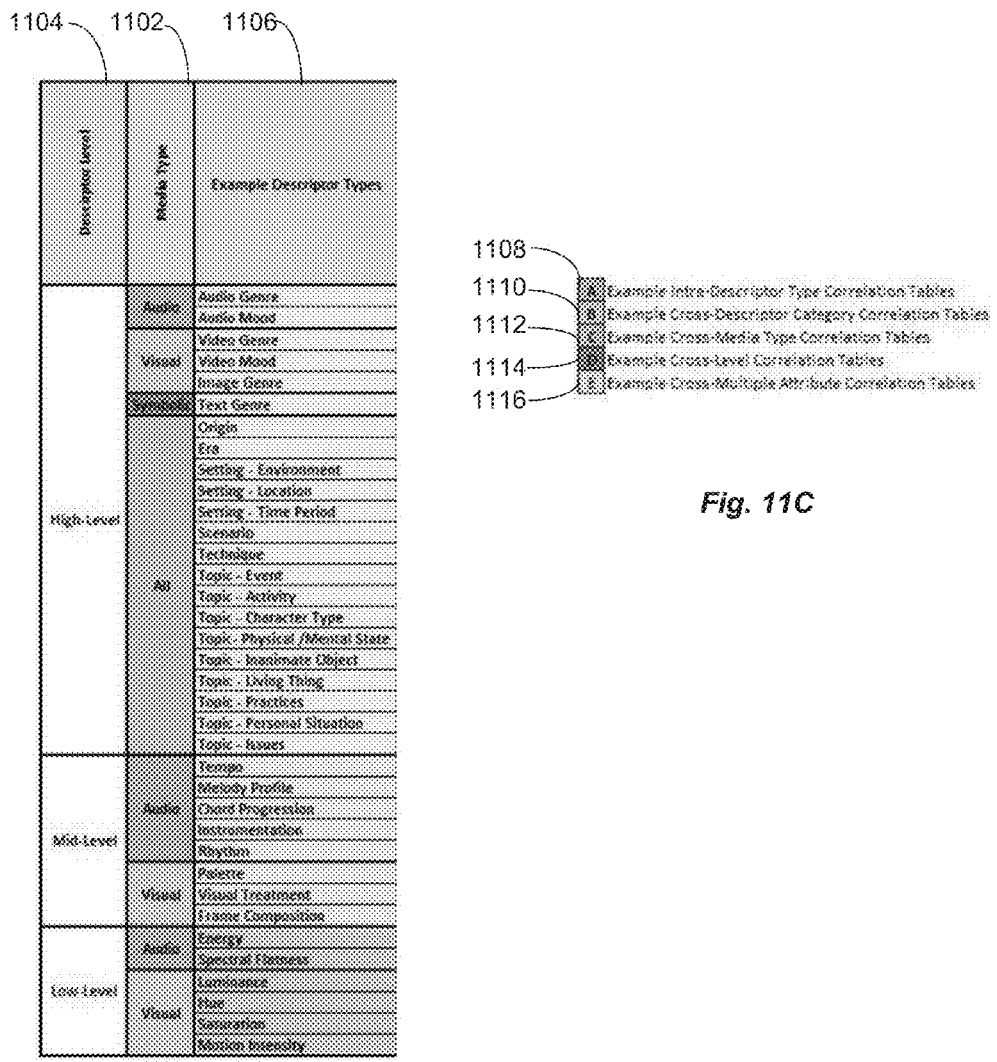
FIG. 11B illustrates a first portion of FIG. 11A.
FIG. 11C illustrates a second portion of FIG. 11A.

FIG. 9 illustrates a number of different ways in which a system could map descriptors or characteristics.

Granularity Mapping:

In granularity mapping 902, a descriptor value is mapped to a different descriptor value at a higher or lower level of granularity of the same descriptor type. For example, granular video mood descriptor values of "somber" and "melancholy" may both be mapped to the less granular video mood descriptor value of "sad."

Media Type Mapping:

In media type mapping 904, a descriptor value for a particular media type and descriptor category is mapped to a descriptor value of the same descriptor category, but in a different media type. For example, a video (media type) mood (descriptor category) descriptor value of "heartwarming" may be mapped to an audio (media type) mood (descriptor category) descriptor value of "gentle."

Descriptor Category Mapping:

In descriptor category mapping 906, a descriptor value for a particular media type and descriptor category is mapped to a descriptor value of the same media type, but in a different descriptor category. For example, an audio (media type) genre (descriptor category) descriptor value of "new age" may be mapped to an audio (media type) mood (descriptor category) descriptor value of "peaceful."

Descriptor Level Mapping:

In descriptor level mapping 908, a descriptor value for a particular media type and descriptor level is mapped to a descriptor value of the same media type, but in a different descriptor level. For example, an audio (media type) rhythm class (mid-level descriptor category) descriptor value of "¾ waltz" may be mapped to an audio (media type) mood (high-level descriptor category) descriptor value of "elegant."

Cross-Multiple Attribute Mapping:

In cross-multiple attribute mapping 910, the mapping is performed across two or more of the dimensions mentioned above. For example, mapping of a visual palette descriptor value of "antiqued" to an audio mood descriptor value of "sentimental" requires spanning all three of the media type, descriptor category, and descriptor level dimensions.

Descriptor Function:

In addition to direct mapping from one characteristic to another, the system may also utilize a descriptor function 912. There may be a function, heuristic, or transformation where specific or ranges of descriptor values of various strengths, from across the same or different descriptor types, descriptor media, and/or descriptor levels and/or Entity IDs are combined to produce an output of one or more other descriptor values or entity IDs.

Figure 10:
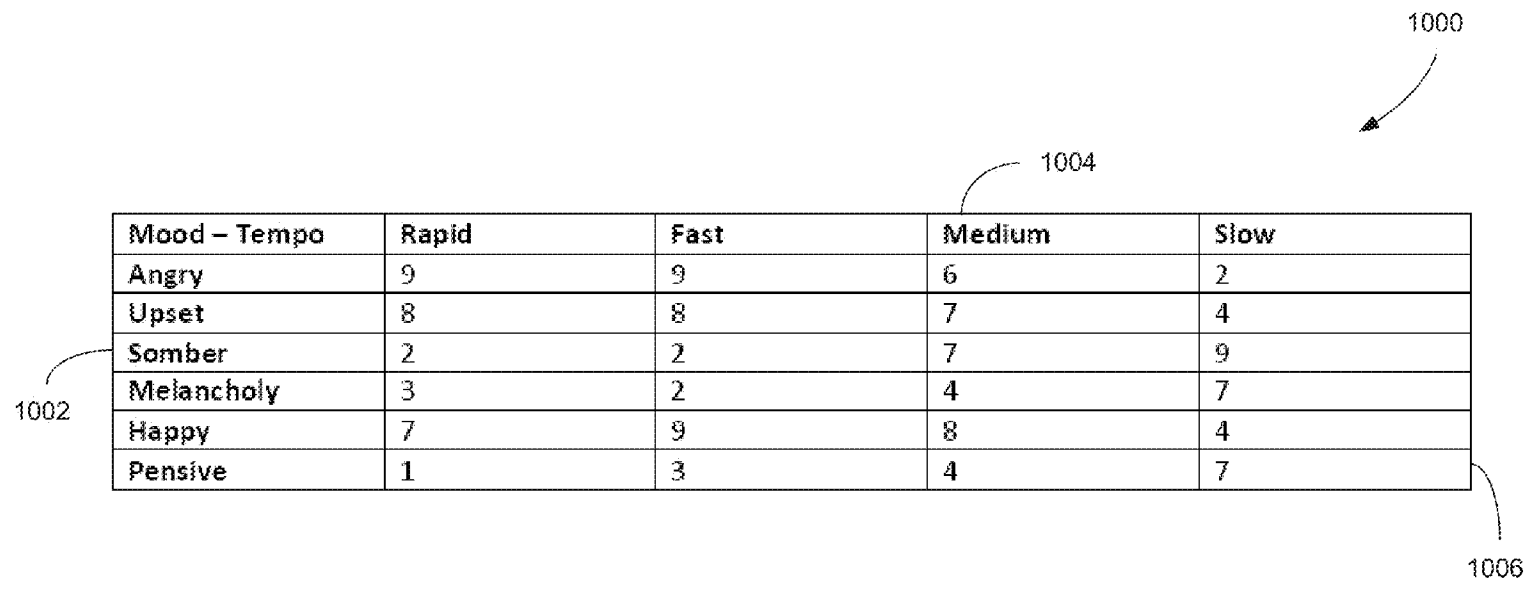

FIG. 10 illustrates an example characteristic mapping matrix table 1000, in an example embodiment, for comparing categories of disjoint characteristics. In this case, it is of the descriptor category mapping type. The following example illustrates how the characteristic mapping matrix compares the mood descriptor of a first media object (e.g., a photographic image) with the tempo descriptor of a second media object (e.g., a music recording) to determine whether the first and second media objects are congruent. In the example embodiment, mood descriptor values 1002 are compared to tempo descriptor values 1004, with each comparison designated a comparison value in cells 1006. For example, the mood descriptor value "somber," when compared to a tempo descriptor value of "fast," results in a value of "2." These two categories may not be considered similar when taking into consideration a threshold level of similarity. In other example embodiments, various scaled values may be used to express the relationship of categories of disjoint characteristics. In some embodiments, each cell may include a simple "1" or "0" to indicate whether the categories of the disjoint characteristics are congruent. Mappings may have a weight or confidence value associated with them.

Characteristics Correlations

FIGS. 11A-11F illustrate how various characteristics/descriptors can be compared using correlates. The vertical axis may present information associated with a seed object or other direct input; the horizontal axis may present information associated with a candidate media object that is being evaluated for inclusion in a presentation. Each coordinate in the matrix shown in FIGS. 11A-11F represents a potentially unique correlation matrix table. These correlation tables may compare different types of descriptors. In an example embodiment, characteristics of each of the media objects to be correlated may be weighted and the media objects may then be correlated based on weighted values.

Descriptor Media Type:

Descriptors may be classified and organized by their media type 1102. Media types include audio, visual and symbolic.

Descriptor Level:

Descriptors may also be classified by their descriptor level 1104, ranging from low-level (e.g. spectral flatness), to mid-level (e.g. melody profile), to high-level (e.g. audio mood)

Descriptor Type:

The descriptor type 1106 identifies the specific type of descriptor, which is a unique combination of media type, descriptor level and descriptor category. Audio mood and visual palette are examples of descriptor types.

Intra-Descriptor Type Correlation Tables:

Intra-descriptor category correlation tables 1108 compare descriptor values form the same descriptor type (e.g., comparing one video mood descriptor value to another video mood descriptor value).

Cross-Descriptor Category Correlation Tables:

Cross-descriptor category correlation tables 1110 compare descriptor values of different descriptor categories that are still describing the same media type (e.g., comparing a video mood descriptor value to a video genre descriptor value).

Cross-Media Type Correlation Tables:

Cross-media type correlation tables 1112 compare descriptor values describing media types in the same descriptor category (e.g., comparing a video mood descriptor value to a music mood descriptor value).

Cross-Level Correlation Tables:

Cross-level correlation tables 1114 compare descriptor values from different levels (e.g., comparing a visual palette (mid-level) descriptor value to an image genre (high-level) value).

Cross-Multiple Attributes Correlation Tables:

Cross-multiple attribute correlation tables 1116 compare descriptor types that are different across two or more dimensions of media type, category and level.

Figure 12:
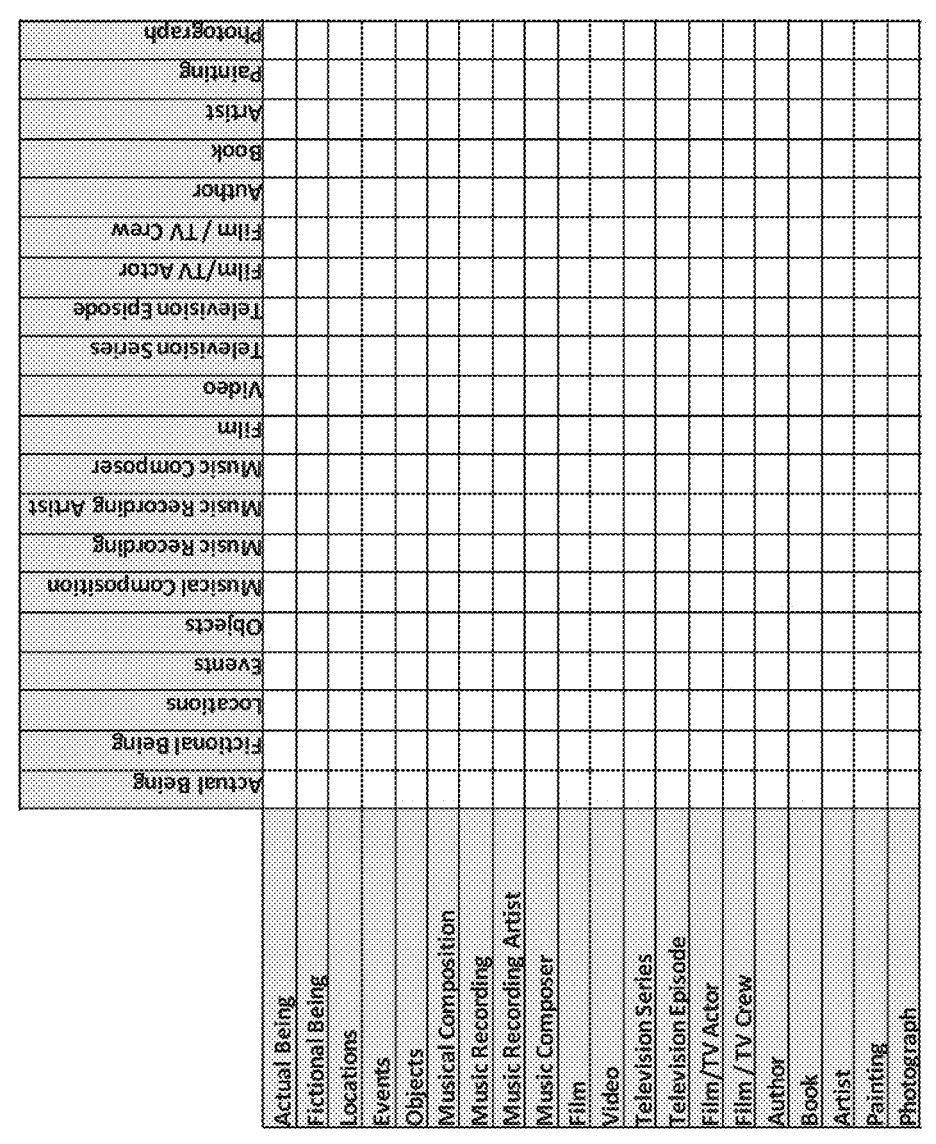

FIG. 12 shows an example of a correlation matrix between media objects and other entities. Just as with characteristics and descriptors, relationships and correlations may exist in the relation information that indicates relationships between media objects and other entities. These relations and correlations may be used to create the presentation.

Mood Correlates Matrix:

FIG. 13 illustrates an example characteristic correlates data matrix table 1300 for comparing characteristic elements of, and determining congruency between, two characteristics. The following example illustrates the application of the characteristic correlates data matrix table 1300 for comparing two mood descriptors. In many instances, the mood profile digest of the audio media object may need to be compared to the mood profile digest of a visual media object when the two mood profile digests (e.g., as one of many possible examples, the top 10 scoring mood elements) do not align identically with those of the second mood profile digest. Although the two mood profile digests may not have identical mood categories for comparison, the two mood profile digests may nonetheless be deemed congruent (or be sufficiently similar) for various functions such as, for example, suggesting a visual media object to be associated with the visual media object mood profile digest for use in the presentation to an end user.

The number in each cell 1306 of the table 1300 quantifies a similarity relationship between content belonging to identical and disjoint mood categories. The table 1300 may be used to normalize mood scores when performing a mood congruency determination. In some example embodiments, this relationship may be summarized by an integer within a range of values, wherein a greater value indicates a strong similarity between the two mood categories, and a lesser or negative value may indicate a weak similarity, or dissimilarity, between mood categories. In some embodiments, finding media objects of dissimilar mood categories may be the intended result of the application, and therefore, determining the least congruent mood profiles, mood profile digests, or mood preference profiles may be performed with the use of table 1300 and as described below.

In an example embodiment, the table 1300 comprises data columns 1302 and data rows 1304, the intersections of which are data cells 1306. The data columns 1302 and the data rows 1304 have headings populated with mood categories, and in this example include, M1, M2, M3 . . . M(n−1) and M(n) where 'n' is an integer greater than zero. As an example, M1 may be a 'somber' mood and M2 may be an 'angry' mood, and so on. In an example embodiment, the cells 1306 contain a comparative value, for example a numerical score or ranking, exemplifying the similarity between intersecting mood categories. As depicted in table 1300, each cell 1306 contains a comparative value that may fall within a set range of values, such as, for example, "−10" (show as "(10)") and "10" to create a gradient of very similar to very dissimilar (e.g. a range of 10 to −10) moods. For example, a very strong similarity between a mood category of data column 1302 and a mood category of data row 1304 receives a higher positive value "10" to indicate the similarity. A very strong dissimilarity between mood categories may receive a lower, negative score, for example, a "−10." Mood categories which are neither similar nor dissimilar to each other may receive a score with a smaller absolute value, for example a "0."

Mood Correlate Value Assignment:

In an example embodiment, the values in the cells 1306 may be editorially assigned. For example, in some embodiments, one or more persons may evaluate each relationship between moods and assign the comparative value for each cell 1306. In another example embodiment, an average value given to a relationship derived from multiple users inputting values may be used to populate each cell 1306. In some example embodiments, a standard deviation may be taken into consideration to avoid significant disparity among assignments when using averages across multiple users to populate the cells. In another example embodiment, the relationship between moods categories (e.g. each comparative value) may be determined by an automated comparison of model mood profiles for each of the 'n' moods, such as those derived at a classifier 806 as described above in reference to FIG. 8A. Some cells 1306 of table 1300 may not be populated with a score to avoid redundancies and reduce inefficient processing and memory allocation when populating, using and/or storing the table 1300.

Mood Correlates Scale:

The scale may be transformed to whatever scale and range is optimal for the implementation. In some example embodiments, fewer mood categories may be used to reduce processing and memory consumption when performing a mood congruency determination.

Example Comparison

Figure 14:
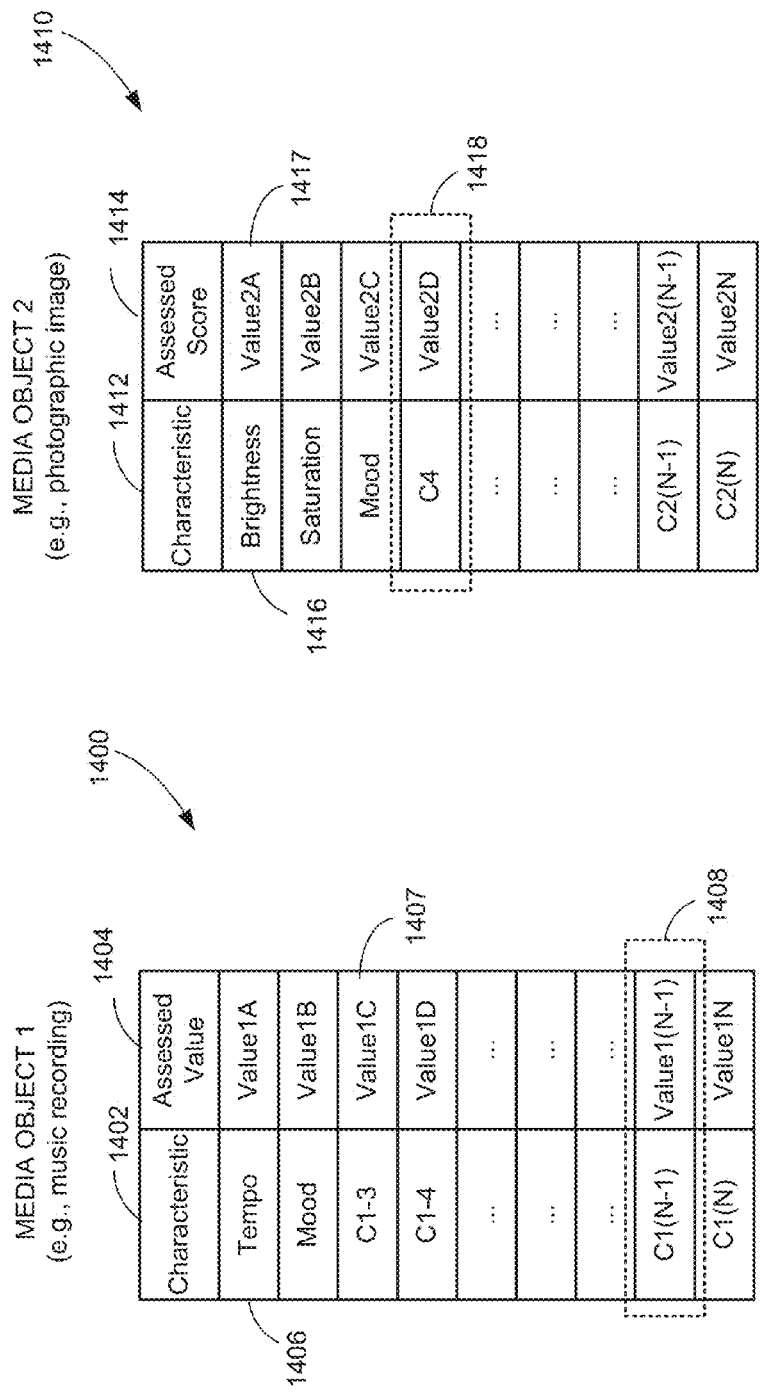
FIG. 14 illustrates a block diagram of two media object descriptor tables, in accordance with an example embodiment, to store descriptors of media objects to determine congruency between two media objects.

Comparison of Media Object Characteristic Sets:

FIG. 14 illustrates a block diagram of two media object characteristic tables 1400 and 1410, in accordance with an example embodiment, to store characteristics 1406 and 1416 of media objects to determine congruency between two media objects. Column 1402 describes a plurality of characteristics 1406 associated with the first media object, whereas column 1404 describes associated values 1407 of the characteristic in 1406. Similarly, column 1412 describes a plurality of characteristics 1416 associated with the second media object, whereas column 1414 describes an associated value 1417 for each characteristic 1416.

As previously discussed, in an example embodiment, one or more characteristics 1406 of a first media object may be used to identify a congruent second media object based, at least in part, on one or more media object characteristics of a second media object. The congruent first and second media objects may then be synchronously presented in a generated presentation. In some example embodiments, the congruency determination may be executed on-the-fly while the presentation is being presented. Limitations such as processing speed, available memory, and predetermination of characteristics may be taken into consideration when performing an on-the-fly presentation.

In an example embodiment, a mood descriptor and associated value of a first media object (e.g., an audio recording) may be compared to a mood descriptor and associated value of a second media object (e.g., visual media object) to determine the second media object as congruent with the first media object. Because the comparison is between the same characteristics (i.e., mood) of the two media objects, the first characteristic need not be first mapped to the second characteristic. In another example embodiment, a tempo characteristic 1406 and the associated assessed value 1407 of a first media object 1400 may be compared to a brightness characteristic 1416 and associated assessed value 1416 of a second media object (e.g., a digital photo). Because these characteristics are disjoint, the brightness characteristic may first be mapped to the tempo characteristic or vice-versa to determine a mapped characteristic of the second media object. The tempo characteristic of the first media object is then compared with the mapped tempo characteristic of the second media object to determine a congruency. If deemed congruent, the first media object may be presented simultaneously with the second media object in a generated presentation.

In an example embodiment, a first characteristic set table 1400 may include some or all of the characteristics descriptors 1406 associated with a first media object (e.g., music recording) and associated values 1407. For example, the first media object may be a music recording with descriptor characteristics 1406 such as tempo, mood, genre, style, and the like. These descriptor characteristics 1406 and 1416 may be derived in a manner similar to the mood profile as described with reference to FIGS. 8A, 8B, and 12 using high level descriptors. In some embodiments, a characteristic in a characteristic table 1400 may be a reduced set of categories or a singular category of a characteristic (e.g., highest score characteristic).

The characteristics tables 1400 and 1410 may be pre-processed by a processing system, a server, or a combination of the two, or each characteristic may be processed on-the-fly while generating a presentation. The characteristic tables 1400 and 1410 may be stored in a media object library either locally on the processing system, on the server, or in any combination thereof. The characteristic tables 1400 and 1410, as described above, may be accessible by a presentation generation application when generating the presentation. The characteristic tables 1400 and 1410 may include some or all of the characteristics associated with the media object.

Figure 15:
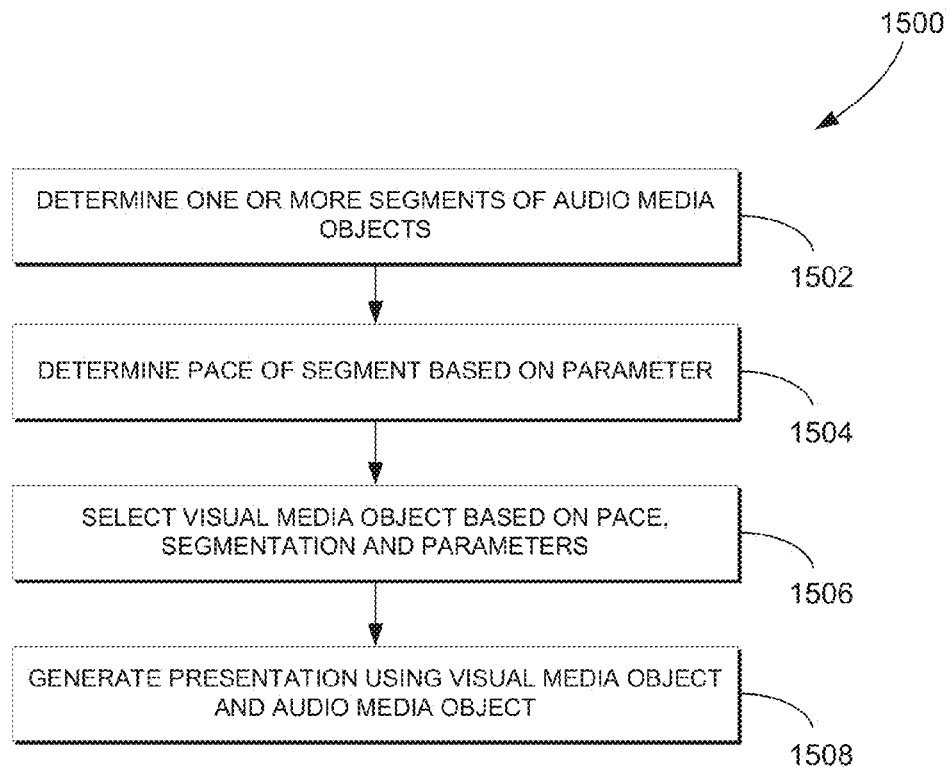
FIG. 15 is a flow diagram of a method, in accordance with an example embodiment, for generating an audio-visual presentation using characteristics of audio media objects to select visual media objects.

Selection Based on Pace, Segmentation and Other Parameters
Description of Method 1500:

FIG. 15 is an example flow diagram of a method 1500, in accordance with an example embodiment, for generating an audio-visual presentation. The method 1500 may construct an entire presentation prior to presenting to a user to form a pre-rendered presentation. In some embodiments, portions of the method 1500 may be executed while presenting temporally earlier portions of the presentation so that the presentation is generated in real time.

Determination of Audio Segments:

At block 1502, the method 1500 determines one or more segments of an audio media object. In some example embodiments, segments of the audio media object may be delineated based on characteristics of the audio media object, such as variations in the rhythmic pattern, chord progressions, timbre, mood, or composition structure (e.g., intro, outro, chorus, etc.). In an example embodiment, the rhythmic patterns of an audio media object may be determined by any one of many known methods. An issued United States Patent describing a method for determining rhythmic patterns and weights includes U.S. Pat. No. 7,012,183 B2, "Apparatus for Analyzing an Audio Signal with regard to Rhythm Information of the Audio Signal by using an Autocorrelation Function." Issued U.S. Patents describe methods for determining song structure segments, including U.S. Pat. No. 7,345,233 B2 "Apparatus and Method For Grouping Temporal Segments of a Piece of Music," van Pinxteren et al.; and U.S. Pat. No. 7,304,231 B2, "Apparatus and Method for Designating Various Segment Classes," van Pinxteren et al. In some embodiments, segmentation may be determined using one or more of the above characteristics of the audio media object.

Rhythmic Patterns:

In the disclosure, rhythmic patterns are intended to include basic repetitive events in time (e.g., a beat rate or tempo) that correspond to the temporal structure of the musical media object. This may be at the bar level, beat level, or some other strictly periodic musical metric. The rhythmic patterns may also include periodic or non-periodic schemes that may be related to temporally localized increases in energy in one or more frequency bands.

As used herein, the term "beat rate" is intended to include a repetitive beat detectable for some representative duration of the audio media object. For purposes of the following discussion, this described rhythmic pattern repetition rate will be identified as the "beat rate." This short-hand designation is not intended to suggest that the term is limited to detecting only the "beats" of the audio media object, such as that term might be used in other musical contexts.

Audio Segment Mood Profile Used to Determine Presentation Parameters:

In an example embodiment, the mood profile of a segment may be taken into consideration when determining the pace and other parameters that are suitable for the presentation, such as, for example, transition effects.

As described above with reference to FIGS. 8A and 8B, the mood profile of the audio media object segment may be previously determined and tagged to facilitate associating the mood profile with the audio media object segment. In some embodiments, the mood profile of the segment is determined while the presentation is being presented (e.g., "on-the-fly"), but prior to that particular segment being presented. In some embodiments, the mood profile for each segment may be compared to the neighboring segments, to ensure that the mood profile determination for the particular segment is accurate.

By way of example, for a "mellow" mood segment of an audio media object, the available transition effects may be a "fade in/out" or "slow swipe," whereas an "energetic" mood segment of audio media object may have a "sharp" or "abrupt" transition effect. Various transition effects are described below in greater detail Determination of Pace:

At block 1504, the method 1500 determines a pace of the presentation. Generally, the presentation pace is the pace at which the visual data (e.g., digital images) are transitioned. In example embodiments, the method 1500 may take into consideration a single parameter or a plurality of parameters, including characteristics of the media object, when determining a pace of the presentation. In example embodiments, the presentation pace may be based on the tempo of the audio media object, the quantity of user-selected visual media objects, the quantity of available visual media objects, the quantity of visual media objects that is congruent to the mood of the audio media object, the duration of an audio media object or presentation, user-selected transitions, and/or a mood of the audio media object, among other parameters. In an example embodiment, the presentation pace may vary across the duration of a presentation and may slow down or speed up based on the parameters. Specifically the pace may be different during different segments of the seed media object (e.g., slow during each of the verses of a music recording and fast during each of its choruses.)

In some example embodiments, the identified rhythmic patterns of the segment may be too fast or too slow to perform an effective visual media object transition (i.e., pace of the presentation). In these examples, the pace may be reduced or increased by a factor to prevent the presentation from transitioning unpleasantly fast or unpleasantly slow for a user. In some example embodiments, the pace may be set by an acceptable range having an upper limit and a lower limit, which may be used to determine whether a rhythmic pattern is an acceptable pace. In this example, a rhythmic pattern of the audio media object may either be divided or multiplied by a factor to determine an acceptable pace. This factor may be determined based on the tempo hierarchy of the recording, such that the alternate presentation pace is determined by multiplying or dividing the seed media object tempo by multiples of typically two or three. In another example embodiment, the rhythmic pattern of the audio data may fall within the acceptable range of paces and therefore may be considered the acceptable pace. In some embodiments, the mood may be taken into consideration to determine which rhythmic pattern (e.g., beat rate) of a plurality of detected rhythmic patterns (e.g., beat rates) is an acceptable pace of the presentation. In some embodiments, the pace of each segment may vary.

Selection of Visual Media Objects:

Continuing with block 1506, the method 1500 selects visual media objects (e.g., digital photos, images, video) based on the pace, segmentation, and/or various parameters. The pace, segmentation, and parameters may be used to determine a preferred quantity of visual media objects displayable for the duration of the presentation. If the preferred quantity is more than the available quantity of visual media objects, the method 1500 may repeat visual media objects or, in an embodiment, may search another source for visual media objects congruent with the other selected visual media objects for display. In some embodiments, the method may repeat selected visual media objects, or increase the view time of some or all of the visual media objects to cover the discrepancy between the quantity of visual media objects available and the preferred quantity.

In some embodiments, parameters including transition effects such as fading, swiping, and dissolving, among others, may be taken into consideration when determining the pace and quantity of presentable visual media objects. Since these effects require time to perform, the quantity of visual media objects may be impacted. In some embodiments, the pace for a segment may be compared to the neighboring segments (e.g. segments before and after) to ensure the transition speed is not too fast or too slow in comparison. In some embodiments, other parameters, such as tiling effects or showing multiple pieces of visual data simultaneously, may allow for greater quantity of visual data to be presented if the available quantity exceeds the preferred quantity.

User Manual Options:

In an example embodiment, the method 1500 may provide an end user with options (e.g., parameter selections) for customizing the presentation, and may display visual media objects which are congruent with the selected parameters in a given segment. In the example embodiment, a graphical user interface may be provided for customizing the presentation. One such embodiment of user manual options will be described below with reference to FIG. 17.

Mapping of Visual Characteristics to Mood:

In some embodiments, when selecting visual media objects at block 1506, characteristics of the visual media objects, such as the color scheme, the contrast, the edges detected, and the expressions of faces are some examples of characteristics that may be mood mapped to various mood characteristic values. For example, a visual media object (e.g., a photo image) that is predominantly red in color might be mapped to a mood descriptor value of "rage," "anger," or "love" and tagged with such mood descriptor values accordingly. As another example, a visual media object showing a smiling human face would be assigned a facial expression descriptor value of "smiling," which might then be mood mapped to a "happy" or "joyful" mood descriptor and tagged accordingly. To prevent incorrectly mapping the visual media object, multiple characteristics of the visual media object may be taken into consideration when mood mapping At block 1506, the method 1500 may search for a descriptor indicating the mood congruent (e.g., similar or same) with that of the segment of the audio media object. In an embodiment, the descriptor may be created by a user or by an average or other calculation across a plurality of users. In another embodiment, method 1500 automatically assesses the mood profile of a visual media object based on an image analysis of the visual media object.

Mood Mapping and Mood Correlations:

In an embodiment, the method 1500 at block 1506 may perform a mood correlation analysis to correlate existing non-mood descriptors of visual media objects with mood descriptor values that are correlated with the non-mood descriptors. Such descriptors may include user-generated descriptor values of various types, including time period, setting, geolocation, topic, technique, scenario, and genre. A mood descriptor value may have more than one non-mood descriptor value associated with it in the mapping scheme, and each non-mood descriptor value may be mapped to more than one mood descriptor value. For example, if a digital image is annotated with the descriptor "smiling" and "baby," this digital image may be mapped with the moods "happy," "joyful," or both. In the example, when the mood descriptor value of an audio media object segment is determined as "happy," an image with an associated "smile" tag may be selected to be presented synchronously during the audio media object segment.

In some embodiments, the mapping may use the non-mood descriptors to add mood descriptors to the visual media objects. In an example embodiment, the method 1500 may take into consideration all of the characteristics and results of an image analysis of a visual media object before determining the appropriate mood of that image. In some embodiments, a mood average may be calculated by considering all mood descriptor values tagged to a particular visual media object. In another embodiment, the mood average may take into consideration non-mood characteristics for which a mood mapping may be performed when calculating the mood average. In some embodiments, when an audio media object has a plurality of mood descriptor values, if one mood descriptor value is particularly dissimilar to the other mood descriptor values, this value may be considered an anomaly and may not be used in the average, and the annotation may even be automatically removed for purposes of generating the presentation.

Timing Options for Presentation Generation:

At block 1508, the method 1500 generates the presentation using visual media objects and audio media objects. In some embodiments, the entire presentation may be pre-rendered and generated prior to presenting. In an example embodiment, the pre-rendered presentation may permit an end user to edit the generated presentation before presenting. In some embodiments, the selection of audio media objects and visual media objects is entirely automated. In other example embodiments, the visual media objects may be selected within an allotted transition time between pieces of visual media objects (e.g., digital images) while the presentation is being performed, and therefore, the visual media object selection is performed in real-time. In another embodiment, the generating process is performed in real-time, per segment of audio media object. In this embodiment, the mood of the next segment is determined and visual media objects are selected while the current segment is being presented. In another embodiment, the rhythmic patterns of the next segment are determined and visual media objects are selected while the current segment is being presented.

In another embodiment, the visual media object selection is based on a rhythmic patterns and segment analysis of the audio media objects and transition effects. In this example embodiment, a visual transition effect is being used by the presentation. For example, if the visual transition effect between visual media objects is a fade in/out with a two second fade in, one second full display, and two second fade out, the method 1500 selects the next visual media object given the five second window created by the visual transition effect.

In an example embodiment, method 1500 may first determine the mood of the audio media object (e.g., a music recording) to be used in the presentation. The method 1500 may then segment the audio media object by mood consistencies within the audio media object. The method 1500 may detect the rhythmic patterns for each mood segment and select visual media objects based on the rhythmic patterns and the mood of the segment. As described above, user-selected or automatically selected parameter values such as transition effects, number of slides to be simultaneously displayed, and/or selection of other media object input (e.g., video), may affect the quantity of visual media objects to be displayed over the duration of the presentation.

Figure 17:
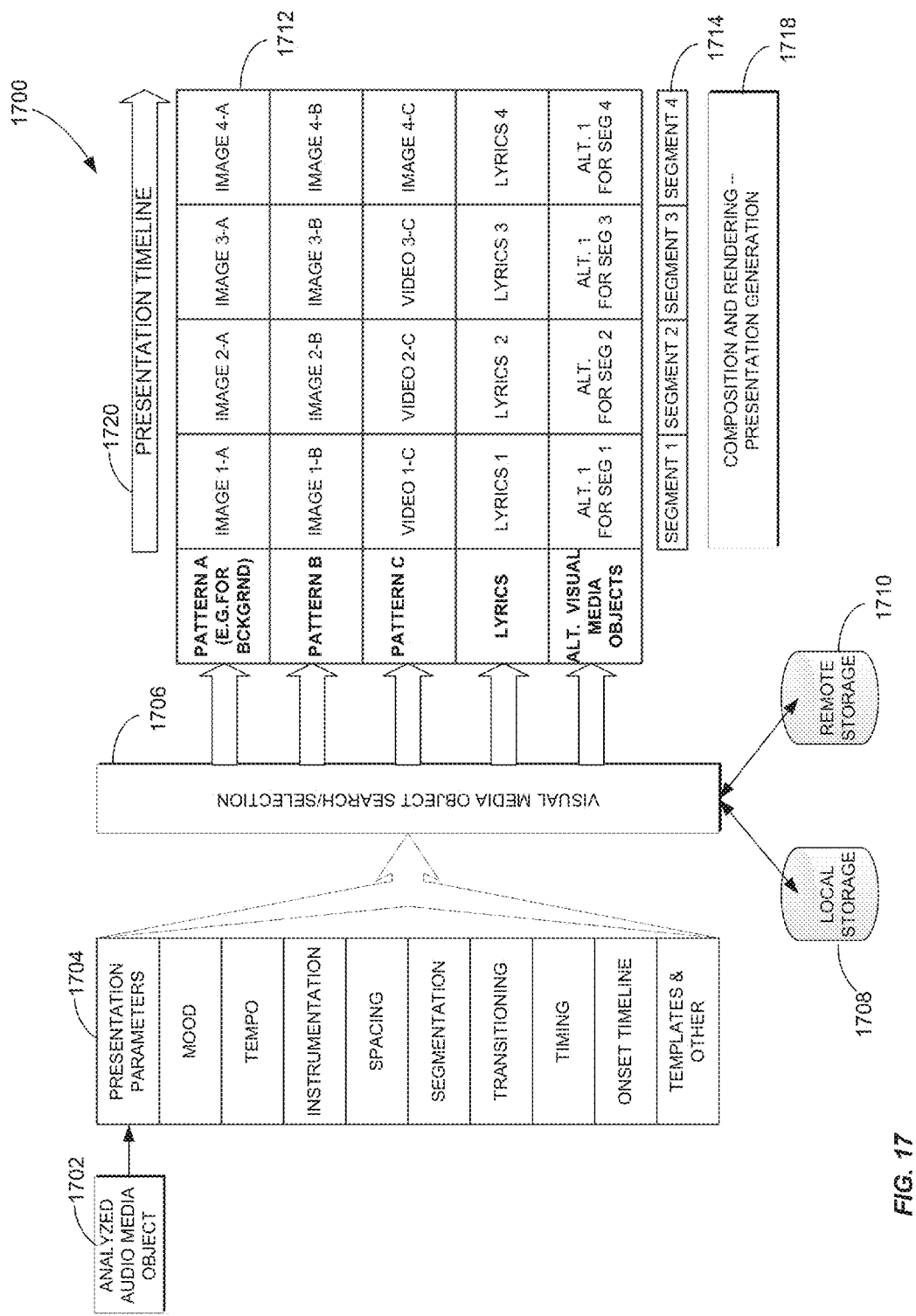
FIG. 17 illustrates a flow diagram of a method, in accordance with an example embodiment, of generating an audio-visual presentation.

User Editing of Presentation Elements:

In an example embodiment, the generated presentation is presented to the end user using a graphical user interface permitting the end user to edit the presentation. In an embodiment, optional visual media objects may be presented on the graphical user interface for each segment of the audio media object. The alternative media objects may be presented in a map showing the optimal presentation first and providing the alternative visual media objects in order of preference. The graphical user interface may present various configurations that may be suitable for generating the presentation. FIG. 17, which will be further described below, shows an example method for providing a graphical user interface with optional and alternative visual media objects (e.g. image and video files) for use when editing the presentation according to the user's preferences.

Presentation Method Involving Determination of Segmentation

Figure 16:
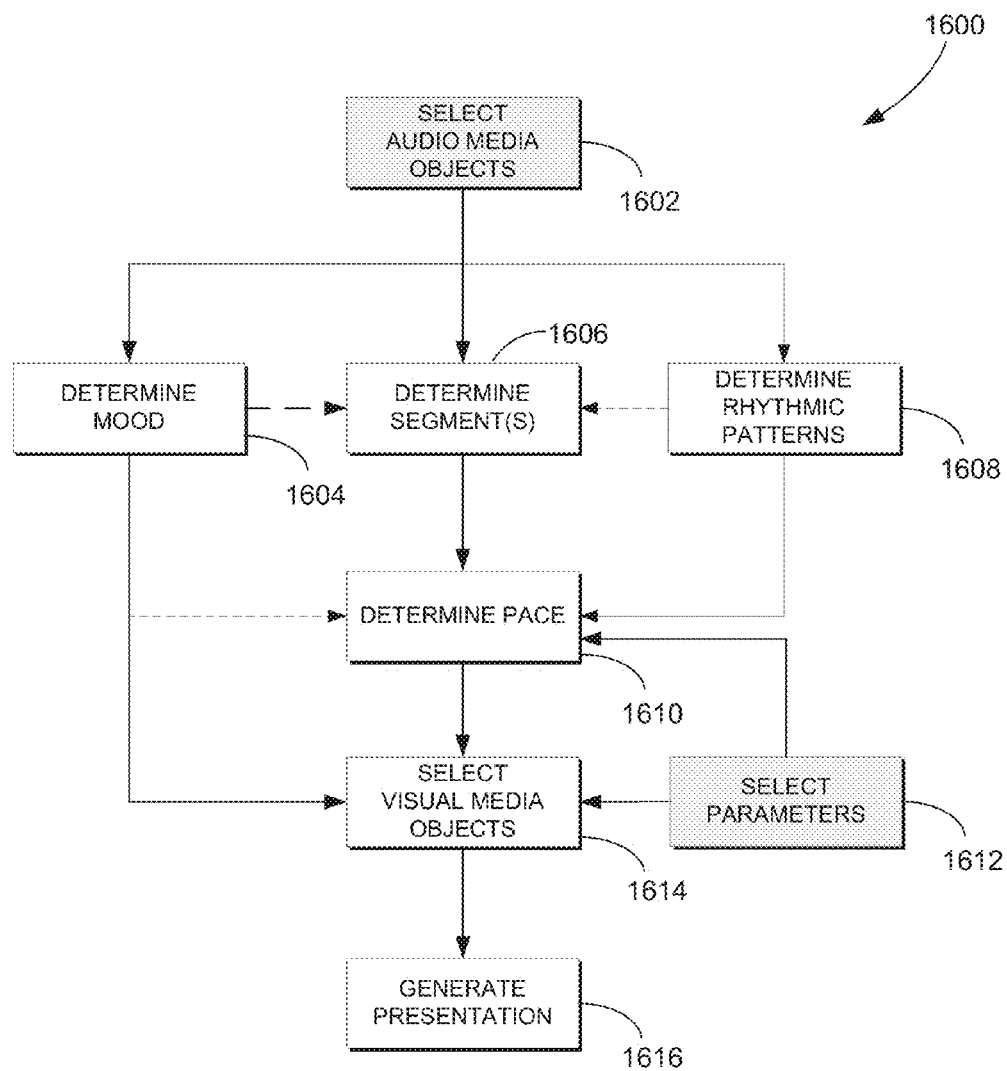
FIG. 16 is an example flow diagram of a method, in accordance with an example embodiment, for generating an audio-visual presentation based on mood and segmentation of audio media objects.

Description Method 1600:

FIG. 16 is an example flow diagram of a method 1600, in accordance with an example embodiment, of generating an audio-visual presentation based on mood and segmentation of audio media objects. In the example embodiment, audio media objects are selected at block 1602 of method 1600, for use in the generation of the presentation. At block 1604, the method then determines the mood as described above with regard to FIGS. 8A and 8B. Simultaneously while determining the mood of the audio media object at block 1604, at block 1608, the method 1600 determines rhythmic patterns of the audio media object. In some embodiments, both the determined mood and determined rhythmic patterns are used in determining segmentation of the audio media object at block 1606. In other example embodiments, the determined mood or the determined rhythmic pattern may be used in segmenting the audio media object as depicted by the dashed lines.

Determining Pace:

At block 1610, the method 1600 determines a pace or timing pattern for each segment of the audio media object. In some embodiments, a single pace for the entire presentation may be chosen. In other embodiments, the determined regular pace or specific repeating or non-repeating pattern for each segment or the entire audio media object may be based on the determined rhythmic patterns, determined mood, or other parameters 1612, or any combination of these three.

Visual Media Object Selection:

At block 1614, the method 1600 selects visual media objects based on the determined timing, determined mood, and additional parameters 1612. In some embodiments, as described above, various parameters that impact the presentation of the eventually selected visual media objects, such as transition effects or the mood, may ultimately reduce or increase the determined transition speed and the number of visual media objects to be presented. The visual media objects may be from a variety of sources including a locally stored collection of digital images or from across a network and retrieved from a database of digital photos and images. The method 1600 may select the location from which to retrieve a visual media object based on user-specifications, available processing power, and/or time before that particular visual media object is to be presented, particularly if the presentation is being created dynamically (e.g. the visual media objects are selected while the presentation is being presented).

Illustration of Method Utilizing User-Input in Presentation Generation

Description of Audio-Visual Presentation Generation Method 1700:

FIG. 17 illustrates a flow diagram of a method 1700, in accordance with an example embodiment, of generating an audio-visual presentation. In an example embodiment, the method 1700 begins with an analyzed audio media object 1702. In some embodiments, the audio media object 1702 may be analyzed to determine the segmentation in reference to one or more rhythmic patterns, tempo, and/or mood. The analyzed audio media object 1702 is then submitted to block 1704 wherein the method 1700 determines the presentation parameters. In an embodiment, the presentation parameters may be defined by a user, defined by the audio media object, or a combination of both. Method 1700 then utilizes the presentation parameters from block 1704 to select visual media objects at the visual media object search and selection block 1706. In an embodiment, the visual media object search and selection block 1706 searches and selects visual media objects from a local storage 1708, a remote storage 1710 (e.g., Flickr®), or any combination of the local storage 1708 and remote storage 1710. Different elements of the presentation may be synchronized/selected by different elements of the analyzed seed objects. For example, different simultaneous visual streams may be determined by, and synchronized with, different respective vocalists, musical instruments, melodies, and chord progressions that are sounding simultaneously in the music timeline.

Presentation Options Matrix:

A presentation options matrix 1712 may be presented to the end user as a graphical user interface so that the user may select and modify the presentation in accordance with the presentation timeline 1720. Vertical columns of the matrix 1712 are divided by each segmentation 1714 (e.g., segmentation based on moods or tempos) of the analyzed audio media object 1702. Horizontal rows of the matrix 1712 provide various visual media objects that may be suitable for use in each segment. For example, in the first column associated with segment 1, the rows are populated with Image 1-A, Image 1-B, Video 1-C, and some or all of these visual elements may be incorporated into the presentation during segment 1 of the analyzed audio media object 1702. In some embodiments, the graphical user interface may allow the user to sort, order, and rearrange the suitable visual media objects for each segment. In another example embodiment, the graphical user interface may allow the end user to rearrange the segments and the visual media objects to customize the presentation. In another example embodiment, additional parameters (e.g., visual effects, such as transition effects, peripheral elements, and templates) may be selected by the end user when editing the presentation as described above. In the example embodiment, various visual media objects may be suggested for or removed from selection based on the selected parameters.

Independent Segmenting/Transitions for Each Track:

Each media track and/or group of media tracks in the presentation may have its own segmentation pattern. For example, videos may change at every four measures of the seed music, while overlaid images may change on every beat.

Apparatus Configured to Generate a Presentation

Figure 18:
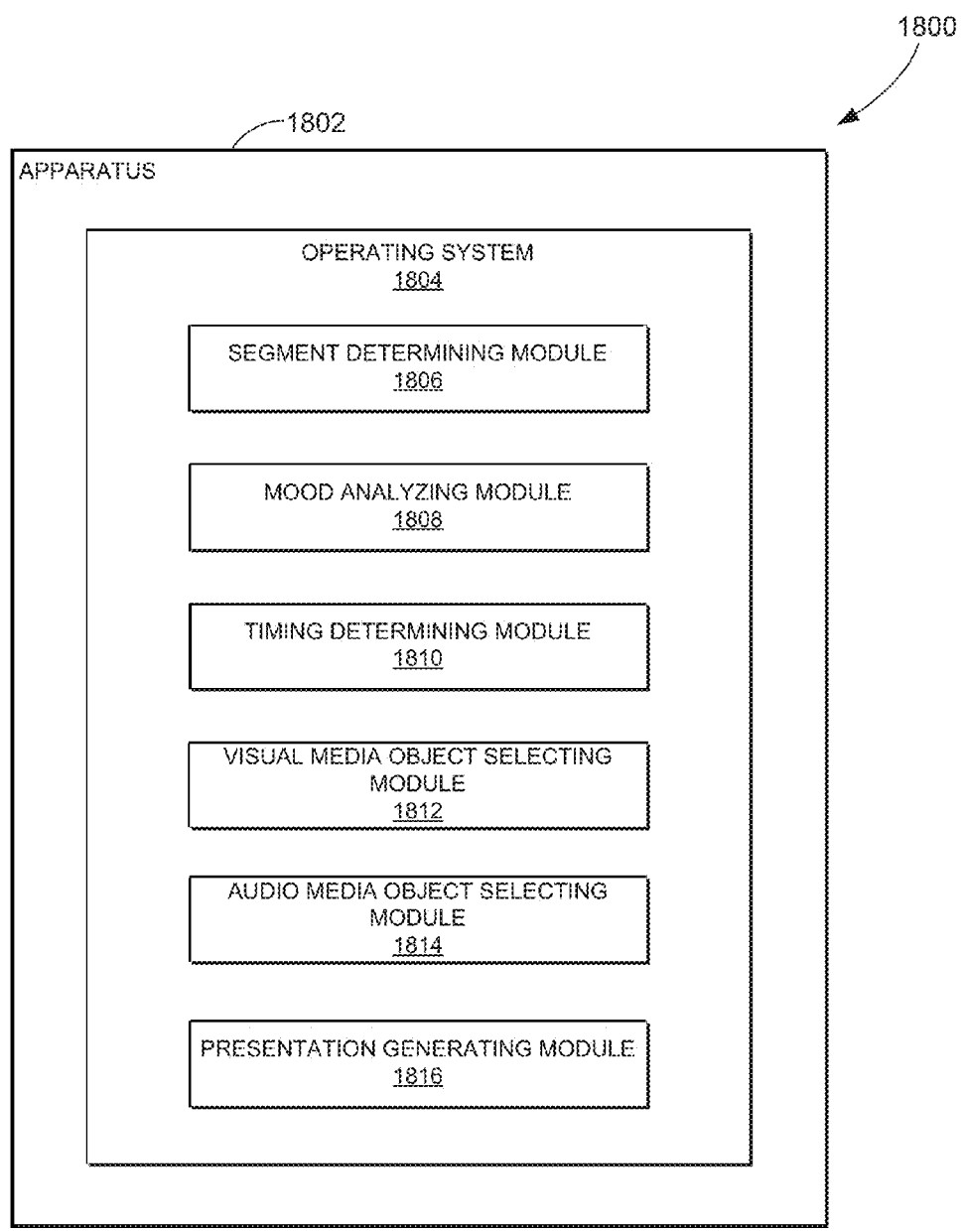
FIG. 18 illustrates a block diagram of modules of an apparatus, in accordance with an example embodiment, configured to automatically generate an audio-visual presentation.

Description of Apparatus 1800:

FIG. 18 illustrates a block diagram 1800 of modules of an apparatus, in accordance with an example embodiment, configured to generate a presentation. The apparatus 1802 is shown to include an operating system 1804 facilitating the operation of a plurality of modules. The plurality of modules is shown to include segment determining module 1806, mood analyzing module 1808, pace/timing determining module 1810, visual media object selecting module 1812, audio media object selecting module 1814, and presentation generating module 1816.

Segment Determining Module:

The segment determining module 1806 determines the segments of the audio media objects by any one of known methods for segmenting as described above. Additionally, the segment determining module 1806 determines a length of time (e.g., duration) for each determined segment. The segment determination module 1806 may segment the audio media objects based one or more characteristics of the audio media objects.

Mood Analyzing Module:

The mood analyzing module 1808 analyzes the audio media object to determine a mood and analyzes the visual media object to determine a mood. In some embodiments, the mood analyzing module may also include a mood correlations table such as the one described in FIG. 13. The mood analyzing module 1808 may also be able to map moods to congruent moods and other characteristics in order to determine mood congruencies between audio and visual media objects.

Timing Determining Module:

The timing determining module 1810 determines the timing of the presentation. In some embodiments, this module may filter through a plurality of detected rhythmic patterns to arrive at the 'n' most prominent rhythmic patterns, where 'n' is an integer greater than or equal to 1. The timing determination module 1810 may take into consideration various characteristics when determining the pace or timing of the entire presentation or any segment of the presentation.

Visual Media Object Selecting Module:

The visual media object selecting module 1812 receives the analyzed mood, the pace, and the division and length of the segments to determine the number of visual media objects to be presented per segment, and then sorts and arranges the visual media objects accordingly. In some embodiments, the visual media object selecting module 1812 may take into consideration additional parameters such as user-selection and editorial information when selecting visual media objects for the presentation. The presentation generation module 1816 receives the visual media objects and the segments and presents the visual data synchronously with the audio media objects.

In other embodiments, the segment determining module 1806 may determine segments based on a visual media object and, using an audio media object selecting module 1814, find an audio media object to accompany the visual media object. In other embodiments, the mood analyzing module 1808 and timing determining module 1810 may use a selected visual media object to determine the mood and pace, respectively.

It should be appreciated that in other embodiments, the apparatus 1802 may include fewer or more modules apart from those shown in FIG. 18. For example, the segment determining module 1806, mood analyzing module 1808, and the timing determining module 1810 may be combined into an integrated module configured to execute audio media object operations of segment determination, mood analysis, and pace determination for each segment of the audio media object. The modules 1806, 1808, 1810, 1812, 1814 and 1816 may be in the form of software that is processed by a processor. In another example embodiment, the modules 1806, 1808, 1810, 1812, 1814 and 1816 may be in the form of one or more logic blocks included in a programmable logic device (e.g. a field-programmable gate array). The described modules 1806, 1808, 1810, 1812, 1814 and 1816 may be adapted, and/or additional structures may be provided, to provide alternative or additional functionalities beyond those specifically discussed in reference to FIG. 18. The modifications or additions to the structures described in relation to FIG. 18 to implement these alternative or additional functionalities will be implementable by those skilled in the art, having the benefit of the present specification and teachings.

Visual and Audio Media Object Selecting Modules

Figure 19A:
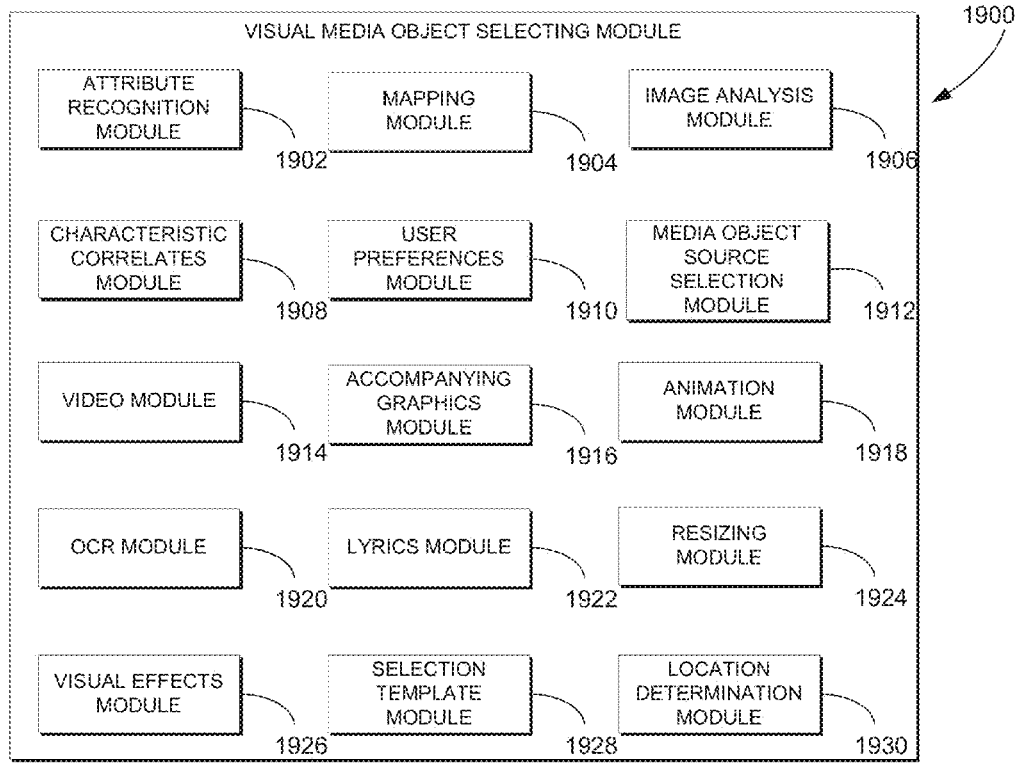
FIG. 19A illustrates a block diagram of modules incorporated within a visual media object selecting module, in accordance with an example embodiment, configured to automatically select visual media objects.
Figure 19B:
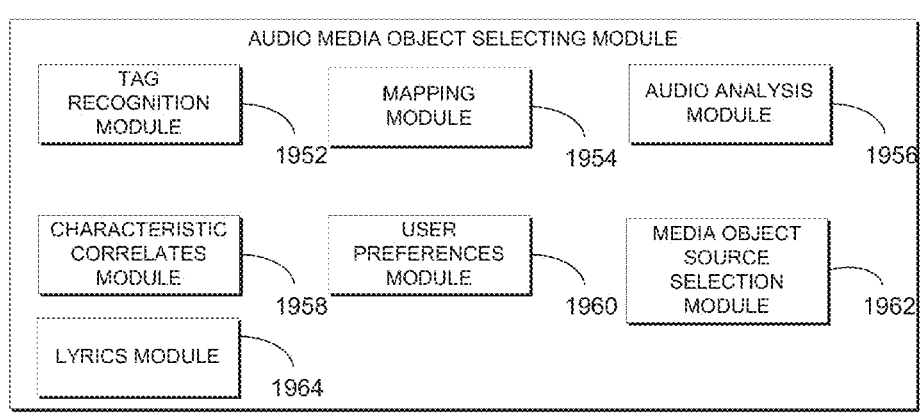
FIG. 19B illustrates a block diagram of modules incorporated within a audio media object selecting module, in accordance with an example embodiment, configured to automatically select audio media objects.

FIGS. 19A and 19B illustrate block diagrams of modules for a visual media object selecting module 1900 and an audio media object selecting module 1950 of an apparatus similar to apparatus 1800 as depicted in FIG. 18.

Visual Media Object Selecting Module:

FIG. 19A illustrates a block diagram of modules 1902 through 1930 incorporated within the visual media object selecting module 1900, in accordance with an example embodiment, configured to select visual media object for the presentation. The visual media object selection module 1900 is shown to include an attribute recognition module 1902, a characteristic mapping module 1904, an image analysis module 1906, a characteristic correlates module 1908, a user preferences module 1910, a media object source selection module 1912, a video module 1914, an accompanying (peripheral) graphics module 1916, an animation module 1918, an optical character recognition (OCR) module 1920, a lyrics module 1922, a resizing module 1924, a visual effects module 1926, a selection template module 1928, and a location determination (e.g. GPS) module 1930.

Attribute Recognition Module:

The attribute recognition module 1902 interprets a user-defined or automatically created attribute when the visual media object selecting module 1900 determines which visual media objects should be selected for the presentation. Generally, an attribute is a characteristic or descriptive element of the media object. In some example embodiments, the attribute may be defined by the user. The user-defined attribute may be a word or phrase describing a user's subjective interpretation of the visual media object (e.g. a photographic image) and may also encompass and capture the user's perception regarding a characteristic such as mood, which may be used by the visual media object selecting module 1900. The user-defined attribute may be utilized by the visual media object selecting module 1900 when selecting some or all of the visual media objects.

In general, the attribute recognition module 1902 may give priority to certain classes of attributes over other classes of attributes. In some embodiments, the user-defined attributes may take precedence over attributes provided from other sources, including automated attributes (e.g., tags created when processing audio media objects or which may be associated with audio media objects when fixed to a machine-readable medium such as a compact disc) or attributes defined by other users. In some embodiments, the attributes may be elevated to a status of "expert" annotations when provided from a trusted source. The priority given to a class of attributes may be automated by the presentation generation software or ultimately controlled by an end user.

Mapping Module:

The mapping module 1904 automatically assigns descriptors for a visual media object when selecting visual media objects at the visual media object selecting module 1900. In one example embodiment, the mapping module 1904 may automatically annotate similar visual media objects with the descriptors of the other. As an example, if a first photo image file is of a sunny day at the beach, and the image is annotated with "summer" and "beach," the mapping module 1904 may perform an image analysis of a second image to find similarities in the images and then annotate the second image with "summer" and "beach" or, if no similarities are found, then no additional annotations are added to the second image. The annotations may be made in either human readable labels or via unique IDs associated with human understandable labels. The mapping module 1904 may take into consideration various aspects of the visual media object, including where the media object is stored (e.g., whether in the same folder, on the same storage device, in the same digital library, etc.) when making a determination of whether to automatically annotate a second visual media object with descriptors derived from a first visual media object. In an embodiment, the user may control the automated annotation and create or select from a list of annotations for the mapping module 1904 to use when automatically annotating the visual media objects. The user may annotate a folder containing many visual media objects, and the mapping module 1904 may annotate all contents of the folder with the annotation. The mapping module 1904 communicates with various other modules in the visual media object selecting module 1900 in order to automatically annotate various visual media objects.

In an example embodiment, the mapping module 1904 assigns one or more descriptor value labels or IDs to a visual media object based on a consideration of descriptor values currently associated with the visual media object. These annotations may be made using any technique (e.g., expert editorial, end-user submit, content-based analysis, or statistical analysis) and be from any source (e.g., local storage, remote server, other user device). The mapping module 1904 may include one or more look-up (mapping) matrices to provide mood descriptor values synonymous with certain words or phrases in tags. For example, if a visual media object (e.g., a digital picture) has been tagged with "blue" as the predominant color characteristic value and "sky," "summer," and "beach," and "vacation" as descriptive tags, the mapping module 1904 may determine the mood descriptor value of the picture as being "happy," "blissful," or "elation," and tag the image with this mood upon searching a look up table to find "happy" and "elation" mapped to "summer", "sky", "beach," and vacation."

In an example embodiment, the mapping module 1904 may map a first characteristic of a visual media object (e.g., a digital picture) to one or more second characteristics of the visual media object. In the example embodiment, the mapping module may take into consideration the color descriptor value and map the color descriptor value to a mood descriptor value. As in the above example, when the digital picture is tagged with "blue" as the predominant color descriptor value, the digital picture may be mapped to "happy" and also may be mapped to "sad." In such an example, the mapping module may take into consideration other characteristics when determining which of the mapped mood descriptor values is appropriate.

Image Analysis Module:

The image analysis module 1906 analyzes a visual media object based on colors, hues, saturation, and variation in palette, among other color characteristics, to create various descriptors for the visual media object. In an embodiment, the image analysis module 1906 may simply annotate a visual media object with the predominant color of the visual media object. In some embodiments, the color annotation may be used to associate the image to a mood descriptor value using a color-mood mapping matrix as generally described above. Additionally, the image analysis module 1906 analyzes a visual media object (e.g., digital picture) to determine the contrast of the visual media object and automatically annotates the visual media object accordingly. In an embodiment, the image analysis module 1906 may utilize a look up table to correlate the determined contrast of the visual media object with an associated mood value and annotate the image with the associated mood value.

The image analysis module 1906 analyzes visual media objects to determine the entity or entities within a piece of visual data (e.g., a human, an animal, a tree, a building, etc.) and automatically tags the visual media object accordingly.

Characteristic Correlates Module:

The characteristic correlates module 1908 searches for and retrieves media objects having congruent characteristics for seed media objects (e.g., mood descriptor of music recording segment). A mood correlates table, such as the one depicted in FIG. 13, may be used in such a determination. When generating the presentation, there may not be sufficient available visual media objects tagged with the exact mood of the audio media object segment. The characteristic correlates module 1908 determines congruency between visual media objects and retrieves additional visual media objects that may be considered congruent to the characteristic of an accompanying audio media object segment.

In one example, the characteristic correlates module 1908 may include a characteristic correlates table cross referencing one mood with a list of acceptable congruent moods and may select visual media objects with moods acceptably congruent with the mood of the accompany audio media object and other visual media objects already selected. In some examples, the visual media objects may not have a mood value associated with it, and the mood correlates module 1908 may communicate with the mapping module 1904 to assign a mood value to the visual media object. In another example embodiment, when a mood value is not found, the characteristic correlates module 1908 correlates words and phrases associated with a piece of visual media object with a mood.

User Preferences Module:

The user preferences module 1910 allows the user to specify settings to guide the visual media object selecting module 1900 when selecting visual media objects. The user preferences module 1910 may allow the user to specify a different mood for a segment of audio or for the entire audio media object presentation. In some embodiments, the user preferences module 1910 may allow the user to remove or replace certain automatically selected visual media objects, increase the presentation of certain pieces of visual media objects over others, and generally edit the presentation based on personal preferences. The user preferences module 1910 may be in communication with all other modules of the visual media object selection module 1900.

Media Object Source Selection Module:

The media object source selection module 1912 selects the appropriate media object sources, and in some embodiments, may filter or block media object sources due to content, such as graphic images or explicit lyrics, as may be necessitated by the user through the graphical user interface module. The media object source selection module 1912 may also include a banish control to allow a user to temporarily or permanently banish one or more visual media objects selected from a particular media object source or discontinue pulling images from the media object source.

Video Module:

The video module 1914 uses descriptors from the seed audio media objects to retrieve or access video media objects for synchronous presentation with the audio media objects. In an embodiment, the video module 1914 may search for video media objects of the proper audio media object segment length. In another embodiment, the video module 1914 may edit the video media objects to fit the duration of the audio media object segment. In an embodiment, the video media object may be retrieved from an Internet source (e.g., You-Tube™). In some embodiments, if the audio media object (e.g., a music recording) includes metadata or is tagged with the recording artist name, the video module 1914 may seek out various video media objects of the recording artist performing, video media objects preferred by the recording artist, or "music video" video media objects of the recording artist to be used in the presentation. In some embodiments, the video module 1914 may perform a beat matching of a beat depiction in the video media object (e.g., a snare drum being played or foot tapping), in order to present the video media object synchronously with the audio media object. In another embodiment, periodicities in the video media object may be taken into consideration when selecting the video media object and synchronizing the video media object with the audio media object. For example, periodic camera movement or objects passing by the camera in a periodic way that can contain timing data that may be relevant for adjusting rhythmic pattern of video media object to rhythmic pattern of audio media object.

Graphics Module:

The accompanying graphics module 1916 searches for and finds graphics that may be applied to the presentation. In another embodiment, the accompanying graphics module 1916 finds graphic media objects that are similar to the seed or user-selected presentation visual media object selected and may present these as alternative images useable in the presentation.

Animation Module:

The animation module 1918 determines whether an animation may be presented during a segment of an audio media object. In some embodiments, the animation module 1918 may provide an animation file, such as a GIF file, to be presented in a peripheral frame of the presentation or in a main frame. In other embodiments, the animation module 1918 may modify an image or provide various effects to the image, such as an overlay or the like.

OCR Module:

The OCR module 1920 may recognize characters in a visual media object, such as text, and may automatically annotate the visual media object with the text or associated descriptor ID, or may be able to determine a descriptor, such as mood, based on analysis of the recognized text.

Lyrics Module:

The lyrics module 1922 selects visual, audio, text, or other media objects for the presentation based on the content of seed or source lyrics text media objects. Lyrics text media objects are often associated with audio media objects (e.g., the lyrics for the music composition performed in a music recording). These media objects may be organized or synchronized based on the particular segment of the associated audio media object. In some embodiments, the lyrics module 1922 may select some combination of text media objects (e.g., characters or words) that can be used to display the lyrics of select visual media objects that are related to the semantic content of the lyrics.

Resizing Module:

The resizing module 1924 determines how and which visual media objects to crop, shrink, compress, scale, and the like in order to present the visual media object upon selection by the visual media object selecting module 1900. In an example embodiment, the resizing module 1924 may tile multiple images by resizing, or may overlap images and in the process may resize the images to fit in the screen.

Visual Effects Module:

The visual effects module 1926 selects visual effects and visual transitions effects that may be user selected or may be automatically selected to best match the generated presentation. In some embodiments, the visual effects module 1926 provides various transition effects between presented visual media objects, such as swiping, panning, zooming, fading in and out, spinning, blurring, color enhancing, and so forth. The visual effect chosen may be selected based on the matching of characteristics of the audio and visual media objects and other parameters of the presentation. In other embodiments, the visual effects module 1926 provides various options to an end user to add various visual effects to the presentation and may limit the visual effects available when other visual effects are selected due to temporal requirements of the visual effect. In other embodiments, a module for graphics processing or image enhancements to fit the mood may be possible.

Selection Template Module:

The selection template module 1928 selects media objects based on a user or system defined template and communicates with the user preferences module 1910 to make the determination. The system may select one or more appropriate selection templates based on an analysis of the seed and/or source media objects selected for the presentation, direct descriptor criteria, other explicit or implicit presentation criteria, contextual data feeds, the content of the user's media library, the user's media activity history, overall user profile or other appropriate information (e.g., mood, genre, era, or location). In some embodiments, the user may be given a limited number of templates from which to select. In other embodiments, the selection template module 1928 may limit which media objects are selectable by the user in order to avoid composing media objects that may not suit the selected template. The selection template module 1928 may make the selection with reference to the characteristics associated with the nature of the media objects in the source directories, seed media object sets, or other applicable sources.

Location Determination Module:

The location determination module 1930 determines the location of the user, the location of where the media objects originated, or where persons or organizations associated with the media objects originated. In some embodiments, the location determination module 1930 searches for visual media objects based on this determination and provides a list of visual media objects depicting images of the same location to the visual media object selecting module 1900. In some embodiments, the location determination module 1930 uses global positioning or geolocation to determine the geographic location of the user. In other embodiments, the user's location may be submitted by the user. In other embodiments, the visual media object selected may be in reference to attributes. In some embodiments, the location determination module 1930 determines the origin of one or more aspects of the media object such as a recording artist and where the recording of the audio media object took place, and the visual media object selecting module 1900 may select images based on one or more of these attributes. In some embodiments, there may be additional modules as part of the system and it should be appreciated that the visual media object selecting module 1900 may include fewer or more modules apart from those shown in FIG. 19A. Additional modules may include a repetition module that may determine similar portions (e.g., segments), such as a chorus of the audio media object (e.g., music recording), and repeat a section of the selected visual media object (e.g., digital images) for that portion.

Descriptor Function Module:

In other embodiments, there may be a descriptor function module that selects presentation elements (media objects, timing and/or treatments) based on the combination of various media objects and/or their characteristics (e.g., the lyrics, mood, the tempo, the era, the artist and various other attributes).

Manual Optimization Module:

A manual optimization module may provide a graphical user interface for the selection of the visual or other media objects and may accordingly rank these media objects based on the optimal organization.

Bridging Module:

In other embodiments, a bridging module may be used to transition between a first visual media object of a first predominant color and second visual media object of a second predominant color. The bridging module may find a color between the first and second color to bridge the transition between the first and second visual media objects. The bridging module finds one or more other visual media objects and inserts them between the first and second visual media objects to smooth the transition between the first and second visual media objects.

The system may propose one or more appropriate alternate media objects and/or elements for any part of the presentation. The system may present a default selection with the option of reviewing and selecting an alternate. The alternate may be presented sequentially, simultaneously, or in a sequence of groups. In some embodiments, an entirely different set of visual media objects may be selected by the visual media object selecting module 1900 based on the same audio media object seed Audio Media Object Selecting Module:

FIG. 19B illustrates a block diagram of modules 1952 through 1964 incorporated within an audio media object selecting module 1950, in accordance with an example embodiment, configured to select audio media object. The audio media object selecting module 1950 includes a tag recognition module 1952, a mapping module 1954, an audio analysis module 1956, a characteristic correlates module 1958, a user preferences module 1960, a media object source selecting module 1962 (similar to, and may have the same functionality as, the visual media object selecting module 1900), and a lyrics module 1964. In some embodiments, there may be additional modules as part of the system, and it should be appreciated that audio media object selecting module 1950 may include fewer or more modules apart from those shown in FIG. 19B.

Presentation Generating Module

Figure 20:
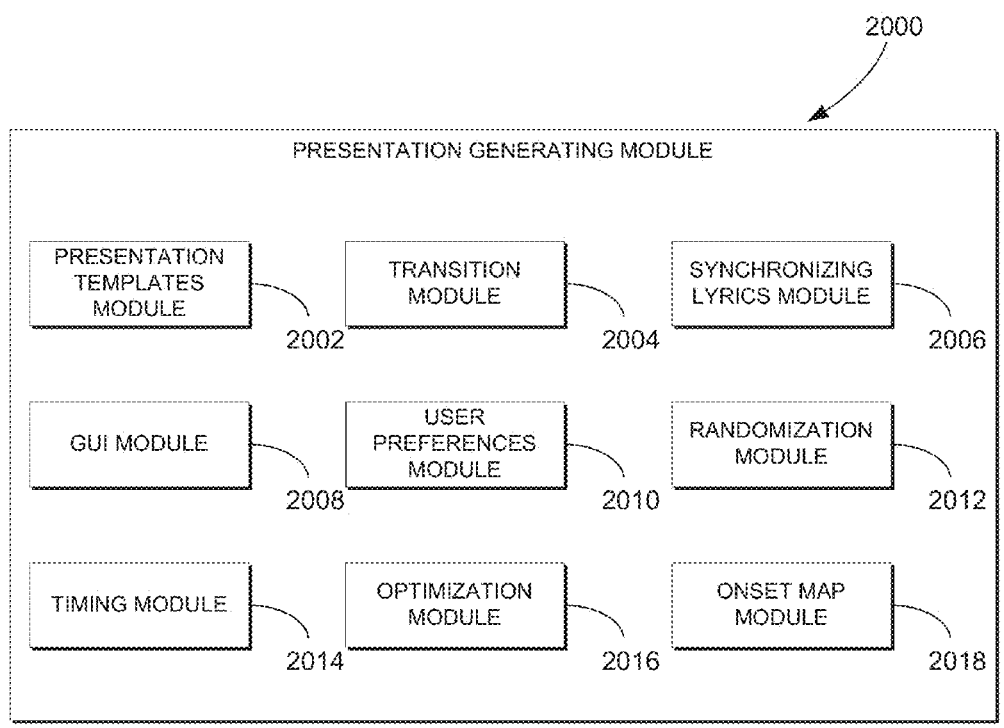
FIG. 20 illustrates a block diagram of modules incorporated with a presentation generating module, in accordance with an example embodiment, configured to automatically generate an audio-visual presentation.

FIG. 20 illustrates a block diagram of modules 2002 through 2018 incorporated within a presentation generating module 2000, in accordance with an example embodiment, configured to generate a presentation. The presentation generating module 2000 is shown to include a presentation templates module 2002, transition module 2004, synchronizing lyrics module 2006, graphical user interface (GUI) module 2008, user preferences module 2010, randomization module 2012, timing module 2014, optimization module 2016, and onset map module 2018. The presentation generating module 2000 combines the information of the selected visual media objects from the visual media object selecting module 1900 with the information of the audio media objects and all other media objects to construct and generate the presentation. In an embodiment, the presentation generating module 2000 may communicate with the visual media object selecting module 1900 and audio media object selecting module 1950. In some embodiments, many of the modules of the presentation generating module 2000 communicate with one or more of the modules of the visual media object selecting module 1900 and audio media object selecting module 1950.

Presentation Templates Module:

The presentation templates module 2002 stores various presentation templates which may be selected by a user for the presentation. Presentation templates define presentation elements (e.g., visual effects, audio effects, visual treatments, visual palettes, audio palettes, audio/video transitions, fonts, or pace/cut intensity) that combine to create an overall presentation style. In some embodiments, the template selected may affect which visual media object may be selected for the presentation due to visual effects such as transitioning between media object (e.g., transition effect), borders, overlaying images, tiling images, and other such effects included within the template. In some embodiments, a template may be selected automatically to optimize the presentation of the visual media objects available. The system may select one or more appropriate presentation templates based on an analysis of the seed and/or source media objects selected for the presentation, direct descriptor criteria, other explicit or implicit presentation criteria, contextual data feeds, the content of the user's media library, the user's media activity history, overall user profile or other appropriate information (e.g., mood, genre, era, or location).

Transition Module:

The transition module 2004 stores various transition effects used to connect visual media object that are available for use in the presentation. The graphical user interface may allow a user to select a transition effect from a plurality of transitions. In some embodiments, the transition module 2004 may suggest a particular transition effect to the user for use within a segment of an audio media object or between two visual media objects. In some example embodiments, the transition module 2004 determines one or more transition effects for use in the presentation when transitioning between visual media objects and between audio media objects. The transition module 2004 may make the determination with reference to the length of one or more audio media objects for use in the presentation and the quantity of visual media objects available for each audio media object.

Synchronizing Lyrics Module:

The synchronizing lyrics module 2006 may present lyrics synchronously with audio media objects. In some embodiments, the lyrics synchronization module 2006 may synchronize the lyrics with the audio media object and a user input, such as the user singing along with the lyrics and the words spoken into a microphone.

GUI Module:

The GUI module 2008 provides an interface for the user to input preferences and construct the presentation according to personal preferences. The GUI module 2008 provides controls to adjust or change the presentation to user preferences and selections for both audio and visual media objects. In an example embodiment, the GUI module 2008 displays for the user a segmentation of a selected audio media object, the duration of each segment, the visual media object selected for the segment, and various other parameters that may be incorporated into the presentation based on the user's preference rendered in a form such as a timeline or histogram of information. The parameters may include one or more visual effects, animations, templates, and so forth. In some embodiments, the user may be presented with a timeline of various possible automatically-selected visual media objects based on the segmentation and various selected elements such as transition effects. In some embodiments, the GUI module 2008 allows the user to audition a visual media object (e.g., an image) in a particular segment of the audio media object, and the GUI module 2008 provides feedback as to whether the visual media object has the same or similar mood, whether the length of the particular segment is too short to present the selected visual media object during the segment, whether the visual media object conflicts with the previous segments or other visual media objects selected for that segment, or may simply not be the best fit for the particular segment. The GUI module 2008 communicates with various other modules in the presentation generating module 2000, including the user preferences module 2010 as described below.

User Preferences Module:

The user preferences module 2010 saves user preferences as may be inputted through a GUI module 2008. In some embodiments, the user preferences module 2010 may take into consideration the historical activity of a user to suggest audio media objects or video media objects having a similar mood or other characteristic. In an example embodiment, the user preferences module 2010 may look to the characteristics of the audio and visual media objects used in recent presentations to make a suggestion of audio and video media objects to the user. In an embodiment, the suggestion may be based on the user's historical audio and video media object activity recently accessed for purposes outside of creating a presentation. In some embodiments, the user preferences module 2010 may allow a generated presentation to be saved partially or entirely. In other embodiments, the user preferences module 2010 may allow for a saved presentation to be submitted to another person. In some embodiments, a first user's preferences may be submitted to a second user to generate a presentation based on the first user's preferences, historical activity, profile, or media object collection. In an embodiment, the user preferences may cue preferred visual media objects, which may be compared to a seed audio media object and adjusted or arranged according to the characteristics of the audio media object.

Randomization Module:

The randomization module 2012 presents audio and visual media objects without consideration of user preferences. In some example embodiments, the randomization module 2012 may recognize various characteristics of the audio or visual media objects and compile various additional audio or visual media objects to present either as part of the presentation or as an alternative construction to the generated presentation.

Timing Module:

The timing module 2014 presents various points within an audio media object at which a visual media object may be presented. In an example embodiment, the timing module 2014 may provide an overlay to the GUI module 2008 to present a histogram across a timeline of the audio media object showing the various points that a visual media object can be presented and remain in synch with one or more of the rhythmic patterns.

Optimization Module:

The optimization module 2016 may automatically generate an optimal presentation and in some embodiments, may take into consideration the user preferences from the user preference module 2010. In other embodiments, the optimization module 2016 may take into consideration selected visual media objects from the visual media object selecting module 1900. The optimization module 2016 takes into consideration various constraints, such as visual media object availability and audio media object temporal constraints, and additionally may take into consideration user preferences, such as a selected template, when determining the optimal presentation. For example, the optimization module 2016 may reduce the length of an audio media object to make a best fit with a group of selected visual media objects. In another embodiment, the order of visual media objects may be changed, the view time may be extended by slowing down the playback speed of an audio media object and finding additional visual media objects, the number of selected visual media objects may be reduced, or the playback speed of an audio media object may be sped up.

Onset Map Module:

The onset map module 2018 determines one or more ways of constructing the presentation and may provide one or more alternative selections of visual media objects for constructing the presentation. The available alternatives may be based on the user's preferences, the audio media object characteristics, the available visual media objects, or any combination of these factors. In an example embodiment, more than one pace for each segment of the presentation may be appropriate based on the detected rhythmic patterns and tempo of the audio media object. More than one set of visual media objects may be presentable within a particular segment based on the more than one pace and other factors. In the embodiment, the onset map module 2018 derives multiple options of visual media objects (e.g., digital images) useable in the presentation per segment. In an example embodiment, the onset map module 2018 may populate a grid in the form of a GUI depicting segments of one or more audio media objects across one axis and the visual work options per segment along another axis. An example embodiment may be similar to matrix 1712 of FIG. 17.

In some embodiments, the onset map module 2018 may provide more than one segmenting option when an audio media object may be segmented according to more than one characteristic of the audio media object. For example, the onset map module 2018 may provide two ways to perform segmentation of the audio media object: a first segmentation based on determined moods and a second segmentation based on determined rhythmic patterns. In some embodiments, the user may be able to construct a presentation by selecting either one of the segmentations or portions of both (depending on where in the audio media object the segmentations occur and if these points of segmentation overlap). Based on the segmentation, the onset map module 2018 then provides the various blocks of visual media objects available for constructing the presentation.

It is clearly noted that in some embodiments, there may be additional modules, and it should be appreciated that presentation generating module 2000 may include fewer or more modules apart from those shown in FIG. 20.

As will be discussed in reference to FIG. 21, one example of such a processing system has a display, as well as a communication interface. As is known to those skilled in the art, the communication interface may be through various input devices, such as one or more of a mouse, keyboard, trackball, tablet, or the like, or may be through the display itself, such as through any of a number of types of "touch screen" interfaces. Additionally, a keyboard may be a conventional electromechanical keyboard, a virtual keyboard (for example, a keyboard presented on the display for direct input through the display surface), or any other keyboard capable of transmitting an input.

Figure 21:
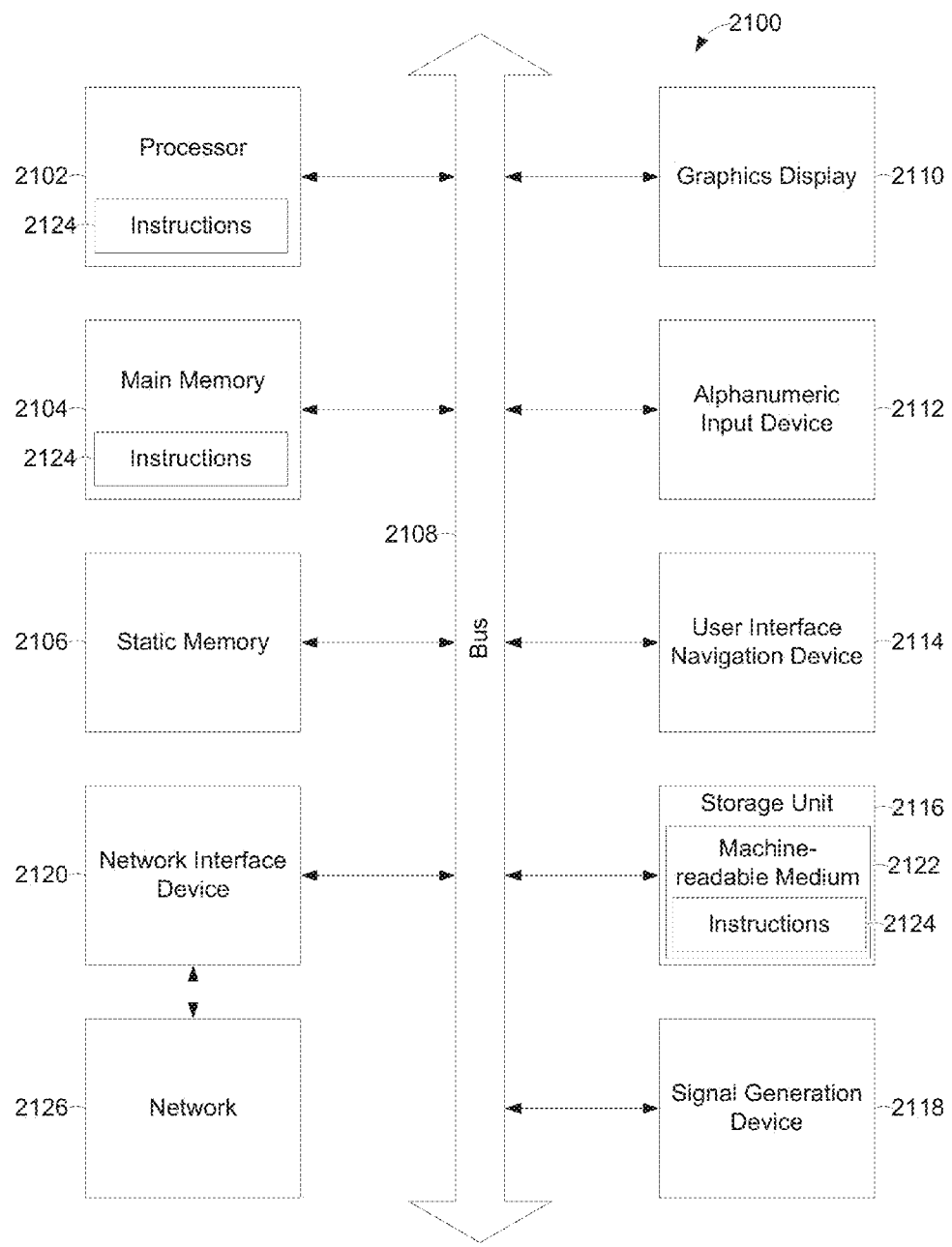
FIG. 21 depicts a simplified block diagram of a machine in the example form of a processing system, within which a set of instructions, for causing the machine to perform any one or more of the methodologies discussed herein, may be executed.

FIG. 21 depicts a simplified block diagram of a machine in the example form of a processing system 2100, such as a processing system 210A, 210B, and 310, within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The example processing system 2100 includes a processor 2102 (e.g., a central processing unit (CPU), a graphics processing unit (GPU), or both), a main system memory 2104 and a static memory 2106, which communicate with each other via bus 2108. The processing system 2100 may further include a graphics display unit 2110 (e.g., a plasma display, Liquid Crystal Display (LCD), Organic Light Emitting Diode (OLED) display, Thin Film Transistor (TFT) display, or cathode ray tube (CRT)). The processing system 2100 also includes a user interface (UI) navigation device 2114 (e.g., a mouse), a storage unit 2116, a signal generation device 2118 (e.g., a speaker), and a network interface device 2120.

The storage unit 2116 includes a machine-readable medium 2122 on which is stored one or more sets of instructions and data structures (e.g., software 2124) embodying or utilized by any one or more of the methodologies or functions described herein. The software 2124 may also reside, completely or at least partially, within the main system memory 2104 and/or within the processor 2102 during execution thereof by processing system 2100, with the main system memory 2104 and the processor 2102 also constituting machine-readable, tangible media. The software 2124 may further be transmitted or received over the network 2126 via the network interface device 2120 utilizing any one of a number of well-known transfer protocols (e.g., Hypertext Transfer Protocol (HTTP)). While the machine-readable medium 2122 is shown in an example embodiment to be a single medium, the term "machine-readable medium" should be taken to include a single medium or multiple media (e.g., a centralized or distributed database and one or more instances of memory which may be or include caches) that store the one or more sets of instructions. The term "machine-readable medium" shall also be taken to include any medium that is capable of storing a set of instructions for execution by the machine and that cause the machine to perform any one or more of the methodologies of the present application, or that is capable of storing, either permanently or temporarily (such as in execution of a set of instructions) data structures utilized by or associated with such a set of instructions. The term "machine-readable medium" shall accordingly be taken to include, but not be limited to, solid-state memories, optical and magnetic media, and other structures facilitating reading of data stored or otherwise retained thereon.

This detailed description refers to the accompanying drawings that depict various details of examples selected to show how the example embodiments may be practiced. The discussion herein addresses various examples of the inventive subject matter at least partially in reference to these drawings, and describes the depicted embodiments in sufficient detail to enable those skilled in the art to practice the embodiments. Many other embodiments may be utilized for practicing the inventive subject matter than the illustrative examples discussed herein, and many structural and operational changes in addition to the alternatives specifically discussed herein may be made without departing from the scope of the inventive subject matter. In this description, references to "one embodiment" or "an embodiment," or to "one example" or "an example," mean that the feature being referred to is, or may be, included in at least one embodiment or example. Separate references to "an embodiment" or "one embodiment" or to "one example" or "an example" in this description are not intended to necessarily include the same embodiment or example; however, neither are such embodiments mutually exclusive, unless so stated or as will be readily apparent to those of ordinary skill in the art having the benefit of this disclosure. Thus, embodiments may include a variety of combinations and/or integrations of the embodiments and examples described herein, as well as further embodiments and examples as defined within the scope of all claims based on this disclosure, as well as all legal equivalents of such claims.

For the purposes of this specification, a "processor-based system" or "processing system" includes a system using one or more processors, microcontrollers and/or digital signal processors having the capability of running a "program." A "program" is a set of executable machine code instructions, and as used herein, includes user-level applications as well as system-directed applications or daemons. Processing systems include communication and electronic devices such as cell phones, music and multi-media players, and Personal Digital Assistants (PDA); as well as computers, or "processing systems" of all forms (desktops, laptops, servers, palmtops, workstations, etc.).

The various embodiments described herein are not necessarily mutually exclusive, as some embodiments can be combined with one or more other embodiments to form new embodiments. This detailed description is, therefore, not to be taken in a limiting sense. Certain systems, apparatus or processes are described herein as being implemented in or through use of one or more "modules." A "module" as used herein is an apparatus configured to perform identified functionality through software, firmware, hardware, or any combination thereof. When the functionality of a module is performed in any part through software or firmware, the module includes at least one machine readable medium bearing instructions that when executed by one or more processors perform that portion of the functionality implemented in software or firmware. The modules may be regarded as being communicatively coupled to one another to at least the degree needed to implement the described functionalities.

Many modifications and variations may be made to the techniques and structures described and illustrated herein without departing from the scope of the present subject matter. For example, as referenced above, many types of variations might be implemented to guide a user through a series of input frames, such as may be depicted in data screens. As one example, completion of input of variables in one input frame might cause automatic inactivation of that input frame and activation of a subsequent input frame. Additionally, although specification has addressed primarily the use of visual cues to guide a user through the process of providing specified variables, these visual cues could be used in conjunction with, for example, audible tones. Accordingly, the present specification should be understood to provide examples to illustrate the present inventive concepts and to enable others to make and use those inventive concepts.

What is claimed is:

1. A method of creating an audio-visual presentation, the method comprising:
   identifying a first plurality of media object characteristics associated with a first media object to be presented by a media player device;
   determining a congruency while the audio-visual presentation is being presented, the congruency being between the first plurality of media object characteristics and a second plurality of media object characteristics associated with a second media object, the first media object including audio data and the second media object including visual data which are simultaneously presented, the determining of the congruency including accessing a first score from a first correlation matrix that correlates a first media object characteristic of a first descriptor type among the first plurality of media object characteristics to a second media object characteristic of a second descriptor type different from the first descriptor type among the second plurality of media object characteristics, the first score representing a first degree of congruency between the first media object characteristic and the second media object characteristic, the first media object characteristic and the second media object characteristic having dissimilar descriptor types within the first correlation matrix from which the first score is accessed, the determining of the congruency further including accessing a second correlation matrix that includes a second score that represents a second degree of congruency between the first media object and a non-media entity, the determining of the congruency being based on the first score transgressing a threshold value;
   identifying the second media object from a plurality of reference media objects based on the determined congruency between the first plurality of media object characteristics and the second plurality of media object characteristics and based on the second degree of congruency between the first media object and the non-media entity; and
   using a processor, dynamically generating the audio-visual presentation to synchronously present the first media object and the second media object on the media player device.

2. The method of claim 1, wherein the audio data represents at least part of an audio track.

3. The method of claim 1, wherein the first media object includes visual data and the second media object includes audio data.

4. The method of claim 3, wherein the visual data represents a picture.

5. The method of claim 3, wherein the visual data represents a video.

6. The method of claim 1, further comprising:
   communicating the audio-visual presentation to the media player device via a network.

7. The method of claim 1, further comprising:
   identifying a first media object category based on the first plurality of media object characteristics, the first media object category being one of a plurality of categories associated with the first media object; and
   identifying, based on the first media object category, a second media object category associated with the plurality of reference media objects, the second media object category being based on the second plurality of media object characteristics; wherein
   the identifying of the second media object is based on the second media category.

8. The method of claim 7, wherein the first media object has a first media type; at least one of the first plurality of media object characteristics is specific to the first media type; the second media object has a second media type; and at least one of the second plurality of media object characteristics is specific to the second media type.

9. The method of claim 1, wherein the first media object includes audio data and the second media object includes visual data, the method further comprising:
   determining a plurality of temporal segments of the audio data; and
   determining a duration of a temporal segment of the plurality of temporal segments of the audio data; wherein
   the identifying of the second media object is based on the duration of the temporal segment.

10. The method of claim 9, wherein the identifying of the second media object is based on at least one of a visual effect, a template of parameters, a theme, an animation, or a tag.

11. The method of claim 9, wherein the first plurality of media object characteristics includes one or more mood characteristics of the audio data; and the determining of the plurality of temporal segments is based on the one or more mood characteristics.

12. The method of claim 9, wherein the first plurality of media object characteristics includes one or more rhythmic patterns of the audio data; and the determining of the plurality of temporal segments is based on the one or more rhythmic patterns.

13. The method of claim 12, further comprising:
   determining a pace of the temporal segment based on the one or more rhythmic patterns; and the identifying of the second media object is based on the pace being within a range of paces.

14. The method of claim 12, further comprising:
   identifying a rhythmic pattern of the one or more rhythmic patterns in the temporal segment; and
   presenting the second media object during a presentation of the temporal segment based on the identified rhythmic pattern.

15. The method of claim 1, wherein the determining of the congruency is based on a measure of similarity between the first plurality of media object characteristics and the second plurality of media object characteristics and based on a threshold of similarity.

16. The method of claim 1 wherein the identifying of the second media object is performed while at least a portion of the first media object is being presented on the media player device.

17. The method of claim 1, further comprising
   processing the plurality of reference media objects to obtain the second plurality of media object characteristics during a presentation of the first media object.

18. A system comprising:
   a processor configured by an analysis module to:
      identify a first plurality of media object characteristics associated with a first media object to be presented by a media player device, and determine a congruency while the audio-visual presentation is being presented, the congruency being between the first plurality of media object characteristics and a second plurality of media object characteristics associated with a second media object, the first media object including audio data and the second media object including visual data which are simultaneously presented, the determining of the congruency including accessing a first score from a first correlation matrix that correlates a first media object characteristic of a first descriptor type among the first plurality of media object characteristics to a second media object characteristic of a second descriptor type different from the first descriptor type among the second plurality of media object characteristics, the first score representing a first degree of congruency between the first media object characteristic and the second media object characteristic, the first media object characteristic and the second media object characteristic having dissimilar descriptor types within the first correlation matrix from which the first score is accessed, the determining of the congruency further including accessing a second correlation matrix that includes a second score that represents a second degree of congruency between the first media object and a non-media entity, the determining of the congruency being based on the first score transgressing a threshold value;

a selection module configured to identify the second media object from a plurality of reference media objects based on the determined congruency between the first plurality of media object characteristics and the second plurality of media object characteristics and based on the second degree of congruency between the first media object and the non-media entity; and a presentation module configured to dynamically generate the audio-visual presentation to synchronously present the first media object and the second media object on the media player device.

19. A non-transitory machine-readable storage medium comprising instructions that, when executed by one or more processors of a machine, cause the machine to perform operations comprising:

identifying a first plurality of media object characteristics associated with a first media object to be presented by a media player device;

determining a congruency while the audio-visual presentation is being presented, the congruency being between the first plurality of media object characteristics and a second plurality of media object characteristics associated with a second media object, the first media object including audio data and the second media object including visual data which are simultaneously presented, the determining of the congruency including accessing a first score from a first correlation matrix that correlates a first media object characteristic of a first descriptor type among the first plurality of media object characteristics to a second media object characteristic of a second descriptor type different from the first descriptor type among the second plurality of media object characteristics, the first score representing a first degree of congruency between the first media object characteristic and the second media object characteristic, the first media object characteristic and the second media object characteristic having dissimilar descriptor types within the first correlation matrix from which the first score is accessed, the determining of the congruency further including accessing a second correlation matrix that includes a second score that represents a second degree of congruency between the first media object and a non-media entity, the determining of the congruency being based on the first score transgressing a threshold value;

identifying the second media object from a plurality of reference media objects based on the determined congruency between the first plurality of media object characteristics and the second plurality of media object characteristics and based on the second degree of congruency between the first media object and the non-media entity; and dynamically generating the audio-visual presentation to synchronously present the first media object and the second media object on the media player device.

* * * * *

UNITED STATES PATENT AND TRADEMARK OFFICE
CERTIFICATE OF CORRECTION

PATENT NO. : 8,996,538 B1  
APPLICATION NO. : 12/985690  
DATED : March 31, 2015  
INVENTOR(S) : Cremer et al.

Page 1 of 1

It is certified that error appears in the above-identified patent and that said Letters Patent is hereby corrected as shown below:

In the specification

In column 6, line 28, after "and", insert --150--, therefor

In column 11, line 4, delete "server" and insert --server2--, therefor

In column 12, line 64, after "types", insert --.--, therefor

In column 13, line 53, delete "6a-6d" and insert --6A-6D--, therefor

In column 26, line 63, delete "1416" and insert --1407--, therefor

In column 29, line 67, after "mapping", insert --.--, therefor

In column 33, line 14, delete "1800:" and insert --1802:--, therefor

In column 34, line 32, delete "1800" and insert --1802--, therefor

Signed and Sealed this  
First Day of December, 2015

Michelle K. Lee  
*Director of the United States Patent and Trademark Office*